(12) United States Patent
Kim et al.

(10) Patent No.: US 11,122,635 B2
(45) Date of Patent: *Sep. 14, 2021

(54) GROUPING OF NETWORK DEVICES

(71) Applicant: Belkin International, Inc., Playa Vista, CA (US)

(72) Inventors: Ryan Yong Kim, Rolling Hills Estates, CA (US); Jon Plummer, Los Angeles, CA (US); Matt Glidden, Manhattan Beach, CA (US); Douglas Edward McLaughlin, Los Angeles, CA (US)

(73) Assignee: BELKIN INTERNATIONAL, INC., Playa Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/881,306

(22) Filed: Jan. 26, 2018

(65) Prior Publication Data

US 2018/0249521 A1    Aug. 30, 2018

Related U.S. Application Data

(63) Continuation of application No. 15/363,051, filed on Nov. 29, 2016, now Pat. No. 9,918,351, which is a
(Continued)

(51) Int. Cl.
*H04L 29/06* (2006.01)
*H04L 12/24* (2006.01)
(Continued)

(52) U.S. Cl.
CPC ......... *H04W 76/14* (2018.02); *H04L 41/0893* (2013.01); *H04L 63/0876* (2013.01);
(Continued)

(58) Field of Classification Search
CPC ....... H04W 76/14; H04W 76/15; H04W 4/08; H04W 4/70; H04W 4/60; H04W 8/005;
(Continued)

(56) References Cited

U.S. PATENT DOCUMENTS 6,892,230 B1   5/2005   Gu et al.
6,910,068 B2   6/2005   Zintel et al.
(Continued)

FOREIGN PATENT DOCUMENTS

WO   2016-028779 A1   2/2016
WO   2016-040176 A1   3/2016

OTHER PUBLICATIONS

Thomas, David, and Egil Hansen. "Thingies for Dummies: A smart home infrastructure for the rest of us.", 2012. (Year: 2012).*
(Continued)

*Primary Examiner* — Michael Simitoski
(74) *Attorney, Agent, or Firm* — Kilpatrick Townsend & Stockton LLP

(57) ABSTRACT

The present disclosure relates to setup of IoT network devices, and specifically to setup of multiple similar IoT devices at substantially the same time using joint authentication. Embodiments include, for example, receiving, at an existing network device on a network, one or more communications, wherein the one or more communications include an indication that multiple new network devices are associated with the network; receiving an indication that the multiple new network devices have generated a setup access point; establishing a connection with the access point of each of the multiple new network devices; receiving identification information, wherein the identification information includes information identifying each of the multiple new network devices; and transmitting the identification information identifying each of the multiple new network devices, wherein when the identification information is received, the identification information facilitates generating an authentication query to authenticate one or more of the multiple new network devices.

20 Claims, 27 Drawing Sheets

| New Device 1 (Light 1) | New Device 2 (Fan) | New Device 3 (Light 2) |
|---|---|---|
| on/off | fan on/off | on/off |
| fluorescent/incandescent | slow | |
| color/no color | reverse | |
| motion sensor | night light on/off | |
| dimmer | | |

Related U.S. Application Data continuation-in-part of application No. 14/947,697, filed on Nov. 20, 2015, now Pat. No. 9,713,003, which is a continuation of application No. 14/455,940, filed on Aug. 10, 2014, now Pat. No. 9,451,462, said application No. 15/363,051 is a continuation-in-part of application No. 14/947,001, filed on Nov. 20, 2015, now Pat. No. 9,686,682, which is a continuation of application No. 14/455,940, filed on Aug. 10, 2014, now Pat. No. 9,451,462, said application No. 15/363,051 is a continuation-in-part of application No. 15/217,118, filed on Jul. 22, 2016, now abandoned, which is a continuation of application No. 14/529,745, filed on Oct. 31, 2014, now Pat. No. 9,426,153, which is a continuation of application No. 14/479,545, filed on Sep. 8, 2014, now Pat. No. 9,210,192, said application No. 15/363,051 is a continuation-in-part of application No. 14/946,348, filed on Nov. 19, 2015, now abandoned, said application No. 15/363,051 is a continuation-in-part of application No. 14/946,308, filed on Nov. 19, 2015, now abandoned, which is a continuation of application No. 14/462,725, filed on Aug. 19, 2014, now abandoned, said application No. 15/363,051 is a continuation-in-part of application No. 14/946,290, filed on Nov. 19, 2015, now Pat. No. 9,820,314, which is a continuation of application No. 14/454,163, filed on Aug. 7, 2014, now Pat. No. 9,814,084, said application No. 15/363,051 is a continuation-in-part of application No. 14/455,938, filed on Aug. 10, 2014, now Pat. No. 9,661,058, said application No. 15/363,051 is a continuation-in-part of application No. 14/242,806, filed on Apr. 1, 2014, now Pat. No. 9,706,582.

(51) Int. Cl.

| | | |
|---|---|---|
| *H04W 12/06* | (2021.01) | |
| *H04W 76/14* | (2018.01) | |
| *H04L 29/08* | (2006.01) | |
| *H04W 4/08* | (2009.01) | |
| *H04W 12/08* | (2021.01) | |
| *H04W 4/70* | (2018.01) | |
| *H04W 4/60* | (2018.01) | |
| *H04W 76/15* | (2018.01) | |
| *H04W 8/00* | (2009.01) | |
| *H04W 48/20* | (2009.01) | |
| *H04W 12/50* | (2021.01) | |
| *H04W 48/18* | (2009.01) | |
| *H04L 9/00* | (2006.01) | |
| *H04W 88/16* | (2009.01) | |
| *H04W 76/11* | (2018.01) | |
| *H04W 12/04* | (2021.01) | |

(52) U.S. Cl.
CPC .......... *H04L 63/102* (2013.01); *H04L 67/141* (2013.01); *H04L 67/303* (2013.01); *H04W 4/08* (2013.01); *H04W 4/60* (2018.02); *H04W 4/70* (2018.02); *H04W 8/005* (2013.01); *H04W 12/06* (2013.01); *H04W 12/08* (2013.01); *H04W 12/50* (2021.01); *H04W 48/18* (2013.01); *H04W 48/20* (2013.01); *H04W 76/15* (2018.02); *H04W 12/04* (2013.01); *H04W 76/11* (2018.02); *H04W 88/16* (2013.01)

(58) Field of Classification Search
CPC ..... H04W 48/18; H04W 48/20; H04W 12/08; H04W 12/06; H04W 12/04; H04W 88/16; H04L 41/0893; H04L 41/12; H04L 63/102; H04L 63/104; H04L 63/0876; H04L 67/141; H04L 67/1044; H04L 67/1046; H04L 67/1048; H04L 67/1051; H04L 67/1059; H04L 67/303

See application file for complete search history.

(56) References Cited

U.S. PATENT DOCUMENTS

| | | | |
|---|---|---|---|
| 7,242,928 | B2 | 7/2007 | Choi |
| 7,376,717 | B2 | 5/2008 | Bhogal et al. |
| 7,583,685 | B2 | 9/2009 | Ajitomi et al. |
| 7,634,802 | B2 | 12/2009 | Chiloyan |
| 7,711,796 | B2 | 5/2010 | Gutt et al. |
| 7,849,173 | B1 | 12/2010 | Uhlik |
| 7,849,177 | B2 | 12/2010 | Uhlik |
| 7,899,018 | B2 | 3/2011 | Balasubramanian et al. |
| 7,975,140 | B2 | 7/2011 | Fedyk et al. |
| 8,065,397 | B2* | 11/2011 | Taylor ................. G16H 40/40 709/220 |
| 8,099,764 | B2 | 1/2012 | Herzog et al. |
| 8,134,964 | B2 | 3/2012 | Pan et al. |
| 8,214,496 | B2 | 7/2012 | Gutt et al. |
| 8,244,223 | B2 | 8/2012 | Farah |
| 8,331,544 | B2 | 12/2012 | Kraus et al. |
| 8,369,880 | B2 | 2/2013 | Citrano, III et al. |
| 8,386,593 | B1* | 2/2013 | Gao ....................... H04L 41/22 709/223 |
| 8,392,585 | B1 | 3/2013 | Balwani |
| 8,478,871 | B2 | 7/2013 | Gutt et al. |
| 8,521,859 | B2 | 8/2013 | Uhlik |
| 8,555,063 | B2 | 10/2013 | Xiao et al. |
| 8,639,929 | B2 | 1/2014 | Bian et al. |
| 8,655,995 | B2 | 2/2014 | Elston, III et al. |
| 8,848,559 | B2* | 9/2014 | Abraham ............... H04W 8/005 370/252 |
| 8,873,428 | B1* | 10/2014 | Orr ...................... H04L 41/082 370/254 |
| 8,942,170 | B1 | 1/2015 | Fang |
| 8,948,390 | B2 | 2/2015 | Scott et al. |
| 9,054,961 | B1 | 6/2015 | Kim et al. |
| 9,130,928 | B2 | 9/2015 | Qui et al. |
| 9,185,066 | B2 | 11/2015 | Douillet et al. |
| 9,210,192 | B1 | 12/2015 | Kim et al. |
| 9,306,809 | B2 | 4/2016 | Dawes et al. |
| 9,426,153 | B2 | 8/2016 | Kim et al. |
| 9,451,462 | B2 | 9/2016 | Kim et al. |
| 9,713,003 | B2 | 7/2017 | Kim et al. |
| 9,787,551 | B2* | 10/2017 | Newton ............. H04L 41/0893 |
| 2003/0036350 | A1 | 2/2003 | Jonsson et al. |
| 2003/0131129 | A1 | 7/2003 | Becker et al. |
| 2004/0168081 | A1 | 8/2004 | Ladas et al. |
| 2004/0179502 | A1 | 9/2004 | Naghian et al. |
| 2004/0267837 | A1 | 12/2004 | Wang et al. |
| 2005/0280862 | A1 | 12/2005 | Fukushima |
| 2006/0034234 | A1 | 2/2006 | Watanabe |
| 2006/0150241 | A1 | 7/2006 | Huh et al. |
| 2006/0168647 | A1 | 7/2006 | Chiloyan |
| 2006/0212924 | A1* | 9/2006 | Xie ....................... H04L 63/102 726/1 |
| 2006/0212938 | A1 | 9/2006 | Suzuki |
| 2006/0259604 | A1* | 11/2006 | Kotchavi ............ H04L 41/0226 709/223 |
| 2007/0021137 | A1* | 1/2007 | Kokkonen ............ H04L 41/042 455/518 |
| 2007/0025384 | A1 | 2/2007 | Ayyagari et al. |
| 2007/0027964 | A1 | 2/2007 | Herrod et al. |
| 2007/0079113 | A1 | 4/2007 | Kulkarni et al. |
| 2007/0127670 | A1 | 6/2007 | Morishima et al. |
| 2007/0157266 | A1 | 7/2007 | Ellis et al. |
| 2007/0170238 | A1 | 7/2007 | Piersol et al. |
| 2008/0070495 | A1 | 3/2008 | Stricklen et al. |
| 2008/0089300 | A1 | 4/2008 | Yee |
| 2008/0141347 | A1 | 6/2008 | Kostiainen et al. |
| 2008/0263647 | A1 | 10/2008 | Barnett et al. |

(56) References Cited

U.S. PATENT DOCUMENTS

| | | | |
|---|---|---|---|
| 2008/0281954 A1* | 11/2008 | Bagal | H04L 67/303 709/223 |
| 2009/0037207 A1 | 2/2009 | Farah | |
| 2009/0052667 A1 | 2/2009 | Iwamura | |
| 2009/0060189 A1* | 3/2009 | Osajima | H04L 9/0833 380/259 |
| 2009/0070436 A1 | 3/2009 | Dawes et al. | |
| 2009/0070681 A1 | 3/2009 | Dawes et al. | |
| 2009/0195349 A1 | 8/2009 | Frader-Thompson et al. | |
| 2009/0195402 A1 | 8/2009 | Izadi et al. | |
| 2009/0268633 A1 | 10/2009 | Pan et al. | |
| 2009/0279526 A1 | 11/2009 | Ichikawa et al. | |
| 2010/0080200 A1 | 4/2010 | Stewart | |
| 2010/0081375 A1 | 4/2010 | Rosenblatt et al. | |
| 2010/0095359 A1 | 4/2010 | Gordon | |
| 2010/0095369 A1 | 4/2010 | Gutt et al. | |
| 2010/0189012 A1 | 7/2010 | Shibuya et al. | |
| 2010/0220697 A1 | 9/2010 | Liu et al. | |
| 2010/0248692 A1 | 9/2010 | Keller et al. | |
| 2010/0250946 A1 | 9/2010 | Korte et al. | |
| 2010/0309915 A1 | 12/2010 | Pirbhai et al. | |
| 2010/0317332 A1 | 12/2010 | Bathiche et al. | |
| 2010/0318685 A1 | 12/2010 | Kraus et al. | |
| 2011/0055276 A1* | 3/2011 | Hamilton | H04L 41/0893 707/784 |
| 2011/0081860 A1 | 4/2011 | Brown et al. | |
| 2011/0144773 A1 | 6/2011 | Van Herk | |
| 2011/0148567 A1 | 6/2011 | Lafond et al. | |
| 2011/0307694 A1 | 12/2011 | Broustis et al. | |
| 2012/0064932 A1* | 3/2012 | Lim | H04W 4/70 455/509 |
| 2012/0190386 A1 | 7/2012 | Anderson | |
| 2012/0240191 A1 | 9/2012 | Husney et al. | |
| 2012/0246294 A1 | 9/2012 | Eaton et al. | |
| 2012/0317619 A1 | 12/2012 | Dattagupta | |
| 2013/0035067 A1 | 2/2013 | Zhang et al. | |
| 2013/0073746 A1 | 3/2013 | Singh et al. | |
| 2013/0094538 A1 | 4/2013 | Wang | |
| 2013/0132541 A1 | 5/2013 | Falk et al. | |
| 2013/0151852 A1 | 6/2013 | Bian et al. | |
| 2013/0173621 A1* | 7/2013 | Kapoor | H04W 4/70 707/737 |
| 2013/0183932 A1 | 7/2013 | Lemilainen et al. | |
| 2013/0185368 A1 | 7/2013 | Nordstrom et al. | |
| 2013/0191897 A1 | 7/2013 | Lindteigen et al. | |
| 2013/0215467 A1 | 8/2013 | Fein et al. | |
| 2013/0272186 A1 | 10/2013 | Mohanty et al. | |
| 2013/0275957 A1 | 10/2013 | Villar et al. | |
| 2013/0309971 A1 | 11/2013 | Kiukkonen et al. | |
| 2013/0318343 A1 | 11/2013 | Bjarnason et al. | |
| 2013/0326594 A1 | 12/2013 | Hanson et al. | |
| 2013/0331127 A1 | 12/2013 | Sabatelli et al. | |
| 2014/0005810 A1 | 1/2014 | Frei et al. | |
| 2014/0029570 A1 | 1/2014 | Lee et al. | |
| 2014/0059351 A1 | 2/2014 | Braskich et al. | |
| 2014/0068719 A1 | 3/2014 | Kiukkonen et al. | |
| 2014/0093079 A1 | 4/2014 | Scott et al. | |
| 2014/0098247 A1 | 4/2014 | Rao et al. | |
| 2014/0112323 A1* | 4/2014 | Qi | H04W 48/10 370/338 |
| 2014/0143397 A1 | 5/2014 | Gutt et al. | |
| 2014/0167929 A1 | 6/2014 | Shim et al. | |
| 2014/0167931 A1 | 6/2014 | Lee et al. | |
| 2014/0171116 A1 | 6/2014 | Lamarca et al. | |
| 2014/0181683 A1 | 6/2014 | Lim et al. | |
| 2014/0207672 A1 | 7/2014 | Kelley | |
| 2014/0241354 A1 | 8/2014 | Shuman et al. | |
| 2014/0244715 A1 | 8/2014 | Hodges et al. | |
| 2014/0269476 A1 | 9/2014 | Weston et al. | |
| 2014/0280865 A1 | 9/2014 | Albertson et al. | |
| 2014/0282257 A1 | 9/2014 | Nixon et al. | |
| 2014/0289833 A1 | 9/2014 | Briceno et al. | |
| 2014/0314065 A1* | 10/2014 | Song | H04W 8/005 370/338 |
| 2014/0317242 A1 | 10/2014 | Koo et al. | |
| 2014/0324973 A1* | 10/2014 | Goel | H04W 4/70 709/204 |
| 2014/0334338 A1* | 11/2014 | Joo | H04W 4/08 370/254 |
| 2014/0351312 A1 | 11/2014 | Lu et al. | |
| 2014/0355588 A1 | 12/2014 | Cho et al. | |
| 2014/0362991 A1 | 12/2014 | Ebrom | |
| 2014/0369232 A1 | 12/2014 | Kim et al. | |
| 2015/0023183 A1 | 1/2015 | Ilsar et al. | |
| 2015/0023339 A1 | 1/2015 | Erickson et al. | |
| 2015/0026317 A1 | 1/2015 | Ilsar et al. | |
| 2015/0029880 A1 | 1/2015 | Burns et al. | |
| 2015/0055640 A1* | 2/2015 | Wang | H04W 60/00 370/338 |
| 2015/0072677 A1 | 3/2015 | Yang | |
| 2015/0089624 A1 | 3/2015 | Kim et al. | |
| 2015/0113592 A1 | 4/2015 | Curtis et al. | |
| 2015/0124968 A1 | 5/2015 | Scott et al. | |
| 2015/0133051 A1 | 5/2015 | Jamal-Syed et al. | |
| 2015/0207693 A1* | 7/2015 | Xie | H04L 63/102 709/221 |
| 2015/0223046 A1* | 8/2015 | Patil | H04W 8/005 370/254 |
| 2015/0245204 A1 | 8/2015 | Heydon | |
| 2015/0257022 A1 | 9/2015 | Kohlmann et al. | |
| 2015/0282216 A1 | 10/2015 | Reshef et al. | |
| 2015/0327052 A1 | 11/2015 | Ghai | |
| 2015/0327063 A1 | 11/2015 | Van Phan et al. | |
| 2015/0347114 A1 | 12/2015 | Yoon | |
| 2016/0007138 A1 | 1/2016 | Palanisamy et al. | |
| 2016/0036908 A1 | 2/2016 | Aggarwal et al. | |
| 2016/0044032 A1 | 2/2016 | Kim et al. | |
| 2016/0044719 A1 | 2/2016 | Sidhu et al. | |
| 2016/0055469 A1 | 2/2016 | Kim et al. | |
| 2016/0078426 A1 | 3/2016 | Kim et al. | |
| 2016/0081133 A1 | 3/2016 | Kim et al. | |
| 2016/0087838 A1 | 3/2016 | Kim et al. | |
| 2016/0087933 A1 | 3/2016 | Johnson et al. | |
| 2016/0088478 A1 | 3/2016 | Kim et al. | |
| 2016/0164831 A1 | 6/2016 | Kim et al. | |
| 2017/0359191 A1* | 12/2017 | Smith | H04L 12/2816 |

OTHER PUBLICATIONS

Garcia-Morchon, et al., "Cooperative security in distributed networks", Computer Communications vol. 36, No. 12, 2013, pp. 1284-1297 (14 pages).

Thomas, et al., "Thingies for Dummies: A smart home infrastructure for the rest of us.", 2012 (10 pages).

Jehangir, et al., "Securing Personal Network Clusters", Security and Privacy in Communications Networks and the Workshops, 2007. SecureComm 2007. Third International Conference on. IEEE, 2007., Jun. 24, 2008 (10 pages).

Yang, et al., "ICEbox: Toward Easy-to-Use Home Networking", Human-Computer Interaction—INTERACT, 2007, pp. 197-210 (14 pages).

International Search Report and Written Opinion dated Nov. 2, 2015 in International Patent Application No. PCT/US2015/045692, all pages.

International Preliminary Report dated Mar. 2, 2017 in International Patent Application No. PCT/US2015/045692, all pages.

International Search Report and Written Opinion dated Nov. 11, 2015 in International Patent Application No. PCT/US2015/048629, all pages.

Non Final Office Action dated Jan. 13, 2017 in U.S. Appl. No. 14/462,725, all pages.

Non Final Office Action dated Jun. 7, 2017 in U.S. Appl. No. 15/451,926, all pages.

Notice of Allowance dated Feb. 3, 2015 in U.S. Appl. No. 14/529,619, all pages.

Non-Final Office Action dated Sep. 25, 2015 for U.S. Appl. No. 14/529,745, 7 pages.

Notice of Allowance dated Apr. 25, 2016 in U.S. Appl. No. 14/529,745, all pages.

(56) References Cited

OTHER PUBLICATIONS

Notice of Allowance dated Aug. 14, 2015 in U.S. Appl. No. 14/479,545, all pages.
Notice of Allowance dated May 11, 2016 in U.S. Appl. No. 14/455,940, all pages.
First Action Interview Pilot Program Pre-Interview Communication dated Nov. 25, 2015 in U.S. Appl. No. 14/455,940, all pages.
First Action Interview Pilot Program Pre-Interview Communication dated May 20, 2016 in U.S. Appl. No. 14/947,001, all pages.
First Action Interview Office action Summary dated Aug. 2, 2016 in U.S. Appl. No. 14/947,001, all pages.
First Action Interview Pilot Program Pre-Interview Communication dated May 27, 2016 in U.S. Appl. No. 14/947,697, all pages.

\* cited by examiner

| New Device 1 (Light 1) | New Device 2 (Fan) | New Device 3 (Light 2) |
|---|---|---|
| on/off | fan on/off | on/off |
| fluorescent/incandescent | slow | |
| color/no color | reverse | |
| motion sensor | night light on/off | |
| dimmer | | |

2100

GROUPING OF NETWORK DEVICES

CROSS-REFERENCES TO RELATED APPLICATIONS

This application is a continuation of U.S. application Ser. No. 15/363,051, filed on Nov. 29, 2016, which is a continuation-in-part of U.S. application Ser. No. 14/947,697, filed on Nov. 20, 2015, now issued as U.S. Pat. No. 9,713,003, which is a continuation of U.S. application Ser. No. 14/455, 940, filed Aug. 10, 2014, now issued as U.S. Pat. No. 9,451,462. U.S. application Ser. No. 15/363,051 is also a continuation-in-part of U.S. application Ser. No. 14/947, 001, filed on Nov. 20, 2015, now issued as U.S. Pat. No. 9,686,682, which is a continuation of U.S. application Ser. No. 14/455,940, filed on Aug. 10, 2014, now issued as U.S. Pat. No. 9,451,462. U.S. application Ser. No. 15/363,051 is also a continuation-in-part of U.S. application Ser. No. 15/217,118, filed on Jul. 22, 2016, now abandoned, which is a continuation of U.S. application Ser. No. 14/529,745, filed on Oct. 31, 2014, now issued as U.S. Pat. No. 9,426,153, which is a continuation of U.S. application Ser. No. 14/479, 545, filed on Sep. 8, 2014, now issued as U.S. Pat. No. 9,210,192. U.S. application Ser. No. 15/363,051 is also a continuation-in-part of U.S. application Ser. No. 14/946, 348, filed on Nov. 19, 2015. U.S. application Ser. No. 15/363,051 is also a continuation-in-part of U.S. application Ser. No. 14/946,308, filed on Nov. 19, 2015, which is a continuation of U.S. application Ser. No. 14/462,725, filed on Aug. 19, 2014, now abandoned. U.S. application Ser. No. 15/363,051 is also a continuation-in-part of U.S. application Ser. No. 14/946,290, filed on Nov. 19, 2015, now issued as U.S. Pat. No. 9,820,314, which is a continuation of U.S. application Ser. No. 14/454,163, filed on Aug. 7, 2014, now issued as U.S. Pat. No. 9,814,084. U.S. application Ser. No. 15/363,051 is also a continuation-in-part of U.S. application Ser. No. 14/455,938, filed on Aug. 10, 2014, now issued as U.S. Pat. No. 9,661,058. U.S. application Ser. No. 15/363, 051 is also a continuation-in-part of U.S. application Ser. No. 14/242,806, filed on Apr. 1, 2014, now issued as U.S. Pat. No. 9,706,582. All of these applications are hereby incorporated by reference in their entireties for all purposes.

FIELD

The present disclosure relates to granting of network access to a new network device. Specifically, various techniques and systems are provided for connecting a new network device to a network and limiting access of the network device while authenticating the new network device.

BRIEF SUMMARY

Exemplary embodiments of the present invention include a computer-implemented method. The method comprises receiving information associated with one or more capabilities of the network devices on the network; analyzing the information associated with the one or more capabilities of the network devices on the network, wherein analyzing includes determining one or more capabilities common to the network devices; and generating a grouping of network devices, wherein the grouping includes network devices that share a common capability.

Alternative exemplary embodiments of the present invention include a computing device. The computing device comprises one or more processors; and a memory having instructions stored thereon, which when executed by the one or more processors, cause the computing device to perform operations. The operations include receiving information associated with one or more capabilities of the network devices on the network; analyzing the information associated with the one or more capabilities of the network devices on the network, wherein analyzing includes determining one or more capabilities common to the network devices; and generating a grouping of network devices, wherein the grouping includes network devices that share a common capability.

Alternative exemplary embodiments of the present invention include a non-transitory computer-readable storage medium having instructions stored thereon, which when executed by a computing device, cause the computing device to: receive information associated with one or more capabilities of the network devices on the network; analyze the information associated with the one or more capabilities of the network devices on the network, wherein analyzing includes determining one or more capabilities common to the network devices; and generate a grouping of network devices, wherein the grouping includes network devices that share a common capability.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Figure 1:
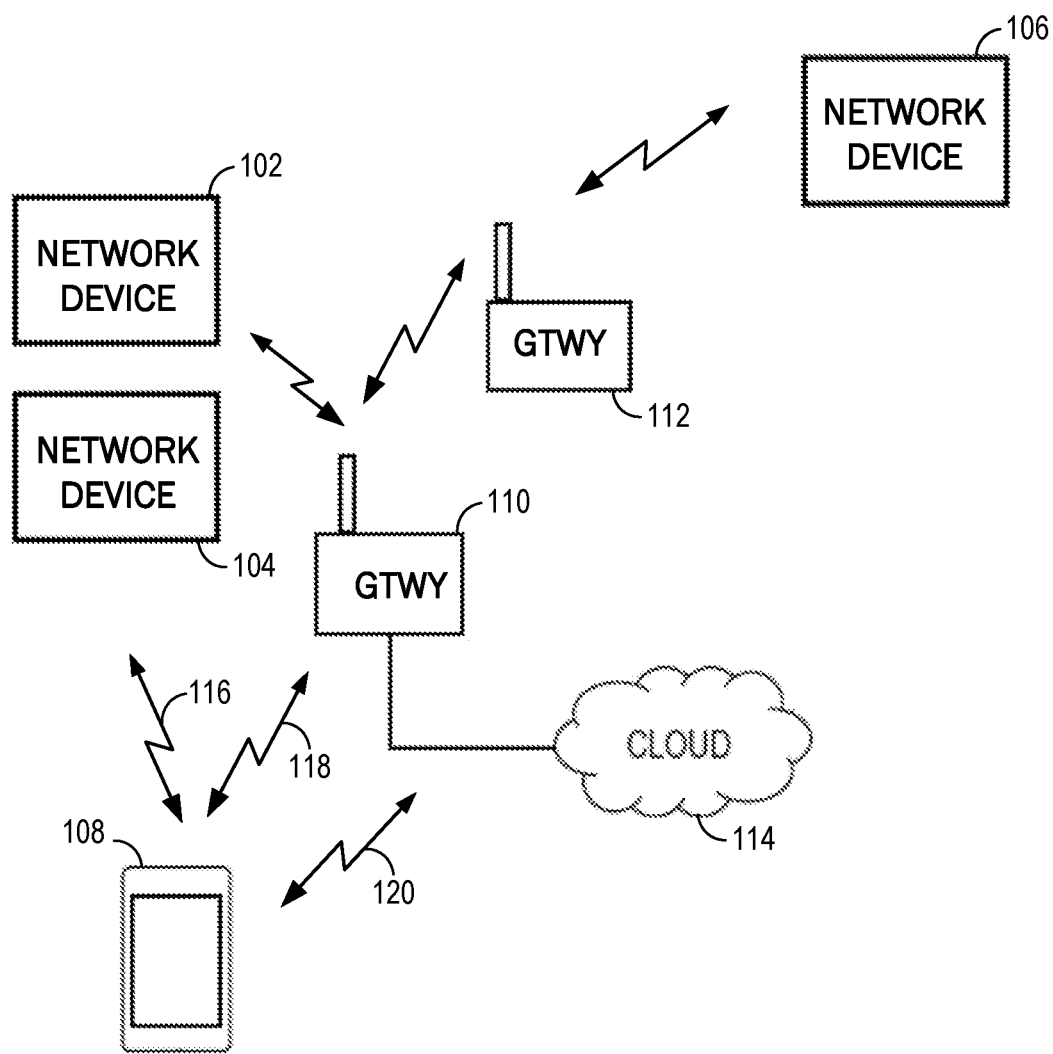
FIG. 1 illustrates an example of a wireless network environment, according to embodiments of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

A network may be set up to provide an access device user with access to various devices connected to the network. For example, a network may include one or more network devices that provide a user with the ability to remotely configure or control one or more electronic devices (e.g., appliances) within an environment that can support the network. An environment can include, for example, a home, an office, a business, an automobile, a park, or the like. A network may include one or more gateways that allow client devices (e.g., network devices, access devices, or the like) to access the network by providing wired connections and/or wireless connections using radio frequency channels in one or more frequency bands. The one or more gateways may also provide the client devices with access to one or more external networks, such as a cloud network, the Internet, and/or other wide area networks.

A local area network, such as a user's home local area network, can include multiple network devices that provide various functionalities. Network devices may be accessed and controlled using an access device and/or one or more network gateways. One or more gateways in the local area network may be designated as a primary gateway that provides the local area network with access to an external network. The local area network can also extend outside of the user's home and may include network devices located outside of the user's home. For instance, the local area network can include network devices such as exterior motion sensors, exterior lighting (e.g., porch lights, walkway lights, security lights, or the like), garage door openers, sprinkler systems, or other network devices that are exterior to the user's home. It is desirable for a user to be able to access the network devices while located within the local area network and also while located remotely from the local area network. For example, a user may access the network devices using an access device within the local area network or remotely from the local area network.

In some embodiments, a user may create an account with login information that is used to authenticate the user and allow access to the network devices. For example, once an account is created, a user may enter the login information in order to access a network device in a logical network.

In some embodiments, an accountless authentication process may be performed so that the user can access one or more network devices within a logical network without having to enter network device login credentials each time access is requested. While located locally within the local area network, an access device may be authenticated based on the access device's authentication with the logical network. For example, if the access device has authorized access to the logical network (e.g., a WiFi network provided by a gateway), the network devices paired with that logical network may allow the access device to connect to them without requiring a login. Accordingly, only users of access devices that have authorization to access the logical network are authorized to access network devices within the logical network, and these users are authorized without having to provide login credentials for the network devices.

An accountless authentication process may also be performed when the user is remote so that the user can access network devices within the logical network, using an access device, without having to enter network device login credentials. While remote, the access device may access the network devices in the local area network using an external network, such as a cloud network, the Internet, or the like. One or more gateways may provide the network devices and/or access device connected to the local area network with access to the external network. To allow accountless authentication, a cloud network server may provide a network ID and/or one or more keys to a network device and/or to the access device (e.g., running an application, program, or the like). In some cases, a unique key may be generated for the network device and a separate unique key may be generated for the access device. The keys may be specifically encrypted with unique information identifiable only to the network device and the access device. The network device and the access device may be authenticated using the network ID and/or each device's corresponding key each time the network device or access device attempts to access the cloud network server.

In some embodiments, a home local area network may include a single gateway, such as a router. A network device within the local area network may pair with or connect to the gateway and may obtain credentials from the gateway. For example, when the network device is powered on, a list of gateways that are detected by the network device may be displayed on an access device (e.g., via an application, program, or the like installed on and executed by the access device). In this example, only the single gateway is included in the home local area network (e.g., any other displayed gateways may be part of other local area networks). In some embodiments, only the single gateway may be displayed (e.g., when only the single gateway is detected by the network device). A user may select the single gateway as the gateway with which the network device is to pair and may enter login information for accessing the gateway. The login information may be the same information that was originally set up for accessing the gateway. The access device may send the login information to the network device and the network device may use the login information to pair with the gateway. The network device may then obtain the credentials from the gateway. The credentials may include a service set identification (SSID) of the home local area network, a media access control (MAC) address of the gateway, and/or the like. The network device may transmit the credentials to a server, such as a cloud network server. In some embodiments, the network device may also send to the server information relating to the network device (e.g., MAC address, serial number, or the like) and/or information relating to the access device (e.g., MAC address, serial number, application unique identifier, or the like).

The cloud network server may register the gateway as a logical network and may assign the first logical network a network identifier (ID). The cloud network server may further generate a set of security keys, which may include one or more security keys. For example, the server may generate a unique key for the network device and a separate unique key for the access device. The server may associate the network device and the access device with the logical network by storing the network ID and the set of security keys in a record or profile. The cloud network server may then transmit the network ID and the set of security keys to the network device. The network device may store the network ID and its unique security key. The network device may also send the network ID and the access device's unique security key to the access device. The network device and the access device may then communicate with the cloud server using the network ID and the unique key generated for each device. Accordingly, the user may remotely access the network device via the cloud network without logging in each time access is requested. Also, the network device can communicate with the server regarding the logical network.

In some embodiments, a local area network may include multiple gateways (e.g., a router and a range extender) and multiple network devices. For example, a local area network may include a first gateway paired with a first network device, and a second gateway paired with a second network device. In the event credentials for each gateway are used to create a logical network, a server (e.g., a cloud network server) may register the first gateway as a first logical network and may register the second gateway as a second logical network. The server may generate a first network ID and a first set of security keys for the first logical network. The first set of security keys may include a unique security key for the first network device and a unique security key for the access device for use in accessing the first network device on the first logical network. The server may register the second gateway as the second logical network due to differences in the credentials between the first gateway and second gateway. The server may assign the second gateway a second network ID and may generate a second set of security keys. For example, the server may generate a unique security key for the second network device and may generate a unique security key for the access device for use in accessing the second network device on the second logical network. The server may associate the first network device and the access device with the first logical network by storing the first network ID and the first set of security keys in a first record or profile. The server may also associate the second network device and the access device with the second logical network by storing the second network ID and the second set of security keys in a record or profile. The server may then transmit the first network ID and the first set of security keys to the first network device, and may transmit the second network ID and the second set of security keys to the second network device. The two network devices may store the respective network ID and set of security keys of the gateway with which each network device is connected. Each network device may send the respective network ID and the access device's unique security key to the access device. The network devices and the access device may then communicate with the cloud server using the respective network ID and the unique key generated for each device.

Accordingly, when multiple gateways are included in the home local area network, multiple logical networks associated with different network identifiers may be generated for the local area network. When the access device is located within range of both gateways in the local area network, there is no problem accessing both network devices due to the ability of the access device to perform local discovery techniques (e.g., universal plug and play (UPnP)). However, when the user is located remotely from the local area network, the access device may only be associated with one logical network at a time, which prevents the access device from accessing network devices of other logical networks within the local area network.

FIG. 1 illustrates an example of a local area network 100. The local area network 100 includes network device 102, network device 104, and network device 106. In some embodiments, any of the network devices 102, 104, 106 may include an Internet of Things (IoT) device. As used herein, an IoT device is a device that includes sensing and/or control functionality as well as a WiFi™ transceiver radio or interface, a Bluetooth™ transceiver radio or interface, a Zigbee™ transceiver radio or interface, an Ultra-Wideband (UWB) transceiver radio or interface, a WiFi-Direct transceiver radio or interface, a Bluetooth™ Low Energy (BLE) transceiver radio or interface, and/or any other wireless network transceiver radio or interface that allows the IoT device to communicate with a wide area network and with one or more other devices. In some embodiments, an IoT device does not include a cellular network transceiver radio or interface, and thus may not be configured to directly communicate with a cellular network. In some embodiments, an IoT device may include a cellular transceiver radio, and may be configured to communicate with a cellular network using the cellular network transceiver radio. The network devices 102, 104, 106, as IoT devices or other devices, may include home automation network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In some embodiments, network devices 102, 104, 106 may be used in other environments, such as a business, a school, an establishment, a park, or any place that can support the local area network 100 to enable communication with network devices 102, 104, 106. For example, a network device can allow a user to access, control, and/or configure devices, such as office-related devices (e.g., copy machine, printer, fax machine, or the like), audio and/or video related devices (e.g., a receiver, a speaker, a projector, a DVD player, a television, or the like), media-playback devices (e.g., a compact disc player, a CD player, or the like), computing devices (e.g., a home computer, a laptop computer, a tablet, a personal digital assistant (PDA), a computing device, a wearable device, or the like), lighting devices (e.g., a lamp, recessed lighting, or the like), devices associated with a security system, devices associated with an alarm system, devices that can be operated in an automobile (e.g., radio devices, navigation devices), and/or the like.

A user may communicate with the network devices 102, 104, 106 using an access device 108. The access device 108 may include any human-to-machine interface with network connection capability that allows access to a network. For example, the access device 108 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device e.g., a television, a refrigerator, a security system, a game console, a browser, or the like), a speech or gesture interface (e.g., a Kinect™ sensor, a Wiimote™, or the like), an IoT device interface (e.g., an Internet enabled device such as a wall switch, a control interface, or the like), or the like. In some embodiments, the access device 108 may include a cellular or other broadband network transceiver radio or interface, and may be configured to communicate with a cellular or other broadband network using the cellular or broadband network transceiver radio. In some embodiments, the access device 108 may not include a cellular network transceiver radio or interface. While only a single access device 108 is shown in FIG. 1, one of ordinary skill in the art will appreciate that multiple access devices may communicate with the network devices 102, 104, 106. The user may interact with the network devices 102, 104, or 106 using an application, a web browser, a proprietary program, or any other program executed and operated by the access device 108. In some embodiments, the access device 108 may communicate directly with the network devices 102, 104, 106 (e.g., communication signal 116). For example, the access device 108 may communicate directly with network device 102, 104, 106 using Zigbee™ signals, Bluetooth™ signals, WiFi™ signals, infrared (IR) signals, UWB signals, WiFi-Direct signals, BLE signals, sound frequency signals, or the like. In some embodiments, the access device 108 may communicate with the network devices 102, 104, 106 via the gateways 110, 112 (e.g., communication signal 118) and/or the cloud network 114 (e.g., communication signal 120).

The local area network 100 may include a wireless network, a wired network, or a combination of a wired and wireless network. A wireless network may include any wireless interface or combination of wireless interfaces (e.g., Zigbee™, Bluetooth™, WiFi™, IR, UWB, WiFi-Direct, BLE, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various routers, access points, bridges, gateways, or the like, to connect devices in the local area network 100. For example, the local area network may include gateway 110 and gateway 112. Gateway 110 or 112 can provide communication capabilities to network devices 102, 104, 106 and/or access device 108 via radio signals in order to provide communication, location, and/or other services to the devices. The gateway 110 is directly connected to the external network 114 and may provide other gateways and devices in the local area network with access to the external network 114. The gateway 110 may be designated as a primary gateway. While two gateways 110 and 112 are shown in FIG. 1, one of ordinary skill in the art will appreciate that any number of gateways may be present within the local area network 100.

The network access provided by gateway 110 and gateway 112 may be of any type of network familiar to those skilled in the art that can support data communications using any of a variety of commercially-available protocols. For example, gateways 110, 112 may provide wireless communication capabilities for the local area network 100 using particular communications protocols, such as WiFi™ (e.g., IEEE 802.11 family standards, or other wireless communication technologies, or any combination thereof). Using the communications protocol(s), the gateways 110, 112 may provide radio frequencies on which wireless enabled devices in the local area network 100 can communicate. A gateway may also be referred to as a base station, an access point, Node B, Evolved Node B (eNodeB), access point base station, a Femtocell, home base station, home Node B, home eNodeB, or the like.

The gateways 110, 112 may include a router, a modem, a range extending device, and/or any other device that provides network access among one or more computing devices and/or external networks. For example, gateway 110 may include a router or access point, and gateway 112 may include a range extending device. Examples of range extending devices may include a wireless range extender, a wireless repeater, or the like.

A router gateway may include access point and router functionality, and may further include an Ethernet switch and/or a modem. For example, a router gateway may receive and forward data packets among different networks. When a data packet is received, the router gateway may read identification information (e.g., a media access control (MAC) address) in the packet to determine the intended destination for the packet. The router gateway may then access information in a routing table or routing policy, and may direct the packet to the next network or device in the transmission path of the packet. The data packet may be forwarded from one gateway to another through the computer networks until the packet is received at the intended destination.

A range extending gateway may be used to improve signal range and strength within a local area network. The range extending gateway may receive an existing signal from a router gateway or other gateway and may rebroadcast the signal to create an additional logical network. For example, a range extending gateway may extend the network coverage of the router gateway when two or more devices on the local area network need to be connected with one another, but the distance between one of the devices and the router gateway is too far for a connection to be established using the resources from the router gateway. As a result, devices outside of the coverage area of the router gateway may be able to connect through the repeated network provided by the range extending gateway. The router gateway and range extending gateway may exchange information about destination addresses using a dynamic routing protocol.

The gateways 110 and 112 may also provide the access device 108 and the network devices 102, 104, 106 with access to one or more external networks, such as the cloud network 114, the Internet, and/or other wide area networks. The cloud network 114 may include a cloud infrastructure system that provides cloud services. In certain embodiments, services provided by the cloud network 114 may include a host of services that are made available to users of the cloud infrastructure system on demand, such as registration and access control of network devices 102, 104, 106. Services provided by the cloud infrastructure system can dynamically scale to meet the needs of its users. The cloud network 114 may comprise one or more computers, servers, and/or systems. In some embodiments, the computers, servers, and/or systems that make up the cloud network 114 are different from the user's own on-premises computers, servers, and/or systems. For example, the cloud network 114 may host an application, and a user may, via a communication network such as the Internet, on demand, order and use the application.

In some embodiments, the cloud network 114 may host a Network Address Translation (NAT) Traversal application in order to establish a secure connection between the cloud network 114 and one or more of the network devices 102, 104, 106. For example, a separate secure Transmission Control Protocol (TCP) connection may be established by each network device 102, 104, 106 for communicating between each network device 102, 104, 106 and the cloud network 114. In some embodiments, each secure connection may be kept open for an indefinite period of time so that the cloud network 114 can initiate communications with each respective network device 102, 104, or 106 at any time. In some cases, other types of communications between the cloud network 114 and the network devices 102, 104, 106 and/or the access device 108 may be supported using other types of communication protocols, such as a Hypertext Transfer Protocol (HTTP) protocol, a Hypertext Transfer Protocol Secure (HTTPS) protocol, or the like. In some embodiments, communications initiated by the cloud network 114 may be conducted over the TCP connection, and communications initiated by a network device may be conducted over a HTTP or HTTPS connection. In certain embodiments, the cloud network 114 may include a suite of applications, middleware, and database service offerings that are delivered to a customer in a self-service, subscription-based, elastically scalable, reliable, highly available, and secure manner.

It should be appreciated that the local area network 100 may have other components than those depicted. Further, the embodiment shown in the figure is only one example of a local area network that may incorporate an embodiment of the invention. In some other embodiments, local area network 100 may have more or fewer components than shown in the figure, may combine two or more components, or may have a different configuration or arrangement of components.

Figure 2:
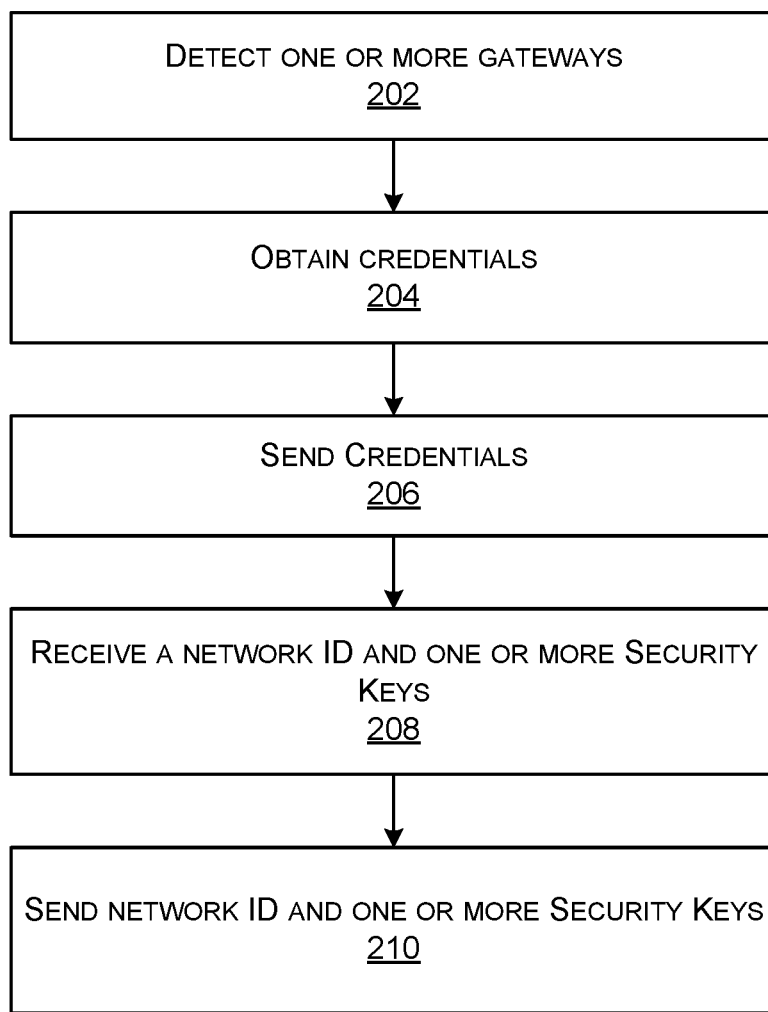
FIG. 2 is a flowchart illustrating an embodiment of a process for registering one or more network devices, according to embodiments of the present invention.

Upon being powered on or reset, the network devices 102, 104, 106 may be registered with the cloud network 114 and associated with a logical network within the local area network 100. FIG. 2 illustrates an example of a process 200 for registering one or more network devices, such as the network devices 102, 104, 106 illustrated in FIG. 1. When multiple network devices 102, 104, 106 and gateways 110, 112 are included within a local area network, the network devices and/or gateways may be installed at different times, resulting in the techniques described with respect to FIG. 2 possibly occurring for each network device and/or gateway at different points in time. For example, a user may install network device 102 at a first point in time on a first floor of the user's house. Gateway 110 may also be located on the first floor, resulting in the network device 102 pairing with gateway 110. The user may later install gateway 112 and network device 106 on a second floor of the user's home, resulting in the network device 106 pairing with gateway 112.

At 202, a network device may detect one or more gateways upon being powered on or reset. In some embodiments, a provisioning process may occur when the network device is powered on or reset and detected by an access device (e.g., access device 108). During the provisioning process, the access device may directly communicate with the network device. In some embodiments, direct communication between network devices (e.g., network devices 102, 104, 106) and access device (e.g., access device 108) may occur using various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like.

The provisioning process may include pairing the network device with a gateway and registering the gateway, network device, and access device with a server, such as a server located within the cloud network 114. For example, upon being powered on or reset to factory settings, the network device may send or broadcast identification information to one or more access devices. The identification information may be sent during a discovery process. For example, the identification information may be sent in response to a discovery request from an access device. In some cases, the identification information may include a name of the network device.

An application, program, or the like that is installed on and executed by the access device may receive the identification information from the network device. When the application on the access device is launched by a user, the access device may display the identification information for selection by the user. Once the network device identification information is selected, the access device may send a signal to the network device indicating that it has been selected. The network device may then send to the access device a list of gateways that are detected by the network device. The access device may receive and display the list of gateways. In some embodiments, the list of gateways includes multiple gateways (e.g., gateways 110 and 112) that are located within the local area network. The user may select the gateway that the user wishes for the network device to pair. For example, the gateway that provides the best signal strength for the network device may be selected. The access device may then prompt the user to enter login information that is required for accessing the network signals provided by the selected gateway. For example, the login information may be the same information that was originally set up to access the gateway network signals (e.g., when the gateway was initially installed). Once entered, the access device may send the login information to the network device. The network device may use the login information to pair with the selected gateway. As one example, network device 102 and network device 104 may be paired with gateway 110, and network device 106 may be paired with gateway 112.

Once paired with a gateway, the network device may be registered with a cloud network (e.g., cloud network 114). For example, the access device (e.g., via the application, program, or the like) may instruct the network device to register with the cloud network upon receiving confirmation from the network device that it has been successfully paired with a gateway. At 204, the network device may obtain credentials from the gateway as part of the registration process. For example, network device 102 may obtain credentials from gateway 110. At a same or later point in time, network devices 104 and 106 may obtain credentials from gateways 110 and 112, respectively. In some embodiments, the credentials may include a SSID of the local area network and a MAC address of the gateway. An SSID received from two gateways (e.g., gateways 110, 112) may be the same due to the gateways both being within the same local area network. In some cases, the SSID of the two gateways may be different. The MAC address of each of the gateways may be unique to each gateway. As a result of each gateway having a unique MAC address, the credentials obtained from a gateway may be unique to that particular gateway. One of ordinary skill in the art will appreciate that other credentials may be obtained from a gateway, such as an Internet Protocol address, or the like.

The network device may then send the gateway credentials to the cloud network at 206. For example, the network devices 102, 104, 106 may send credentials for the gateway with which each is paired to the server located within the cloud network 114. For example, network device 102 may transmit the credentials obtained from gateway 110 to the server, and network device 106 may transmit the credentials obtained from gateway 112 to the server. In some embodiments, the network device may also send information relating to the network device (e.g., MAC address, serial number, make, model number, firmware version, and/or an interface module identifier, or the like) to the server, and/or information relating to the access device (e.g., MAC address, serial number, application unique identifier, or the like) to the server. In some embodiments, the communication of the credentials, the network device information, and/or the access device information sent from the network device to the cloud network server may be in a Hypertext Transfer Protocol (HTTP) format, a Hypertext Transfer Protocol Secure (HTTPS) format, a secure Transmission Control Protocol (TCP) format, or the like. One of ordinary skill in the art will appreciate that other communication formats may be used to communicate between the network device and the cloud network server.

Once the credentials, network device information, and/or access device information are received by the server, the server may register each gateway as a logical network within the local area network and may generate a network ID for each logical network. For example, the server may register the gateway 110 as a first logical network. During the registration process, the server may generate a first network ID for identifying the first logical network. As noted above, one of ordinary skill in the art will appreciate that any number of gateways may be present within the local area network, and thus that any number of logical networks may be registered for the local area network. The server may further generate a first set of security keys for authenticating the network device and the access device. For example, the server may generate a unique key for the network device 102 and a separate unique key for the access device 108.

In some embodiments, as previously described, network device 104 may also be paired with gateway 110 at the same or a later point in time as the network device 102. During registration of the network device 104, the server may determine that the access device 108 has already been registered with another network device (e.g., network device 102) that is associated with the same logical network of gateway 110. In such embodiments, the server may retrieve the first network ID that was used in registering the first logical network. The server may also generate a new unique security key for the network device 104, and may retrieve the unique key that was previously generated for the access device 108 when registering the gateway 110 as the first logical network.

The gateway 112 may also be registered by the server as a second logical network with a second network ID. A second set of security keys may be generated for the network device 106 and the access device 108. For example, the server may generate a unique security key for the network device 106 and a unique security key for the access device 108 as it relates to the second logical network. In some embodiments, the gateway may 112 be installed at a later point in time after the gateway 110 is installed, and thus may be registered as the second logical network at the later point in time.

A record or profile may then be created for associating each network ID with the credentials of a corresponding gateway, the corresponding network device(s), and the access device. For example, the server of the cloud network 114 may associate the first network ID with the credentials of gateway 110. Similarly, the server may associate the second network ID with the credentials of gateway 112. In some embodiments, the server performs the association by generating and storing a record including the network ID, the set of security keys, the gateway credentials, the network devices associated with the network ID (e.g., MAC address or serial number of a network device), the access devices associated with the network ID (e.g., MAC address, serial number, application unique identifier, or the like), and/or any other information relevant to the network devices and/or gateways. For example, the server may store the first network ID and the first set of security keys in a first record at a first memory space (e.g., in Flash, DRAM, a database, or the like) along with the SSID and MAC address for gateway 110 and an identifier of the network devices 102 and/or 104. The server may also store the second network ID and the second set of security keys in a second record at a second memory space along with the SSID and MAC address for gateway 112 and an identifier of the network device 106. In some embodiments, an example of a network device identifier may include a MAC address of the network device, a serial number of the network device, or any other unique identifier.

Each of the first and second network IDs may include a unique number or alphanumeric string generated sequentially or randomly. For example, the first time a network device and an associated gateway are registered on the cloud network 114, the unique network ID for the logical network of the gateway may start with 7000000. Each subsequent logical network that is created may be a sequential increment of the initial network ID (e.g., 7000001, 7000002, 7000003, etc.). As another example, the network ID may be generated by a random or pseudo-random number generator. One of ordinary skill in the art will appreciate that other techniques for generating a unique ID may be used. The technique used to generate the network IDs may be dependent on a type of database that is included in the cloud network 114. For example, different databases may have different proprietary mechanisms for creating a unique identifier.

The set of keys generated for each logical network may be generated using database specific technique. For example, a MySQL technique may be used to generate the sets of keys. Each key may include a universally unique identifier (UUID) or a globally unique identifier (GUID). As described above, for each logical network, the server may generate a unique key for a network device and a separate unique key for an access device.

At 208, the network device may receive the network ID and the set of security keys. For example, once the server has generated a record or profile associating the network device 102 with the first logical network, the server may transmit the first network ID and the first set of security keys to the network device 102. The network device 102 may store the first network ID and one or more keys of the first set of keys. For example, the network device 102 may store the unique security key that was created by the server for the network device 102.

As noted previously, the network devices 102, 104, 106 and gateways 110, 112 may be installed at different times. For example, in some embodiments, network device 104 may be installed at a point in time after the first logical network is created based on the pairing between gateway 110 and network device 102. In such embodiments, upon being powered on, the network device 104 may pair with gateway 110, obtain credentials from gateway 110, and transmit the credentials to the server in the cloud network 114 using similar techniques as those described above. The server may associate the network device 104 with the previously generated first network ID. As described above, the server may also generate a new unique security key for the network device 104, and may retrieve the unique key that was previously generated for the access device 108 when registering the first logical network. The network device 104 may then receive and store the first network ID and the security keys from the server.

At 210, the network device may send the network ID and the set of security keys to the access device. For example, the network device 102 may send to the access device 108 the first network ID and the unique security key generated for the access device 108. The network device 102 and the access device 108 may then communicate with the cloud network server using the first network ID and each device's unique key. In some embodiments, the network device and the access device may generate a signature using their respective security key. The signature is sent to the cloud network server along with a communication from the network device or access device. The cloud network server may process the signature in order to authenticate each device, as described below. The network device and access device may use different techniques to generate a signature.

A network device may generate a signature using its uniquely generated security key. For example, the signature may be expressed as: Authorization=MacAddress":"Signature":"ExpirationTime. The Authorization term may be an attribute, and the MacAddress, Signature, and ExpirationTime terms may include values for the Authorization attribute. In particular, the MacAddress value may include the MAC address of the network device, which may include a unique alphanumeric or numeric string. The network device may retrieve its MAC address from memory and place it in the MacAddress field. The Signature value may be expressed as: Signature=Base64(HMAC-SHA1(PrivateKey, StringToSign)). The Signature value may include an alphanumeric or numeric string. HMAC-SHA1 is an open source technique that includes a Hash-based Message Authentication Code (HMAC) using a SHA1 hash function. The HMAC-SHA1 technique uses the values PrivateKey and StringToSign as inputs. The PrivateKey input includes the unique security key that was generated by the server for the network device. The StringToSign input may be expressed as StringToSign=MacAddress+"\n"+SerialNumber+"\n"+ExpirationTime. Accordingly, the StringToSign input is generated by appending a serial number of the network device and an expiration time to the network device's MAC address. The ExpirationTime term may indicate the period of time for which the signature is valid. In some embodiments, the ExpirationTime term may include a current time at which the signature is generated plus period of time for which the signature is valid. In one example, the ExpirationTime term may be expressed as ExpirationTime=Number of seconds since Jan. 1, 1970.

The network device may place the signature in a data packet for transmission with a communication signal to the cloud network server. The network device may also place the network ID in the data packet. The signature and the network ID, if included, may be used by the cloud network server to verify that the network device is associated with the logical network. In some embodiments, a signature is provided with each communication sent from the network device to the server. Once the signature is received by the server, the server generates a signature using the same expression as that used by the network device. For example, the server may retrieve the network device's key and other relevant information from storage and generate the signature using the key and the other information using the expression described above. The server then verifies whether the signatures match. Upon determining that the signatures match, the server authenticates the network device's communication.

An access device may also generate a signature using its uniquely generated security key. For example, the access device signature may be expressed as: Authorization=SDU UniqueId":"Signature":"ExpirationTime. The Authorization term may be an attribute, and the SDU UniqueId, Signature, and ExpirationTime terms may include values for the Authorization attribute. The SDU UniqueId term may include a unique phone identifier. The SDU UniqueId value may depend on the type of access device that is used and the type of values that may be accessed and/or generated by the type of access device. In some cases, one type of access device may not allow an application to access a unique identifier of the access device (e.g., a serial number, UUID, or the like). In such cases, the SDU UniqueId value may include a value generated by an application or program installed on and executed on the access device that is used to access the network device. The value may be unique to the application or program that generated the value. In other cases, another type of access device may allow an application to access a unique identifier of the access device. In such cases, the SDU UniqueId value may include a value that is unique to the access device itself, such as a serial number, UUID, or the like. In this example, the access device may retrieve the unique value from storage within the access device. One of ordinary skill in the art will appreciate that other unique identifiers may be used to uniquely identify the access device. The Signature value may be expressed as: Signature=Base64(HMAC-SHA1(PrivateKey, StringToSign)). Using this expression, the input to the HMAC-SHA1 technique may include a PrivateKey term and a StringToSign term. The PrivateKey input includes the unique security key that was generated by the server for the access device with regard to a particular logical network. The StringToSign input may be expressed as StringToSign=UniqueId+"\n"+"\n"+Expiration Time. The StringToSign value is different from the StringToSign value generated by network device in that no serial number is included. Accordingly, the StringToSign input is generated by appending an expiration time to the access device's unique identifier. The ExpirationTime term may indicate the period of time for which the signature is valid, similar to that above for the signature generated by the network device.

The access device may place the signature in a data packet and may transmit the data packet to the cloud network server with a communication signal. The network device may also place the network ID in the data packet. The signature and the network ID, if included, may be used by the cloud network server to verify that the access device is associated with the logical network and authorized to communicate with one or more network devices associated with the logical network. In some embodiments, a signature is provided with each communication sent from the access device to the server. The cloud server may receive the signature and may generate a signature using the same expression as that used by the access device. For example, the server may retrieve the access device's key and other relevant information from storage and generate the signature using the key and the other information using the expression described above. The server then verifies whether the signatures match. Upon determining that the signatures match, the server authenticates the access device and allows it to communicate with one or more of the network devices associated with logical network.

Once the provisioning process is completed, the access device 108 may access the network device 102 locally via the gateway 110 (e.g., communication signal 118) or remotely via the cloud network 114 (e.g., communication signal 120). In some embodiments, the communication between the access device 108 and the cloud network 114 may be a HTTP or HTTPS communication. One of ordinary skill in the art will appreciate that other communication mechanisms may be used to communicate between the access device 108 and the cloud network 114.

The network 100 may enable a user to monitor and/or control operation of the devices 102 and 104. For example, a user may monitor and/or control operation of devices by interacting with a visual interface of the gateway 110 (i.e., a web page for gateway 110) and/or a visual interface rendered on a display of an access device, such as access device 108. In some embodiments, an application may be run on the access device. The application may cause the access device to present a graphical interface that includes a visual interface for each device accessible on the network 100.

A network device may generate and/or provide a "status" of the network device. In certain embodiments, the status or state of a network device can be indicated on a visual interface on the access device, for example within the tile with text and/or graphically. The status of the network device can change based on time (e.g., a period, an interval, or other time schedule). The status of a network device may be any piece of information pertinent to that particular network device. The status of a network device may be any changeable variable of that particular network device. For example, the status of a network device may include a state of the-network device itself (e.g., on or off) or how the network device is situated within the network with respect to the other network and other network devices throughout the network. For example, the status of a network device may refer to the network device's proximity to another network device and/or its ability to communicate with another network device because of the relative signal strength between the two network devices. In certain embodiments, the status can include a value or some other information indicating a unit of measure for a setting or an attribute related to operation of a device connected to the network device. The setting or the attribute can be adjustable within a range of values. For example, the device connected to the network device can be a light bulb and the status can include a value corresponding to brightness (e.g., a percentage of total brightness) emitted by the light bulb when the light bulb is powered-on. In another example, the device can be a motion sensor and the status can include a value corresponding to sensitivity of the sensor in a range of values between 0 to 100 when the sensor is powered-on. In yet another example, the device can be a fan and the status can include a value corresponding to a speed of the fan on a scale of 0 to 100 when the fan is powered-on.

As described above, upon being powered on or reset, the-network devices 102 and/or 104 may be registered with the cloud network 114 and associated with a logical network within the local area network 100. Similarly, upon being powered or switched off or otherwise being disconnected from the network 100, the status of the-network device 102 would be known and stored by a cache (not shown) associated with the network 100. For example, cloud network 114 may include storage (e.g. cache) that stores the status of the network devices within each local area network 100 it is connected to and/or provides access to. In another example, the gateway 110 may include storage that stores the status of the network devices within each local area network it is connected to and/or provides access to. More specifically, the status stored in the cache may include a status table which indicates the current status of each network device (as of its last communication with each network device). A status table may include all statuses of each-network device, or individual storage tables for each local area network or other subset of its network devices/networks. In one embodiment, a change in status may prompt the-network device to push its change in in status to the cloud network 114 for storage or updating of the cloud's stored status table. In another embodiment, cloud network 114 and/or gateway 110 may continuously (or periodically) communicate with each-network device to check to see if its status has changed.

In some embodiments, a network device (e.g. network device 102 and/or 104) may, upon connecting to the local area network 100, check the status of the-network devices on the network 100. In other embodiments, one-network device may check the status of one or more of the other network devices on the network 100. The network device may seek to check the status of another network device or access device for various reasons, including to display such status(es) to a user on a display or otherwise, to check whether that network device belongs to the same network, to synchronize or coordinate any scheduled executions, to update an attribute based on adjustment received among others. For example, a network device or user may desire to check various statuses on a connected device, such as power level, timestamped activity history (e.g. temperature for a thermostat, motion for a motion detector, etc.), how long it has been active/turned on, attributes for operation of the connected device (e.g., a brightness of a lamp, a speed of a fan, or a sensitivity of a sensor, etc.), among many others.

In some embodiments, a device, such as the access device 108 shown in FIG. 1 or the gateway 110, connected to the network 100 can communicate an updated status of a network device, such as the network devices 102 and/or 104. The updated status can be communicated via the network 100 and can include an adjustment that affects a status of the network device. The adjustment can include an amount of change to one or more attributes, one or more settings, or a combination thereof related to operation of the network device connected to the network 100. The access device 108 or the gateway 110 can present a graphical interface that can receive input corresponding to an adjustment to a status of a device. In some embodiments, the updated status of the network device communicated to the network 100 can be received by a network device to which the updated status applies, or can be received by the gateway 110, the cloud network 110, or any other device in communication with the network. If the device cannot directly receive the updated status, it can also receive the updated status from the cloud network 114, the gateway 110, or the other devices in the network 100. In some embodiments, the network device can communicate its updated status to the network 100, which can indicate whether the status has been updated. The updated status can be received by the access device or any other device in the network 100. In some embodiments where the access device is not located within the network 100, the access device may not immediately receive the updated status. The updated status can be stored by the cloud network 114 or the gateway 110 for communication to the access device. The status of the network device can indicate whether an adjustment was made based on an adjustment in a setting or an attribute transmitted by the access device. Alternatively, or additionally, the access device can receive, from any other network device connected to the network 100, a status update indicating whether the adjustment was in fact made at a network device.

A network device seeking to check the status of any other device on the network 100 may communicate with the cloud network 114, to which all devices on the network 100 are connected either directly or indirectly. Since the cloud network 114 and/or the gateway 110 can store an updated table/list of the statuses of each of the network devices 102 and 104 within the requesting network's local area network, the cloud network 114 and/or gateway 110 may communicate such status data to the network devices 102 and 104 and the access device. For example, if-network devices 102 and 104 were to each turn on and communicate their statuses to cloud network 114, cloud network 114 may analyze the status of network devices 102 and 104 and communicate to-network devices 102 and 104 that they are each connected to the same local area network 100.

Figure 3:
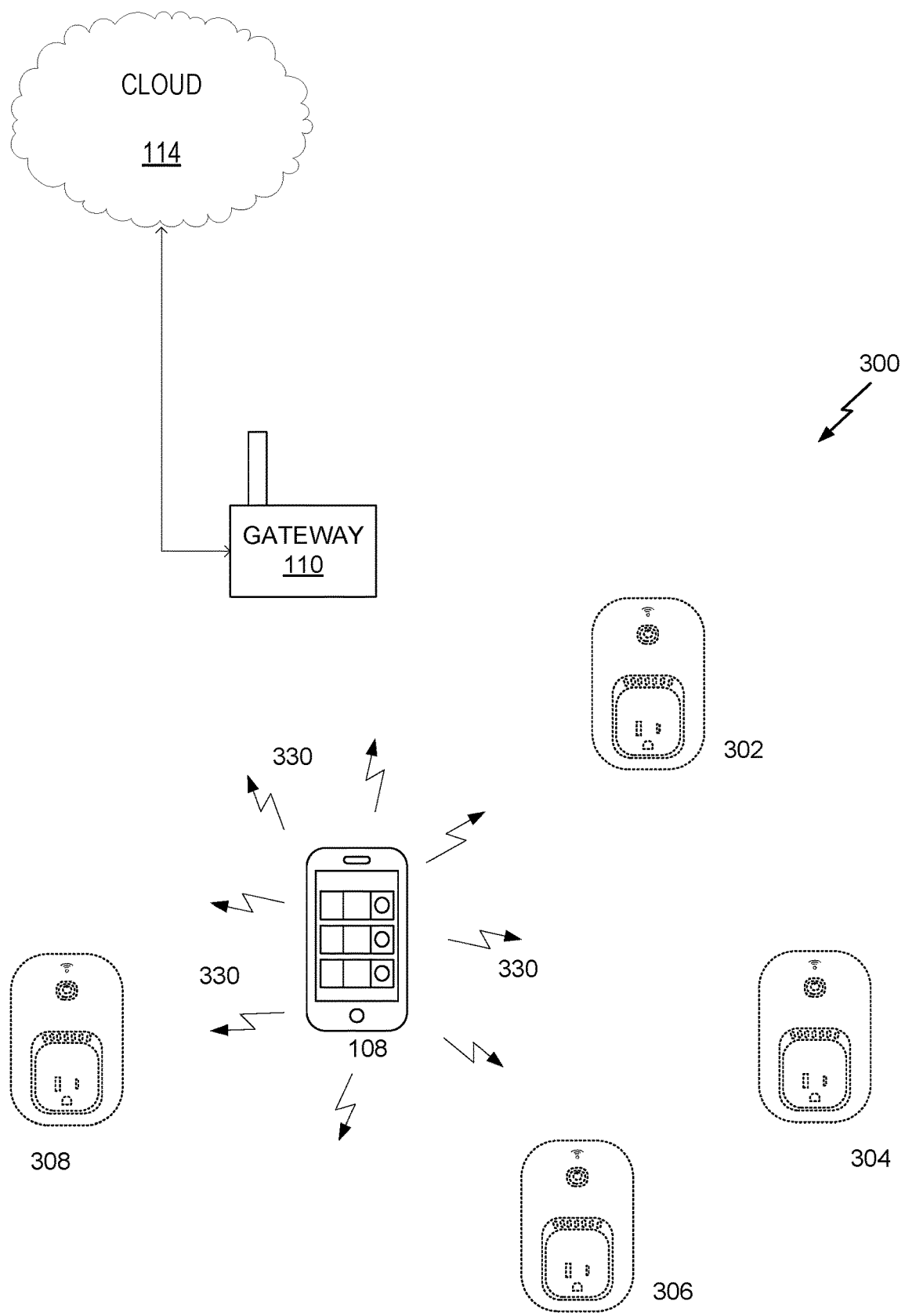
FIG. 3 illustrates an example of a network environment, according to embodiments of the present invention.

FIG. 3 illustrates an example of a network 300, according to embodiments of the present invention. Specifically, the network 300 can be a wireless local area network enabling an access device to communicate with network devices to control adjustment of attributes related to operation of the network devices. Network 300 includes network device 302, network device 304, network device 306, and network device 308. The network 300 also includes access device 108. In other words, the network 300 may be substantially similar to the network 100 except that access device 108 has been turned on near the network 300, to which it is associated, or has entered an area to which the network 300 can reach.

When access device 108 can enter the network 300 as shown in FIG. 3, access device 108 may be authenticated based on the access device's authentication with the logical network or may otherwise commence communication with cloud network 114. Access device 108 may also communicate notification of its presence or other information directly to other network devices 302-308 within network 300, as shown in FIG. 3 by communication paths 330. As noted, such communication may include various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like. For example, access device 108 may communicate to all other devices in network 300, including network device 302, network device 304, network device 306, and network device 308, information/data regarding its status. Such status data may include the fact that it is present and turned on, or other status data/information. At any time that network devices 302, 304, 306 and 308 recognize that access device 108 is present at network 300, the network devices may communicate back to access device 108. For example, the network devices may send an acknowledgement (e.g., ACK signal) back to access device 108 to confirm that they received the status data sent by access device 108. The network devices may also send their own status data to access device 108.

While network devices 302-308 and access device 108 may each receive communication from other network devices around the network 300, including the status of each of those network devices, network devices 302-308 and/or access device 108 may be continuously scanning network 300 (including, for example, running discovery algorithms) to determine whether any devices within the network have moved, turned on/off or otherwise added to or subtracted from the network 300, or have otherwise changed statuses.

Since network devices 302-308 and access device 108 may each receive communication from other devices around network 300, including the status of each of those devices, each network device within network 300 may know the status of each other network device in the network 300. For example, access device 108 or devices 302-308 may not be required to communicate with cloud network 114 in order to obtain one or more of such statuses. Since cloud network 114 is an external network and may be remote from network 300, communication between network devices within the network 300 and cloud 114 may take more time than communication between two devices within network 300. For example, communication between devices within network 300 may take anywhere from 1 millisecond to 100 milliseconds, while communication between a device within network 300 and the cloud network 114 may take anywhere from 50 milliseconds to 1 second or more). Furthermore, if a network device is retrieving information from cloud 114, the request must travel from the network device to cloud network 114, and then the information must travel back from cloud network 114 to the network device. This process may double the latency caused by retrieving information with cloud 114. Therefore, devices within the network 300 may choose to send and receive/retrieve statuses directly with other devices within the network 300 instead of communicating such information via cloud network 114. When a network device receives status data from another network device on the device's local area network 300, it may store that status data so that it may retrieve and use that status data at a later time.

Figure 4:
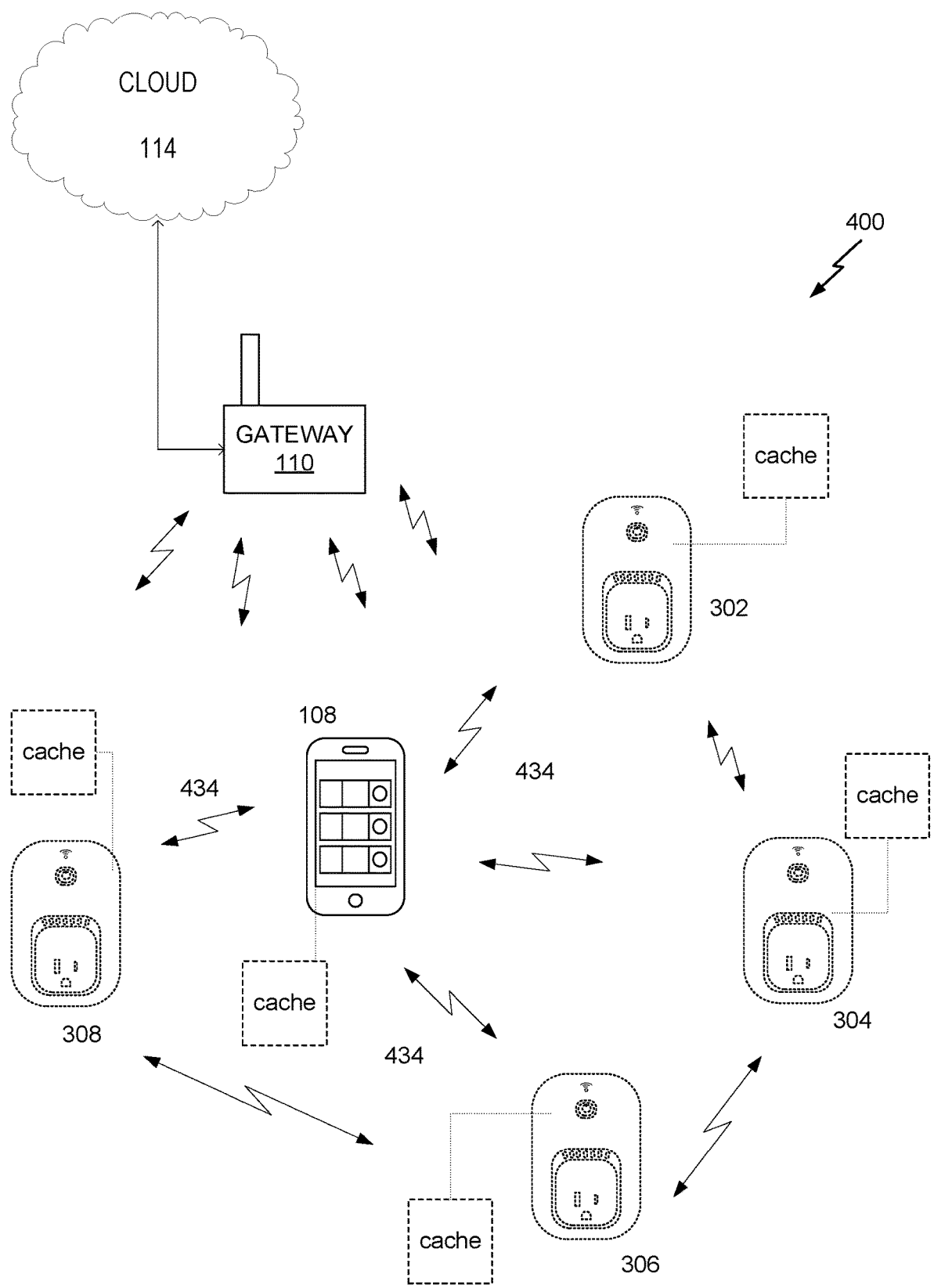
FIG. 4 illustrates an example of a network environment, according to embodiments of the present invention.

FIG. 4 illustrates an example of a network 400, according to embodiments of the present invention. The local area network 400 may include network device 302, network device 304, network device 306, network device 308, and access device 108. FIG. 4 also illustrates that one or more network devices 302-308 and/or access device 108 may include a storage device, such as a cache, for storing data, including data regarding its own status and data regarding statuses received from the other devices within local area network 400. For example, access device 108 may, after being powered up, broadcast/send its status to network device 308 via communication 434. Network device 308 may store the status data received from access device 108 until the next time access device 108 updates its status by sending new/updated status data to network device 308. Cache may be used for storage within network devices 302-308 and/or access devices within the local area network 400 so that each of the devices may be able to quickly retrieve the data it needs from storage. An application operating on the access device 108 can access the cache to obtain information to display the visual interface for each network device 302-308 registered within the network 400. Although a caching device may be used to store such data within the network and/or access devices within the local area network 400, other types of storage may be used.

The cache can contain a known interface list including interface information for different, known types of devices. The known list can include a record for each network device known by the access device 108 to exist on the network 400. When an application is run on the access device 108, the access device 108 can access the known interfaces in the cache to present the display of access device 108. The display can present one or more visual interfaces, each corresponding to a network device known to exist on the network 400. Each visual interface can be generated based on a visual interface module corresponding to each device on the network 400. In an example, the display can include a visual interface (e.g., a module tile) for each device in the network 400 having an interface in the known interface list.

The cache can also contain known status information about each network device in the known device list. When the application is run on the access device 108, the access device 108 can access the known status information in the cache to present a status display. The access device 108 can populate each tile with an indicator representing the respective known status information for each device in the known device list. The status display can include an indicator of one or more attributes, one or more settings, or a combination thereof related to operation of each device in the network 400. For example, the status display can include a speed of a fan (e.g., a fan speed of 56 in a range of values between 0 and 100) of the network device 302 (e.g., a fan), a value of sensitivity of a sensor (e.g., a value of 34 in a range of values 0-100) for the network device 304 (e.g., a motion sensor), a value of brightness (e.g., 65 percent brightness) for the network device 306 (e.g., a light bulb), and a value of temperature (e.g. a slow cooker). Although shown as having a single indicator for an attribute or a setting related to operation of a network device, the status display can present a plurality of indicators corresponding to different attributes and/or settings related to operation of a network device.

In some embodiments, the cache can include other information about a network device. The other information can indicate a device's firmware version, last known firmware update status, connectivity to cloud status, registration status (e.g., whether the network device has a key or not), and other such information. The cache can include information that could be used for troubleshooting. In embodiments described below, the access device 108 can access status information from another other device on the network 400 and can use that information to update its own cache, update the status display, and/or pass the information to the cloud network 114 and/or the gateway 110 for trouble shooting and/or storage.

Even though each network device may know and store (e.g. in cache) the state of each other network device within local area network 400, a network device may not know when another network device changes status (e.g. turns/powers off). However, network devices and/or access devices within local area network 400 may broadcast/send any updates in its status to other devices on the network. For example, if network device 302 changes status, it may send status data to the other network devices, such as network devices 304, 306 and 308 and to access device 108. However, network device 302 may not know which devices to update since the other devices may change statuses periodically (e.g. turn off).

Therefore, a network or access device may subscribe to another network or access device within local area network 400. For example, network devices 304, 306 and 308 and access device 108 may subscribe to status data notifications/updates from network device 302. Such a subscription may be registered for upon initial connection with network device 302 when network device 302 first enters local area network 400 or at any other time after network device 302 has been associated with local area network 400. Subscriptions may be controlled to last indefinitely or may expire after a certain predetermined period of time after initial subscription. However, network devices may re-subscribe to another network device before or after their previous subscription has expired.

Subscriptions between network device and/or access devices may be registered, similar to registering a network device upon initial entrance into the local area network, including security registrations described herein with respect to FIGS. 1 and 2. For example, a network device may send its unique security key, which it may have stored along with its network ID after being registered on the network, to a network device to which it wants to subscribe. However, subscriptions may take on many other forms, including sending a different form of identification to a network device to which a network device wants to subscribe. However, subscriptions may take on many other forms, including sending a different form of identification to a network device to which a network device wants to subscribe.

Upon receiving a subscription from another network device or access device, the device being subscribed to may store a list of the devices that subscribed to it. For example, network device 302 may store a list of network devices 304, 306 and 308 and access device 108 after those devices subscribe to network device 302. Then, when network device 302 undergoes a change in status, network device 302 may send that change in status to only the devices that had previously subscribed to it but where the subscription had not yet expired. Furthermore, according to some embodiments, the subscription list of a network device may be automatically updated if that device receives notification that another device has left the range of the local area network, either from that device itself or from a different device. Therefore, the various devices within a given local area network, such as network 400, each contain continuously updated statuses of each other device on the network and obtain those statuses and updates through direct communication without necessary use of the cloud.

Figure 5:
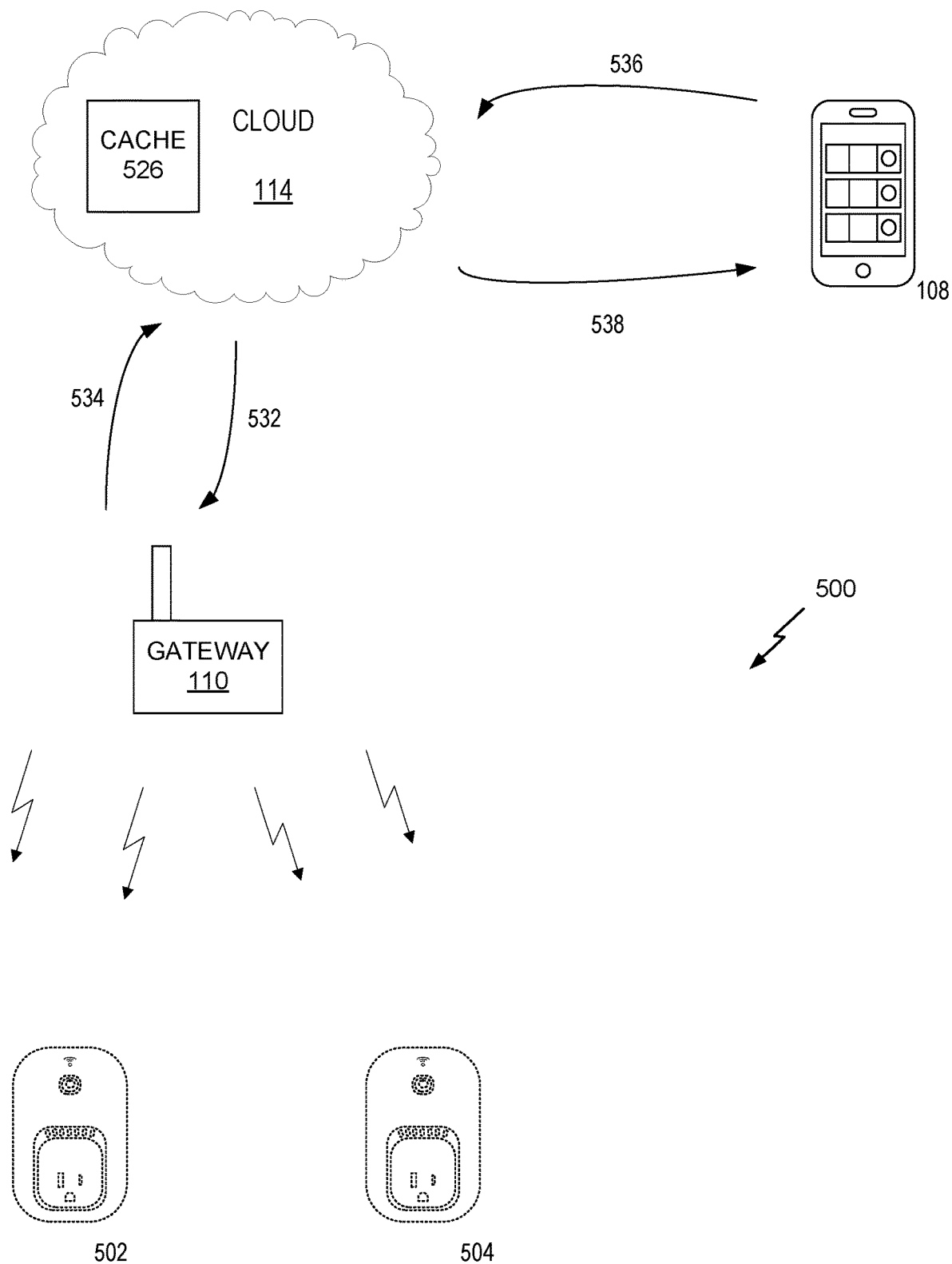
FIG. 5 illustrates an example of a network environment, according to embodiments of the present invention.

FIG. 5 illustrates an access device 108 that is located remotely from network 500 (e.g. local area network), according to embodiments of the present invention. Local area network 500 includes gateway 110 and network devices 502 and 504 (which may be, for example, the same as any of network devices 302-308 in FIGS. 3 and 4), as shown in FIG. 5. However, network 500 may also include a variety of other network devices and one or more access devices directly connected to network 500. Gateway 110 is connected to cloud network 114, and allows network devices 502 and 504 to connect to cloud 114, the internet, or other external networks via gateway 110. In some embodiments, the network devices 502 and 504 may include home automation devices that allow a user to access, control, and/or configure various home appliances located within the user's home, such as a television, radio, light, microwave, iron, and/or the like.

Access device 108 is not directly connected to network 500. Instead, access device 108 is external to network 500 and may connect to cloud network 114 and to network 500 via cloud network 114. As noted, network devices 502 and 504 may change status on a periodic basis. In some embodiments, even when external to and not directly connected to network 500, an access device may request to check the status of the devices on the network. When access device 108 seeks to check the status of any device on the network, the access device 108 may transmit/send a communication 536 to the cloud network 114, to which all devices on the network are connected either directly or indirectly via gateway 110. Since the cloud network 114 stores an updated table/list of the statuses of each of the devices within the requesting access device's network, the cloud network 114 may transmit a communication 538 of such status data to the access device 108. For example, after network devices 502 and 504 are turned on, authenticated and are a part of network 500, network devices 502 and 504 may communicate their statuses to cloud network 114. Furthermore, any time the status of network devices 502 and 504 changes, the device that incurred a status change may push/send information (e.g. an indication) of that status change to cloud network 114. Cloud network 114 may store, in cache 526 or otherwise, the statuses (which may be time stamped in metadata or otherwise) of network devices 502 and 504. Therefore, when access device 108 requests from cloud network 114 the statuses of devices on network 500, cloud 114 may send its most recently stored/updated statuses to access device 108.

To obtain the most updated status data of devices within network 500, cloud 114 may, upon receiving a request for status data related to network devices 502 and 504, transmit/send a communication 532 (e.g. request, query, etc.) for such status data to network devices 502 and 504 via gateway 110. Once network devices 502 and 504 receive this request, network devices 502 and 504 may send a communication 534 (e.g. updated status data) to cloud 114 to replace the previously stored/cached statuses in cache 526. Upon receipt of updated status data 534 from network 500, cloud 114 may send a communication 538 of such status data to the access device 108.

However, the process of cloud network 114 requesting updated statuses from network devices 502 and 504 within network 500 may cause latency within the system. More specifically, the time required for cloud network 114 to request updated statuses from network devices 502 and 504 and to in turn receive updated statuses from network devices 502 and 504 may be substantially greater than the time required for cloud network 114 to send its currently stored statuses (without being updated) for network devices 502 and 504 to access device 108. For example, of the total time required for access device 108 to receive updated statuses from cloud network 114, 80% or more of that total time may include cloud network 114 requesting updated statuses from network devices 502 and 504. On the other hand, of the total time required for access device 108 to receive updated statuses from cloud network 114, 20% or more of that total time may include the status data being transmitted from cloud network 114 to access device 108. Since a majority of the process required for access device 108 to request and receive status data for network devices 502 and 504 is the transmission of data between cloud 114 and network devices 502 and 504, the access device 108 and cloud network 114 may maximize efficiency by minimizing the effect of the transmission of data between cloud 114 and network devices 502 and 504 on the whole process/system.

Techniques and systems are described herein for grouping associated network devices for control of the network devices. Certain network devices, and devices that may be connected to a network via the network devices, may be controlled remotely by, for example, an access device. To control multiple network devices at the same time, such multiple devices may be grouped together such that they are treated within the network as a single virtual device. Multiple devices may be grouped together in different ways. For example, a user of an access device controlling the network devices may choose which devices are grouped together. Furthermore, the access device and/or other devices on the network may automatically determine which devices should be grouped together. If network device groups are determined by an access or other device, the user may be presented with a suggested grouping for acceptance, rejection or editing. Network devices may be grouped together if they are determined to be related to or associated with one another in some way. For example, network devices may be grouped together if the multiple network devices are powered on and/or attempt to connect to the network at substantially the same time. In another example, network devices may be grouped together if the multiple network devices are in close proximity to each other within the same geographic location. More specifically, a set of network devices may each be connected to a light bulb where each of the light bulbs connected to the network devices are located in the same room. Therefore, it may be beneficial for a user to turn on or off the light bulbs connected to the network devices at the same time. Furthermore, grouping of network devices may be saved and/or changed over time based on changes in the network, such as based on new devices being added to the network, devices being subtracted from the network, user preferences, among various other reasons.

Figure 6:
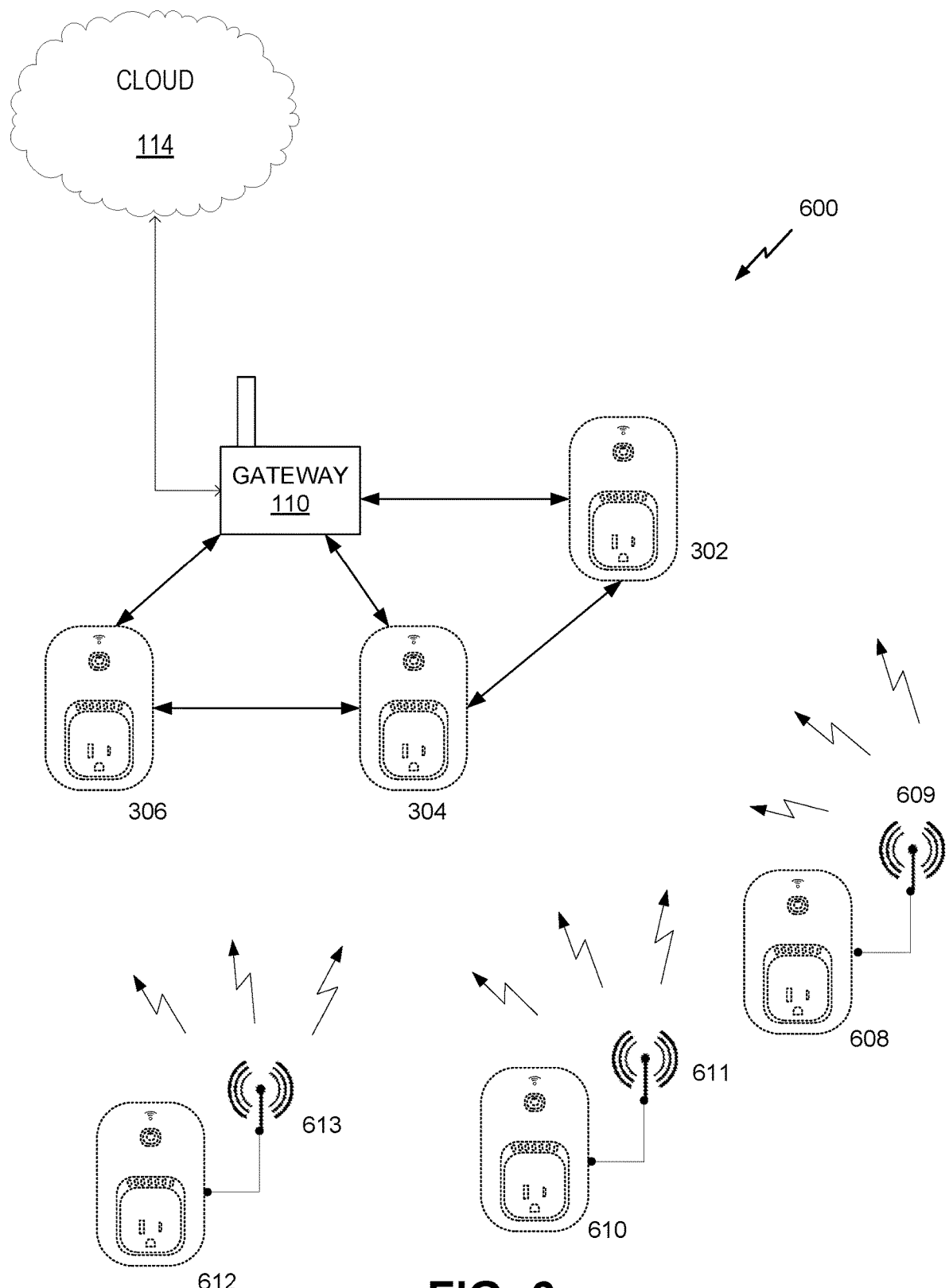
FIG. 6 illustrates an example of a local area network including a gateway and three network devices, according to embodiments of the present invention.

FIG. 6 illustrates an example of a local area network 600 including a gateway and three network devices, according to embodiments of the present invention. The local area network 600 includes network devices 302, 304 and 306. However, network 600 may include more or less network devices at any given time. Also included in FIG. 6 is new network devices 608, 610 and 612.

New network device 608 is connected to (or includes) setup access point 609, new network device 610 is connected to (or includes) setup access point 611, and new network device 612 is connected to (or includes) setup access point 613. A setup access point (e.g. wireless access point), such as setup access points 609, 611 and 613, allows wireless devices to connect to a network using WiFi or other standards. Identification information may be sent from one of the new network devices to gateway 110 via the network device's setup access point. The identification information may also be sent as an automatic component of being powered on for the first time or reset of the new network device. In some cases, the identification information may include a name of the network device or other identification information.

New network devices 608, 610 and 612 may be turned/powered on at the same time or at substantially the same time. For example, new network devices 608, 610 and 612 may be powered on within 30 seconds, 1 minute, 2 minutes, 5 minutes, etc. of each other. After one or more of the new network devices are turned on near local area network 600, network devices 608, 610 and 612 may transmit a notification or other indication of their presence. The notifications may include identification information or other information identifying the network device that has been powered on. The notifications may also include a request to join the network. Alternatively, new network devices 608, 610 and 612 may send a separate communication including a request to join the network.

The notifications/indications may be in the form of beacons containing various information, including identification information of the device, identification information of the network, a timestamp, information indicating network bandwidth/latency or other capability information, among other information. Furthermore, beacon frames may be transmitted periodically to announce the presence of the network device.

Figure 7:
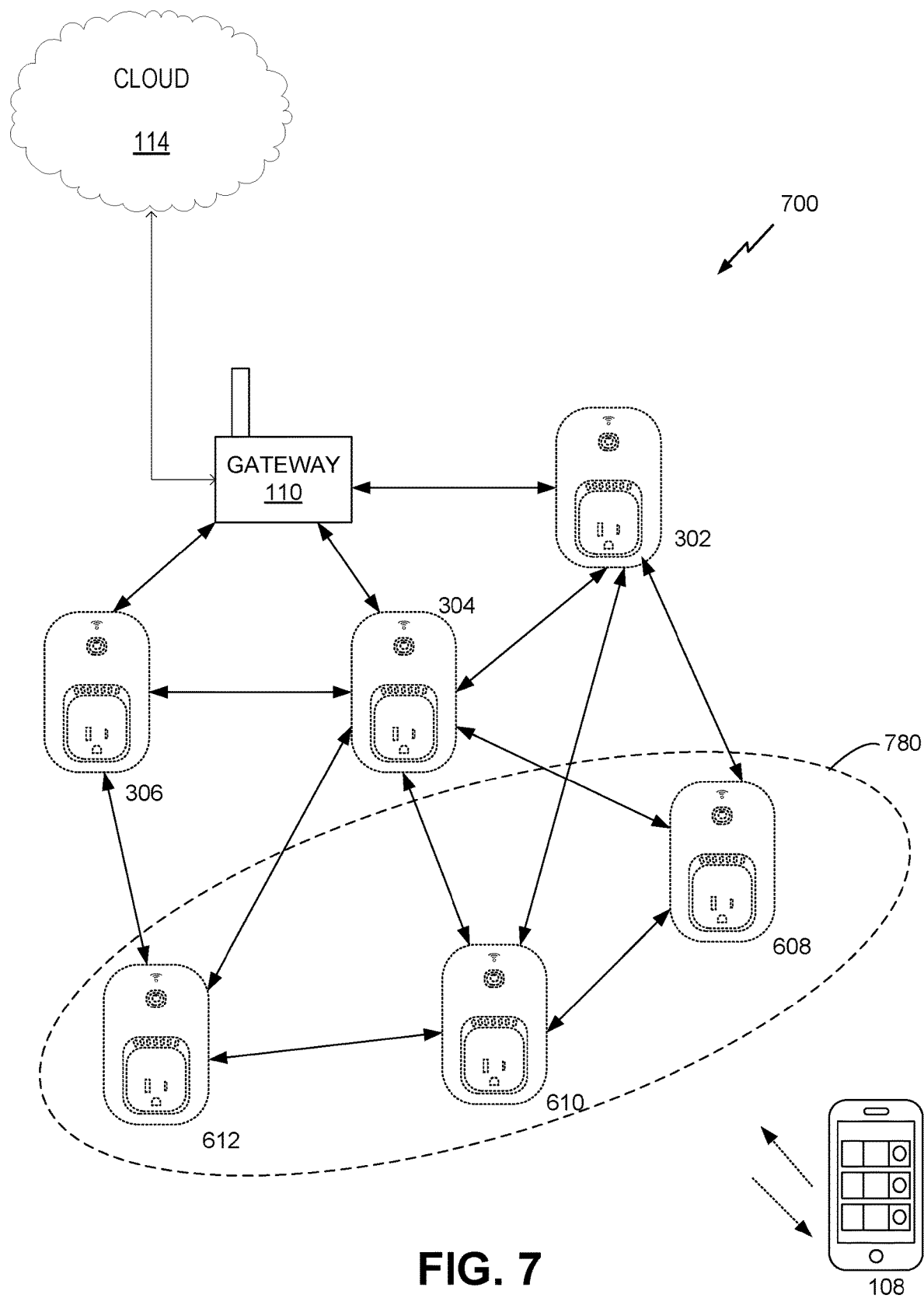
FIG. 7 illustrates an example of a local area network including a gateway and three grouped network devices, according to embodiments of the present invention.

Because network devices 608, 610 and 612 may be powered on at substantially the same time or within seconds or minutes of each other, a device that is already on the network, such as one or more of network device 302, network device 304, and network device 306, may receive the notifications/beacons from the new network devices 608, 610 and 612, including requests from the new network devices 608, 610 and 612 to join the network, at substantially the same time. Subsequently, one or more of network devices 302, 304 and 306 may connect to new network devices 608, 610 and 612, as shown in FIG. 7. For example, one or more of network devices 302, 304 and 306 may generate a communication connection/path with one or more of new network devices 608, 610 and 612. Furthermore, before allowing new network devices 608, 610 and 612 to communicate with gateway 110 and/or network devices already on the network, the network or a device on the network may authenticate new network devices 608, 610 and 612 to confirm that the new network devices are allowed/desired to join the network. Example authentication methods are described herein with respect to FIGS. 1 and 2.

As noted, to control multiple network devices at the same time, such multiple devices may be grouped together such that they are treated within the network as a single virtual device. Certain network devices, and the devices that are connected to the network 600 via the network devices, may be controlled remotely by, for example, an access device, such as access device 108 shown in FIG. 7. If multiple network devices, such as network devices 608, 610 and 612 are powered on and/or attempt to connect to network 700 at the same time, network devices 608, 610 and 612 may be related to or associated with one another in some way. For example, network devices 608, 610 and 612 may be located in the same room of a building. More specifically, network devices 608, 610 and 612 may each be connected to a light bulb where each of the light bulbs connected to network devices 608, 610 and 612 are located in the same room. Therefore, it may be beneficial for a user to turn on or off the light bulbs connected to network devices 608, 610 and 612 at the same time (or, for example, if network devices 608, 610 and 612 are light bulbs themselves, then it may be beneficial for a user to turn on or off network devices 608, 610 and 612). In order for a user to control such network devices at the same time, the devices may be grouped together such that they are treated within the network as a single virtual device.

Figure 8:
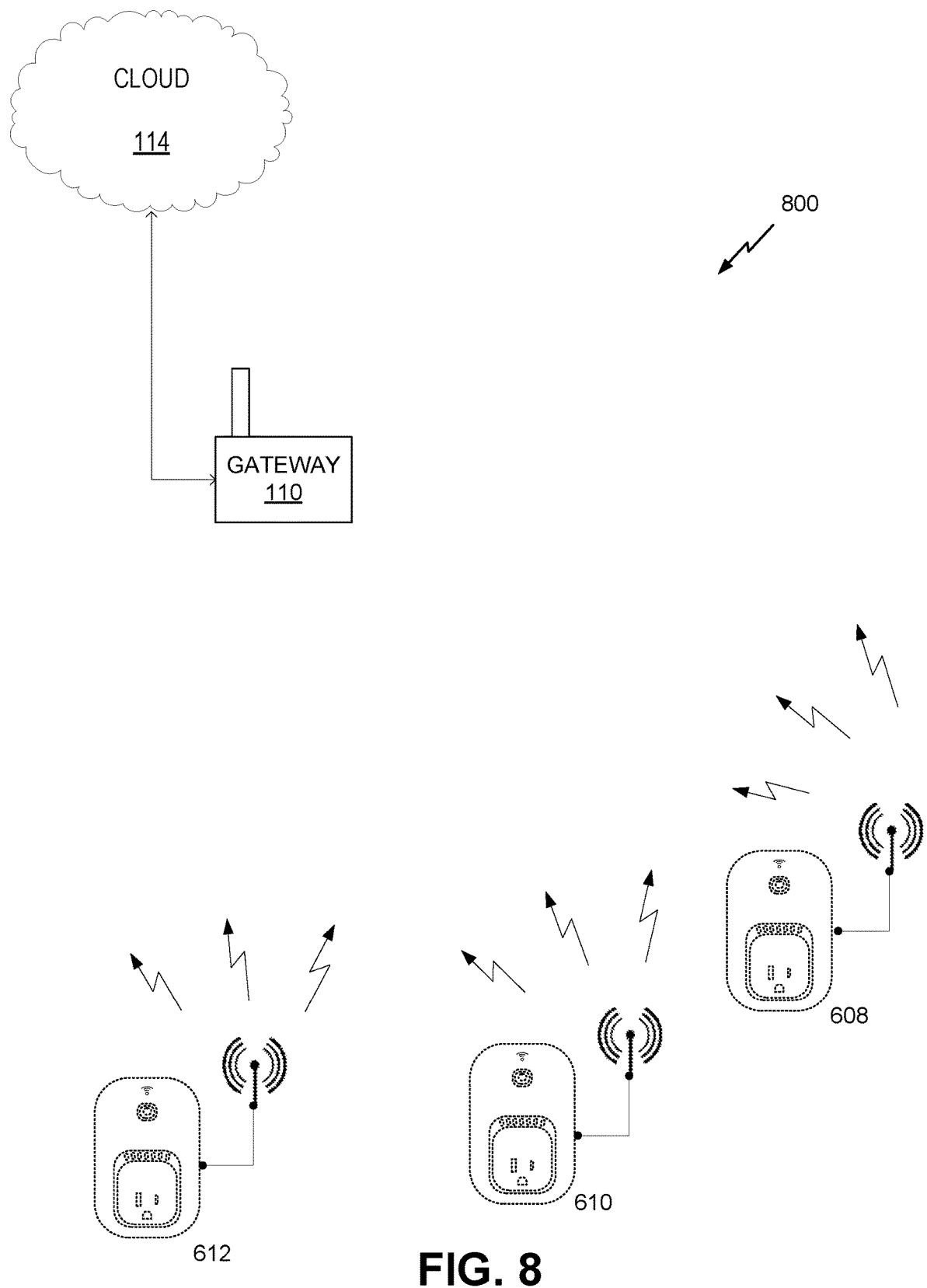
FIG. 8 illustrates an example of a local area network including a gateway and three network devices, according to embodiments of the present invention.
Figure 9:
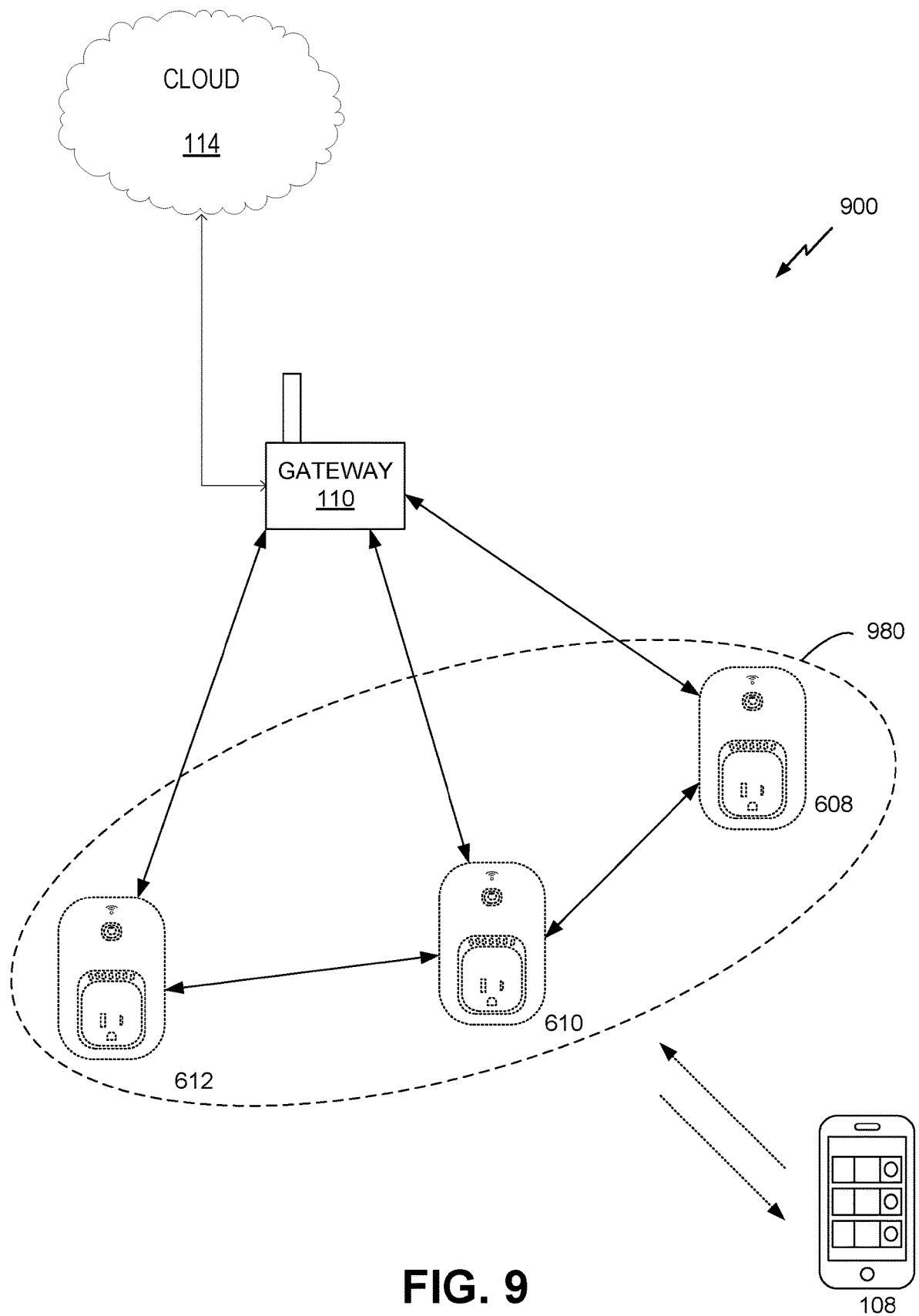
FIG. 9 illustrates an example of a local area network including a gateway and three grouped network devices, according to embodiments of the present invention.

Gateway 110 may facilitate the process of connecting the new network devices 608, 610 and 612 to the network. For example, as shown in FIG. 8, the network may not include network devices already connected to the network, such as network devices 302, 304 and 306 as shown in FIG. 6. New network devices 608, 610 and 612 may be turned/powered on at the same time or at substantially the same time. After one or more of the new network devices are turned on near local area network 600, network devices 608, 610 and 612 may transmit a notification or other indication of their presence. The notifications may include identification information or other information identifying the network device that has been powered on. Gateway 110 may receive the notifications/beacons from the new network devices 608, 610 and 612, including requests from the new network devices 608, 610 and 612 to join the network. Gateway 110, similar to the network devices 302, 304 and/or 306 in FIG. 6, may receive such notifications/requests from the new network devices at substantially the same time. Subsequently, gateway 110 may connect to new network devices 608, 610 and 612, as shown in FIG. 9. For example, gateway 110 may generate a communication connection/path with one or more of new network devices 608, 610 and 612. Furthermore, before allowing new network devices 608, 610 and 612 to communicate with gateway 110 and/or network devices already on the network, the network or a device on the network may authenticate new network devices 608, 610 and 612 to confirm that the new network devices are allowed/desired to join the network.

Similar to in FIG. 6, certain network devices, and the devices that are connected to the network 900 via the network devices, may be controlled remotely by, for example, an access device, such as access device 108 shown in FIG. 9. If multiple network devices, such as network devices 608, 610 and 612 are powered on and/or attempt to connect to network 900 at the same time, network devices 608, 610 and 612 may be related to or associated with one another in some way. For example, network devices 608, 610 and 612 may be located in the same room of a building. More specifically, network devices 608, 610 and 612 may each be connected to a light bulb where each of the light bulbs connected to network devices 608, 610 and 612 are located in the same room. Therefore, it may be beneficial for a user to turn on or off the light bulbs connected to network devices 608, 610 and 612 at the same time. In order for a user to control such network devices at the same time, the devices may be grouped together such that they are treated within the network as a single virtual device.

Many reasons may exist why multiple new network devices may be powered on at substantially the same time. For example, a user may purchase multiple light bulbs and plug them in into light sockets over the course of a short period of time. Therefore, in some circumstances, network devices that are powered on at substantially the same time may be multiple devices of the same type. In another example, the user may have gone on a shopping trip and purchased several different devices, some of which may be of different types (e.g. a light switch and a motion sensor and a DVD player). However, the user may arrive home and power on the different devices at substantially the same time soon after arriving home. Therefore, in some circumstances, network devices that are powered on at substantially the same time may be of different types.

Furthermore, although sometimes devices, whether of the same type (e.g. multiple lights) or of different types (e.g. a light and a sensor) may be powered on, and therefore attempt to connect to the network, such as network 900, at substantially the same time, other devices may be powered on and connect to the network at different times. For example, network devices 302, 304 and 306 had already been connected to network 600 by the time new network devices 608, 610 and 612 attempted to join network 600. A user may start a network by purchasing a gateway and network devices to connect to the network, and then at a later time purchase more network devices and/or more gateways to connect to the network and the existing network devices and gateway(s) on the network. Similarly, certain devices may be included in a group, such as group 780 in FIG. 7, and other devices may be added to the group at a later time. For example, if one or more of network devices 302, 304 and 306 are in a device group and, as shown in FIGS. 6-7, network devices 608, 610 and 612 are later added to network 700, one or more of devices 608, 610 and 612 may be added to the existing group including one or more of devices 302, 304 and 306. Furthermore, one or more of new network devices 608, 610 and 612 may be included a new group, such as group 780.

If, as shown in FIGS. 8-9, new network devices 608, 610 and 612 are the first network devices to join the network, one or more of new network devices 608, 610 and 612 may join an already existing group on the network or a new group may be created to include one or more of new network devices 608, 610 and 612. Even if an existing group does not yet include any network devices, such a group may exist (and may later include one or more of new network devices 608, 610 and 612) in name only (e.g. as a shell of a group without any contents).

As shown in FIGS. 6-9, network devices that are of the same type (e.g. a plurality of light bulbs) may be grouped together. For example, a set or group of light bulbs may have the same functionality. More specifically, a set of lights may include the single two-way functionality of turning on and off. However, as shown in FIG. 10, devices of different or disparate types may also be grouped together into device groups.

Figure 10:
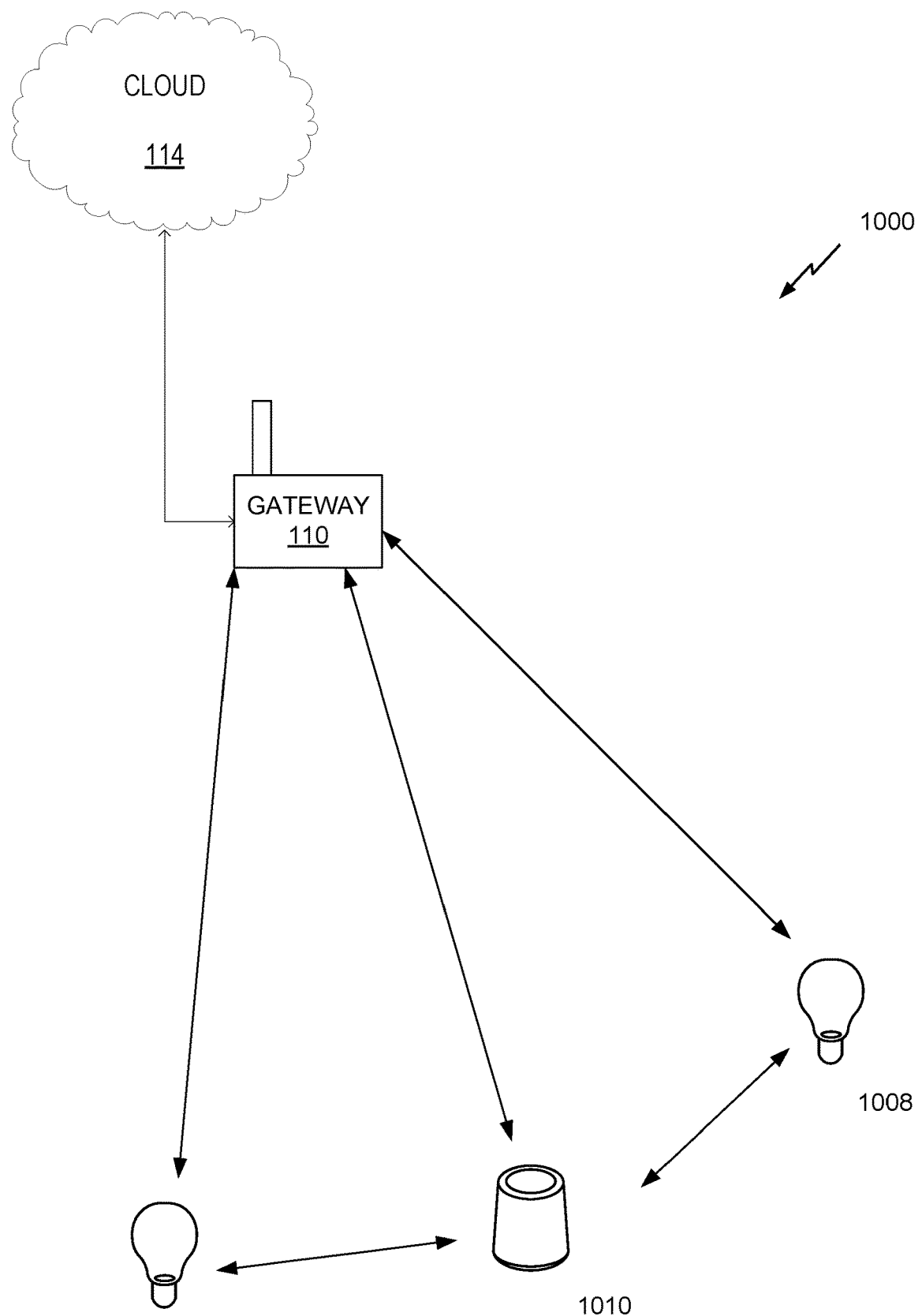
FIG. 10 illustrates a local area network including network devices connected to two lights and a sensor, according to embodiments of the present invention.

FIG. 10 illustrates local area network 1000, according to embodiments of the present invention. Local area network 1000 includes two light bulbs 1008 and 1012 and a motion sensor 1010. Light bulbs 1008 and 1012 and motion sensor 1010 may be connected to network 1000 via network devices. In other words, network devices, such as network devices 608, 612 and 610 (as shown in FIG. 9, for example) may be connected to network 1000 (and therefore to gateway 110), and light bulbs 1008 and 1012 and motion sensor 1010 may be connected to network devices 608, 612 and 610, respectively.

Although light bulbs 1008 and 1012 are a different type of device as motion sensor 1010, light bulbs 1008 and 1012 and motion sensor 1010, or the network devices that connect light bulbs 1008 and 1012 and motion sensor 1010 to network 1000, may still be included in the same device group. Disparate devices, such as a light bulb (e.g. bulb 1008 and 1012) and a motion sensor (e.g. sensor 1010) may be included in the same device group if the devices are capable of the same functionality between the disparate devices. For example, light 1008 and sensor 1010 may each include the functionality of turning on and off. Furthermore, it may be beneficial to the user to turn on or off light 1008 and sensor 1010, such as if sensor 1010 is a motion sensor that turns on light 1008 when it detects motion, at the same time. Therefore, such devices may be included in the same group so as to allow a user to control the devices based on their common functions.

Although disparate devices may include the same or similar functionality, it may still not be beneficial for a user to group such devices together. For example, although a light and a coffee maker may each be capable of turning on and off, a user may not want to turn off a coffee pot if it is in use and in the process of making coffee at the same time it wants to turn off a light in the same room. Therefore, a user may choose to restrict certain devices from being grouped together. Such a restriction may be predetermined before such devices are connected to the network, or a rule to restrict such a grouping may be created by the user after the devices have been connected to the network.

Although disparate devices may be grouped in the same group, as described with respect to FIG. 10, devices may be capable of a different set of functionality that other devices in their respective groups are not capable of A device or the network may become confused when the device receives a command or request to perform a certain function. A device may fail to perform a certain function because the device is capable of alternative functions for which it did not receive a command. For example, device 1008 may be a light switch that turns on and off, but may also include the functionality of a dimmer, while device 1012 may be a light switch that turns on and off, but does not include any other functionality. The network and/or one or more of devices 1008 and 1012 may become confused and/or fail to perform one or more functions because they do not include the same set of functions. A more specific example of such a situation is shown in FIG. 11.

Figure 11:
FIG. 11 illustrates a chart that includes device functions for three new devices, including two lights and one fan, according to embodiments of the present invention.

FIG. 11 is a chart that includes device functions for three new devices, including two lights and one fan, according to embodiments of the present invention. New device 1 (light 1), new device 2 (fan), and new device 3 (light 2) may all be connected to a network, such as network 1000 in FIG. 10. As shown in table or chart 1100, new devices 1, 2 and 3 are each able to perform a different list of functions. For example, new device 1 is a light that may turn on and off, may change from fluorescent to incandescent, may change colors, includes a motion sensor that may detect motion and turn the light on when motion is sensed, and may have a dimmer. New device 2 is a fan that includes a light (night light) that may also turn on and off, but new device 2 may also turn the fan portion of the device on and off, may turn the fan to a "slow" position, and may reverse the direction of the fan. New device 1 is a light that is only capable of performing one function, or turning on and off. Therefore, each of new devices 1, 2 and 3 are capable of turning a light on and off, and therefore new devices 1, 2 and 3 may be considered for grouping together into a device group. If new devices 1, 2 and 3 are grouped together into a device group, a user may control new devices 1, 2 and 3 at the same time by turning their respective lights on and off at the same time. For example, a user may control new devices 1, 2 and 3 using an access device, and by pressing a button on the access device to turn the lights on the three devices on or off.

New devices 1 and 2 include various other functionalities that do not exist in new device 3. For example, new device 2 is a fan and includes the function of turning the fan on and off. While turning the fan on new device 2 on and off is turning on and off a different mechanism/function within the device than turning the light on and off in new devices 1 and 3, the function still includes turning something on and off. Therefore, new device 2 may also be grouped with new devices 1 and 3 to include the on/off function of the fan function of new device 2 because the process of turning a function on and off exists in all three devices.

However, new devices 1 and 2 also include other functions that are not similar to the function of turning something on and off. For example, new device 1 may change from fluorescent to incandescent, may change colors, includes a motion sensor that may detect motion and turn the light on when motion is sensed, and has a light dimmer, and new device 2 includes turning the fan to a "slow" position and may reverse the direction of the fan. Grouping new devices 1, 2 and 3 in the same group may cause confusion within the network or during communications between the access device, network, and the devices because the network and/or devices may not understand commands received from the access device and/or network (e.g. network 1000 or cloud network) directed to only one function of the device.

Several techniques are possible to avoid such a problem. First, the device, network, or group may deactivate the functions of the devices that are not common to all devices in the group. In other words, the group may detect (and therefore be able to be controlled regarding) a set of functions that are the least common denominator functions of the devices in the group and deactivate the other device functions of the devices in the group. In an alternative embodiment, the device, network, or group may automatically pull the device that includes additional functions out of the group. For example, if a user selects a device to be placed into a new or already existing group, or if the access device and/or network automatically selects the device to be placed into a new or already existing group, the network and/or device may detect that the device includes additional functionality that the other devices in the group do not have and remove the device from the group. The device and/or network may also decide to not include a device in a group (e.g. during an automatic grouping process) because of its functionality that may be disparate from the other devices in the group.

In another alternative embodiment, an alternative functionality may replace one or more of the common functionalities that make up the group. For example, new device 1 in FIG. 11 includes the functionality of a light dimmer. Therefore, the light includes various levels of light including on, off, and various levels of light in between as decided by the dimmer or a user changing the dimmer setting. Therefore, a certain dimmer setting may replace the "on" or "off" setting that the group views as common to each of the devices in the group. For example, the device may, within the confines of the group, turn "off" and to "dimmed". The "dimmed" function may be at whatever selected dimmed state is chosen by the user (e.g. 70% dimmed). In other words, when a command is given to each of the devices in the group to turn on, most devices in the group turn fully on and the device that includes a dimmer turns to the dimmed state chosen by the user. In order to change the dimmed state from a first dimmed state to a second dimmed state, the access device may be able to give the user temporary access to the dimmer setting so as to allow the user to change the dimmer setting. The dimmer may also be changed in certain embodiments from the physical dimmer switch at the light.

In another alternative embodiment, the devices in the group that include functions that other devices in the group are not capable of may not respond to requests or commands to perform that function. For example, if the user, access device or network sends a request to new devices 1, 2 and 3 to dim their lights, devices 2 and 3 may not respond to the request because they do not have dimming capability. On the other hand, device 1 may respond to the request because it does have dimming capability.

A table or chart, such as table 1100 in FIG. 11, or the data within the table, may be stored within the network (e.g. on a network device, on each network device, on a subset of all network devices in the network, on the network's gateway, in a cloud network connected to the network, among others, or a combination of these). For example a chart that includes the different functions of each device on the network and/or in each group may be stored at one or more of the devices on the network, at a cloud network connected to the network, on the access device, or any combination of those devices. Such a chart may allow the devices on the network to keep track of the functions included in each network device, may be changed when devices are added or subtracted from the network, and may allow the network to make decisions about which devices are capable of being grouped together.

A group may be created in different ways. For example, a user of an access device controlling network devices on the network may create a group and/or edit a group using the access device. Such examples are further discussed with respect to FIGS. 15-19. Alternatively, device groups may be created using automatic grouping. Devices may be grouped automatically, without user intervention, by an access device (such as access device 108), a network device or another device on the local area network (such as a gateway e.g. gateway 110), a cloud network (such as cloud network 114), or a device external to the network (although when referred to herein such a device capable of automatic grouping may be referred to as an access device, it should be understood that any of the devices described herein may perform automatic grouping methods). Automatic grouping includes the process of grouping devices within a network into groups based on the common functions or capabilities that each device is able to perform and other factors that make the control of multiple devices together, as a single virtual device, convenient.

A device, such as an access device, may determine, without intervention/input from a human user, which devices are able to be or should be grouped together in the same device group, by compiling a set of functions that each device is capable of performing. The device may store the compiled functions in a list, such as the list in compiled in table 1100 in FIG. 11. In order to determine which functions a device is capable of, the access device may communicate with the network device. For example, the access device may transmit a communication to the device requesting an indication (e.g. a list) of the functions that the network device is capable of performing. The device may respond to the query with a communication including an indication of the functions that it is capable of performing. Information about what functions a device is capable of performing may also be communicated to the access device, or whichever device is performing automatic grouping, while the device is in the process of joining and/or being authenticated to join the network. For example, as noted with respect to FIG. 6, when a network device is powered on, a setup access point (e.g. wireless access point), such as setup access points 609, 611 and 613, is generated by the device to allow devices on the network to connect to the new device using WiFi or other standards. Furthermore, identification information and other information may be sent by the new network device to a device on the network, such as a gateway, via the network device's setup access point. Included in such information sent to the network during setup may be information related to the functions that the device is capable of performing. However, such information may be communicated to other devices on the network, an access device connected to the device, a cloud network, etc. at any other time during or after the device joining the local area network.

A device, such as an access device, may obtain information related to the functions that a device may be able to perform in alternative ways. For example, a network device may be able to compile such functions related to another (e.g. new) device due to its personal interaction with the device. For example, a motion sensor that is connected to a light may know that the light is capable of turning on and off and may also know that the light includes a dimmer such that a user may dim the light to a lighting amount less than 100% of its capability. The access device, or other device performing automatic grouping including the light, may receive information regarding the light's capabilities from the motion sensor. Furthermore, as noted with respect to FIG. 4, devices on the network may share information with each other regarding the status and/or performance of other devices on the network. Capability information regarding a device may be shared among devices on the network, and therefore an access device may obtain such capability information regarding a network device from any device on the network, from a cloud network connected to the network, or from any other device that had previously obtained such information.

Furthermore, device groups may be determined by the geographic location of each device being considered. For example, multiple devices may be placed in a group, and therefore controlled together at the same time, because they are all located in the same area of a structure or in the same room of a building.

Figure 12:
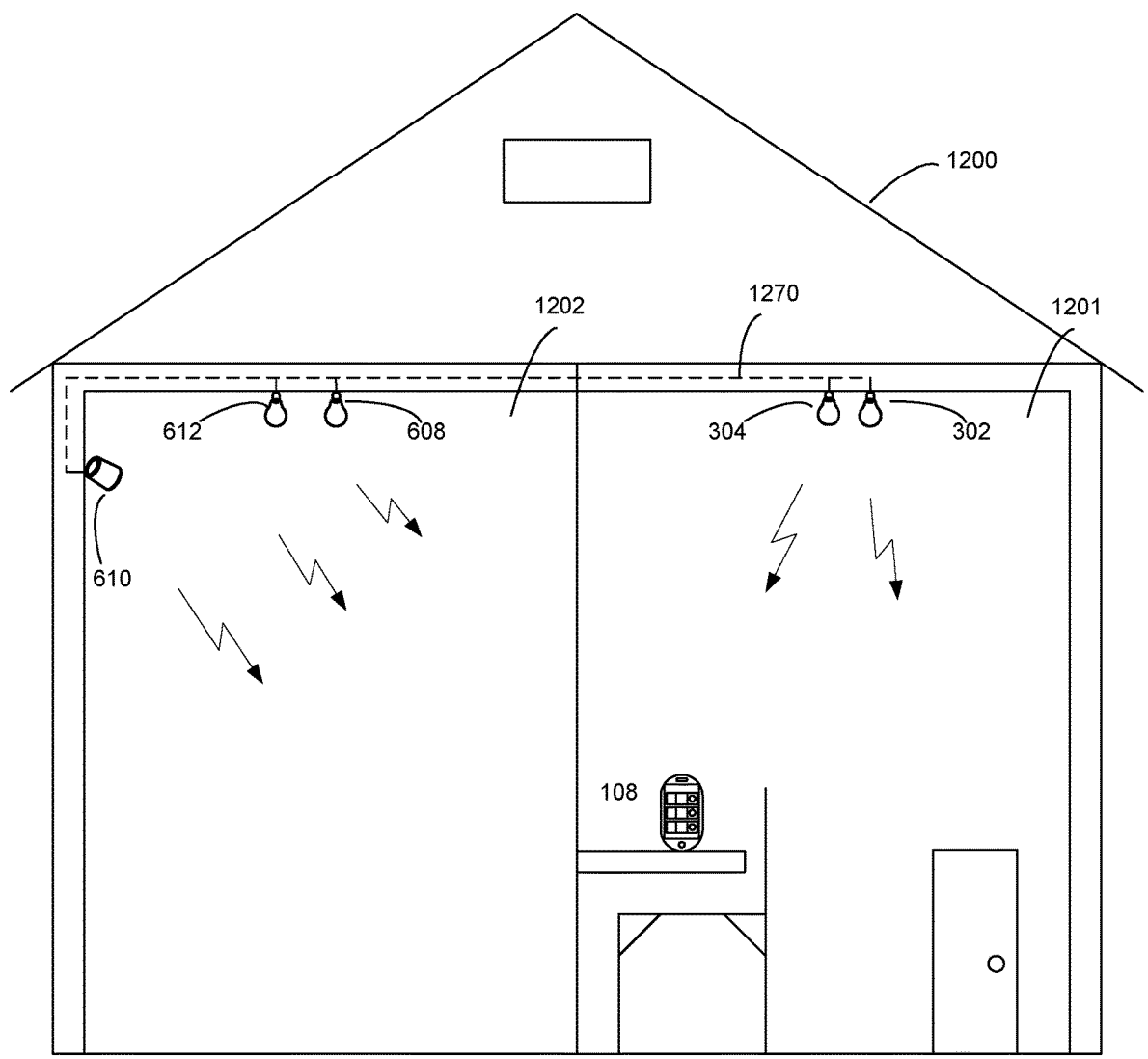
FIG. 12 illustrates a house with two rooms and network devices in each room that may be grouped, according to embodiments of the present invention.

FIG. 12 shows a house with two rooms and network devices in each room that may be grouped, according to embodiments of the present invention. FIG. 12 includes house 1200. House 1200 includes two rooms, room 1201 and room 1202. Room 1201 includes network devices 302 and 304 and access device 108. Network devices 302 and 304 are represented by lights in FIG. 12. However, network devices 302 and 304 may not be the lights themselves, but rather may be network devices that have lights or light bulbs connected to the network devices. Room 1202 includes network devices 608, 610 and 612. Network devices 608 and 612 are represented by lights in FIG. 12. However, network devices 608 and 612 may not be the lights themselves, but rather may be network devices that have lights or light bulbs connected to the network devices. Network device 610 is represented by a motion sensor. However, network device 610 may not be the sensor itself, but rather may be a network device that has a motion sensor connected to the network device. It may be beneficial to group network devices 302 and 304 in room 1201 in the same grouping because they are in close proximity to each other (e.g. in the same room). Therefore, a user may choose to turn the lights connected to network devices 302 and 304 on or off at the same time. Similarly, it may be beneficial to group network devices 608, 610 and 612 in the same grouping because they are in close proximity to each other (e.g. in the same room). Therefore, a user may choose to turn the two lights and sensor connected to network devices 608, 612 and 610, respectively, on or off at the same time.

Access device 108 may automatically detect that the devices in room 1201 may or should be grouped together, and may automatically detect that the devices in room 1202 may or should be grouped together. For example, access device 108 may initiate a process by which access device 108 may determine that the devices in a particular room are in the same room. More specifically, access device 108 may transmit a communication (e.g. a query) to all of the network devices in house 1200, including network devices 302, 304, 608, 610 and 612. The transmitted communication may include a request for the network devices to each transmit back a response to the communication/query indicating that the network devices received the communication from access device 108. The access device 108 may determine how devices can/should be grouped based on their responses to the query. For example, access device 108 may determine how devices can/should be grouped based on how long it took to receive a response from each network device. For example, if network devices are geographically close to each other, the access device should receive responses from those network devices in approximately the same amount of time. For example, access device 108 should receive a response from network devices 608, 610 and 612 at approximately the same time because each of the three network devices are a similar distance away from access device 108.

In an alternative embodiment for automatic grouping, access device 108 may determine which devices should be grouped together related to their geographic location based on which circuits the network devices are connected to (or which portion of a circuit the network devices are connected to). More specifically, for example, access device 108 may determine that network devices 302 and 304 are connected to the same circuit. For example, each of the network devices may be connected to each other via a wire, such as wire 1270. As shown in FIG. 12, network devices 302, 304, 608, 610 and 612 are all connected to wire 1270. Therefore, if access device 108 or another device initiates a signal (e.g. a query) to be sent through wire 1270 including a response request, access device 108 could again determine the approximate relative location of each network device based on their response time.

The access device may initiate such a process on a periodic basis. Such a periodic repeating of this process may allow the access device to periodically assess the grouping profile of the system, and may allow the access device to (automatically or otherwise) adjust the grouping profile (e.g. switch a device from to a different group, remove a device from a group, add a new device to a group, etc.) based on changes in the network's topology and communication abilities.

Figure 13:
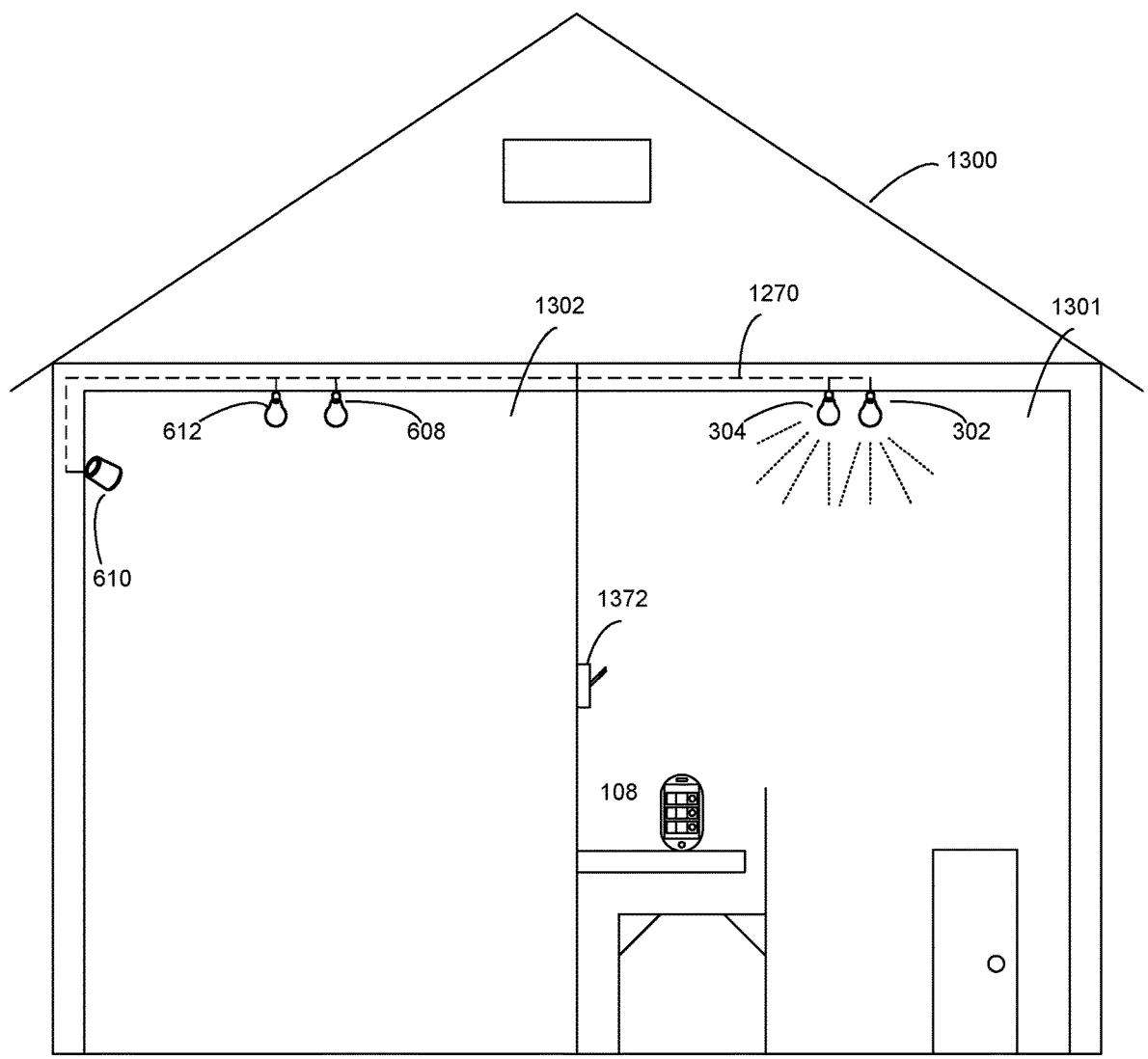
FIG. 13 illustrates a house with two rooms and network devices in each room that may be grouped, according to embodiments of the present invention.

FIG. 13 shows a house with two rooms and network devices in each room that may be grouped, according to embodiments of the present invention. The device layout of house 1300 is similar to house 1200 in FIG. 12, except house 1300 includes a switch 1372. Switch 1372 is in room 1301 and controls the on/off functions of network devices 302 and 304. Access device 108 may detect which devices should be grouped together based on which devices are turned on/off at the same time. For example, since switch 1372 controls the on/off function of network devices 302 and 304, network devices 302 and 304 may be turned on/off at the same time regularly. Therefore, access device 108 may detect such a pattern, and analyze such behaviors of network devices 302 and 304 to determine that network devices 302 and 304 should be grouped together in the same group. More specifically, access device 108 may receive signals/communications from each network device when it performs a function. For example, access device 108 may receive a notification any time switch 1372 is flipped/switched and/or any time any of the network devices are activated or turned on/off (e.g. light turns on/off). Access device 108 may compile those performed functions for each device over time and store a list or database of those functions and information related to each function (time, between which devices, etc.).

Although room 1301 includes a switch 1372, access device 108 may also sense/analyze other similar behaviors of other network devices without the use of a switch that controls both network devices and therefore causes network devices 302 and 304 to turn on/off at the same time on a regular basis. For example, access device 108 may detect that, in room 1302, sensor 610 is activated at the same time that lights 608 and 612 are turned on. Since such network devices are activated or turned on at the same time, access device 108 may determine that those three network devices are associated with each other, and therefore should be grouped together.

Figure 14:
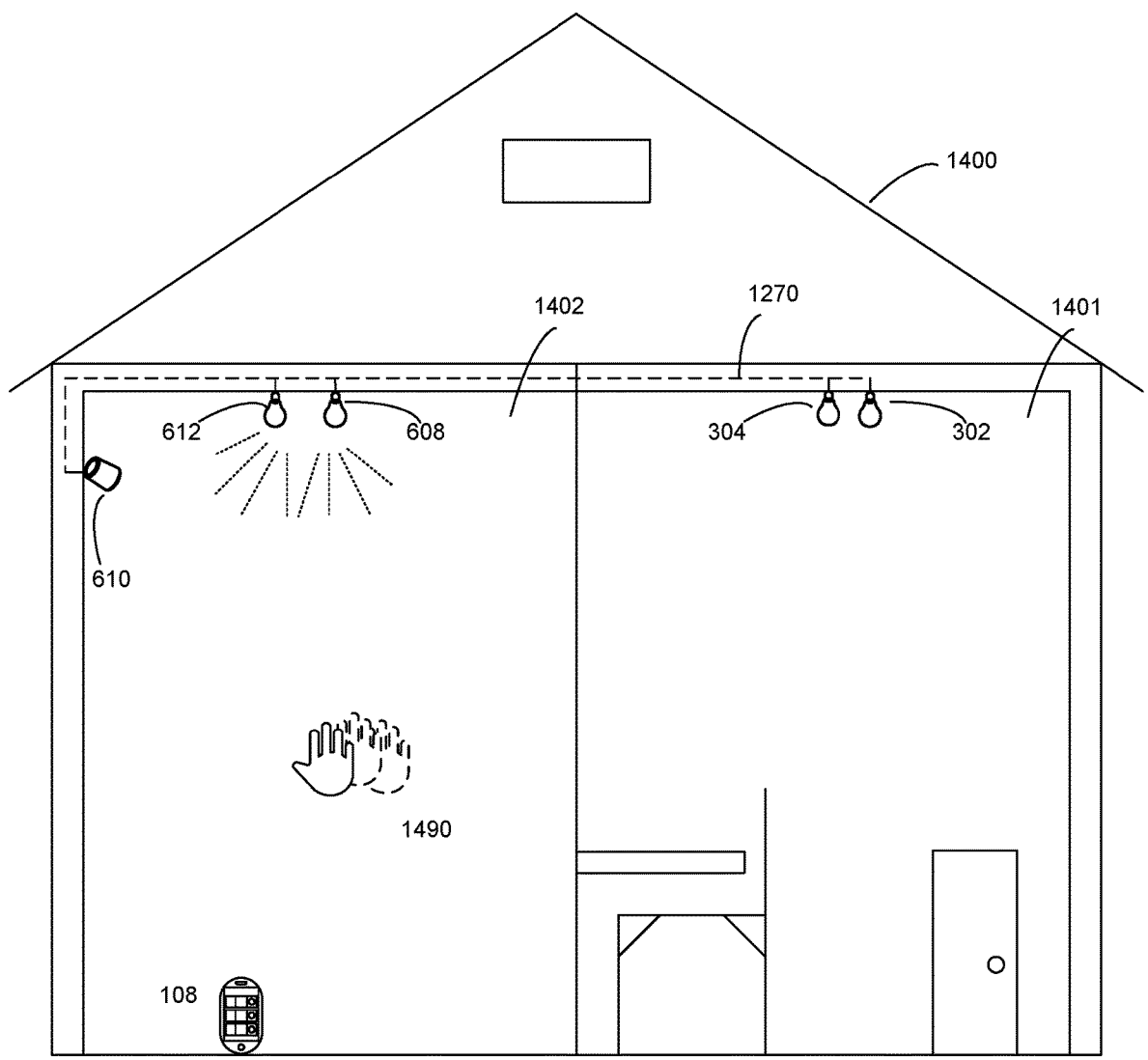
FIG. 14 illustrates a house with two rooms and network devices in each room that may be grouped, according to embodiments of the present invention.

As shown in FIG. 14, hands 1490 may cause motion in room 1402, causing sensor 610 to detect the motion and transmit a communication to lights 608 and 612 to turn on. Access device 108 may know that network device 610 is or is connected to such a sensor and may detect that motion from hands 1490 directly cause network devices 608 and 612 to turn on lights. Analysis of such observations may also cause access device 108 to determine that network devices 608, 610 and 612 should be grouped together in the same group.

Other methods are possible for detecting which devices should be grouped together. For example, a device may determine that a certain group of network devices should be grouped together based on the date they were purchased. A device may determine that a certain group of network devices should be grouped together based on the date they were connected to the network. Such a decision may also be based on the serial number associated with each device. For example, the serial numbers may be assigned to devices in chronological order. Network devices may communicate their serial numbers to the network upon entering the network, or the access device may detect the serial number on the device.

There are alternative ways for a user to group devices using the devices themselves. For example, the user may direct the access device to transmit a communication to certain network devices (e.g. the network devices in a room) including a request for the network devices to take an action. For example, the communication may request that multiple light bulbs turn on and then turn off within a short amount of time (i.e. a flicker with a predetermined or non-predetermined pattern). A network device may utilize an LED on the device if the device does not have a bulb. The access device may be able to detect such actions taken by the network devices, and may subsequently group the network devices (that took action) in the same group. Furthermore, a user may use near field communication to, within a predetermined amount of time, initiate a communication between the access device and each network device that the user would like to be grouped together. The access device may subsequently group the chosen network devices in the same group. Alternatively, a camera or video camera (of the access device or otherwise) may be used to detect network devices in a certain geographic area. For example, an access device may take a picture of a room and detect which network devices are present in the room (either because of a marking or an action taken by the devices) and group the set of devices or a subset of the devices in the same group. In another example, a video camera on the access device may video tape multiple light bulbs in the same room initiating a blinking pattern, causing the access device to recognize the network devices. The blinking pattern may represent serial number associated with the respective devices, or the devices may broadcast their serial numbers using a different method. The access device may subsequently place the detected network devices in a device grouping.

Generally, access device 108 may, by controlling the network devices on the network and observing their functions and actions over time and in relationship to each other, determine which devices can/should be grouped together in the same device groups. It may also be beneficial to use a combination of the methods described herein to determine which devices may or should be combined into a group, as one method may not yield the most ideal grouping results by itself.

Furthermore, access device 108 may automatically correct a previously grouped set of network devices. For example, a grouping profile, made up of one or more groups, may be automatically adjusted if a new network devices enters the network, if an existing network device leaves the network, if a network device is replaced with a network device that is capable of different functions, if a network device loses one or more of its functions (e.g. a function that is common among the network devices in its group), among other reasons. A user of access device 108 may select a setting within the access device to indicate to the access device whether the user wants the access device to automatically update based on such changes in the network. Alternatively, the access device may present a query or notification to the user each time the network changes (e.g. new network device present, network device left the network, etc.) so that the user may choose whether to allow the access device to update or whether the user would like to control changes to the grouping profile based on the change in network topology. For example, as noted, a set of devices (e.g. multiple light bulbs) may be grouped together (including their respective network devices) based on an observation by the access device that the light bulbs turn on and off at the same time. However, if one of the light bulbs stops turning on/off along with the rest of its group, the access device may assume that the device was removed, that the switch that controls the device was adjusted to not control that light, or that a renovation took place. Based on that observation, the access device may automatically elect to remove that device from the group. Alternatively, the access device may send a query or notification to the user via its display indicating that such a change took place with respect to that light, and ask the user how the user would like the system to respond.

If a network device is removed from a group, the group may be controlled by additional functionality for which the group may not previously have been able to be controlled. For example, if a group is being controlled using a set of functions determined to be the least common denominator of the devices in the group (and deactivated the other device functions of the devices in the group for purposes of control), and the removed device prevented certain functions from being a part of the least common denominator set of functions, the set of functions for control of the remaining devices may adjust to add those functions. More specifically, if three devices, including two light bulbs with dimmers and one motion sensor were in a group, the least common denominator set of functions may include only the devices' on/off capability (and the dimming capability/functions of the lights and any other functions of the sensor may be disabled). However, if the motion sensor is removed from the group, the least common denominator set of functions across the remaining devices, two light bulbs, may include the dimming capability of the lights. Therefore, the access device or other device controlling the group profiles may automatically/dynamically add the dimming function to the functions able to be controlled by the access device. In an alternative embodiment, the access device may transmit a prompt/query to the display/user asking the user whether the user would like to control the new common functionality (i.e. dimming of the two light devices).

Devices may also be pre-grouped before being purchased by a user. For example, certain devices may be purchased with a predetermined grouping profile such that the user may not need to generate new groupings or perform automatic grouping related to those devices. For example, a set of light bulbs may be divided into two or more groups (and, for example, either sold as a set or give the purchaser/user the ability to buy as many of each group as they choose) so that the purchase may place the grouped light bulbs in, for example, separate rooms. Therefore, when the user attempts to control the devices using an access device, the devices may already be grouped according to the purchasing choices of the user. The devices may be pre-grouped by, for example, registering such groups in the firmware of each device. The access device may allow the user to edit the predetermined groups at a later time by adding, subtracting, or shifting network devices to/from the device groupings. Methods for editing groups are discussed further with respect to FIGS. 15-19.

FIGS. 15-19 illustrate exemplary embodiments of screenshots of an exemplary user interface (UI) display for an application on an access device, according to embodiments of the present invention. However, the exemplary UIs are not limited to these example embodiments. In an embodiment of the invention, the visual interfaces illustrated in FIGS. 15-19 are displayed on a mobile computing device, which can have a touch sensitive (i.e., touch screen) display device. For ease of explanation, the monitoring and control operations discussed below with reference to FIGS. 15-19 are described in the context of an application executing on an access device 108 with a touch-screen display device. However, the operations are not intended to be limited to the exemplary device shown in FIGS. 15-19. It is to be understood that the user interfaces illustrated in the exemplary embodiments of FIGS. 15-19 can be readily adapted to be rendered on displays of a variety of computing device platforms running a variety of operating systems. Throughout FIGS. 15-19, displays are shown with various tiles, interactive elements, icons, command regions, windows, toolbars, menus, and buttons that are used to initiate action, invoke routines, monitor network devices, control network devices, or invoke other functionality. The initiated actions include, but are not limited to, displaying a state or status of a network device, selecting a network device to control and/or monitor, setting a primary function of a network device, setting a secondary function of a network device, and other inputs and gestures. For brevity, only the differences occurring within the figures are described below.

Figure 15:
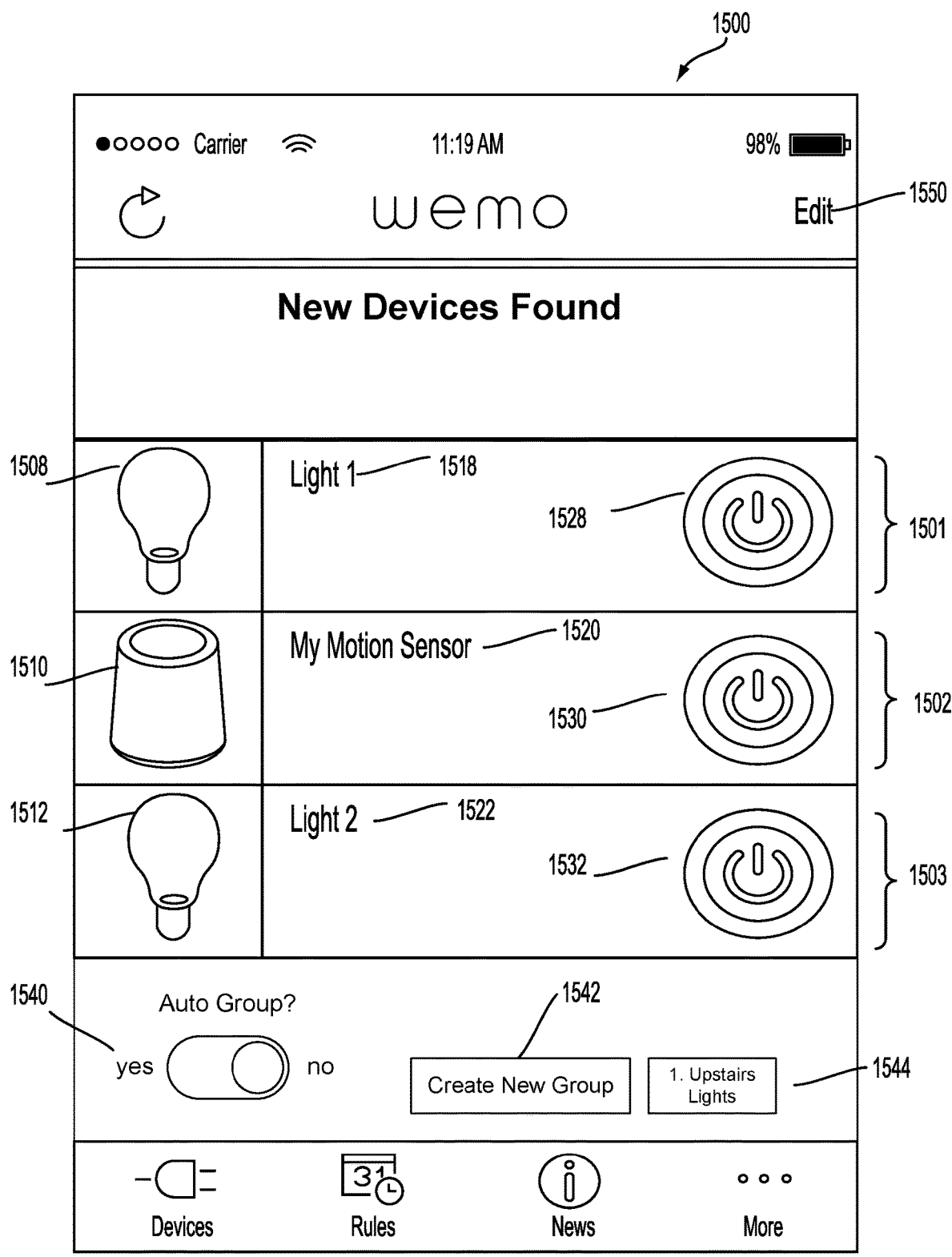
FIG. 15 illustrates an exemplary user interface display for an application on an access device, according to embodiments of the present invention.

FIG. 15 illustrates an exemplary user interface display 1500 for an application on an access device, according to embodiments of the present invention. FIG. 15 discloses a list of three exemplary network devices, including network devices 1508, 1510 and 1512, which have displays 1501, 1502 and 1503, respectively, are assigned to devices 1518, 1520 and 1522, respectively. Network device 1508 is connected to a light 1518, network device 1510 is connected to a motion sensor 1520, and device 1512 is connected to a second light 1522. Network device 1508 (or the light 1518) can be turned on by a user by pressing button 1528, network device 1510 (or the light 1520) can be turned on by a user by pressing button 1530, and network device 1512 (or the light 1522) can be turned on by a user by pressing button 1532.

When one or more new devices join the network, an access device may detect that those new devices are present on the network. For example, the access device, if connected to the local area network, may send a query or multiple queries over time to the gateway, which is connected and/or communicates with each network device on the network, requesting a response or a notification of any new network devices that are present on the network. If the access device is remote from the local area network, the access device may send a query or multiple queries over time to a cloud network, which is connected and/or communicates with the gateway and/or each network device on the network, requesting a response or a notification of any new network devices. The access device may then display the network device(s) on the display, such as display 1500.

After the access device has detected a new network device and displayed the new network devices on its display, the user may group the new network devices into an already existing group or may create a new group into which the new network devices may be placed (e.g. if the functions that the new network device(s) are capable of do not match or fit with a currently existing group). For example, the user may press "create new group" button 1542 to create and name a new group into which the user may select new and/or existing network devices. More specifically, after the user presses button 1542, the access device may create a new virtual group and store information about the virtual group (and any other groups) internally. Alternatively, the access device may send a communication to a cloud network or other external storage regarding the creation of a new group, and may subsequently store information related to any network devices that are placed in the new group. For example, the access device and/or cloud network may create and store a list/chart that includes each group and each of the network devices included in that group. The access device and/or cloud network may incorporate such information into a chart similar to table 1100, which may include the functions of each network device that is associated with each group, since the reason that certain devices are grouped together may be because of the functions that each device can perform, as represented by table 1100.

Various user interface techniques may be available for a user to add a new device to an already existing group. For example, a user may press on the tile representing a network device display and drag and drop that tile on top of a tile that represents an existing group. For example, a user may press on device display 1501 and drag that display until it is placed over the "1. Upstairs Lights" tile 1544, which represents an already existing group of lights in the upstairs of a house. Such an action may group device 1508 with group 1544. Alternatively, a user may select an existing group (by, for example, pressing on an existing group tile, such as tile 1544), and then subsequently touch the tiles associated with the network devices that the user would like to add to the group. Alternatively, the user may press on the "edit" button 1550 to edit the existing groups. For example, after pressing edit 1550, check boxes may appear next to each new device so that the user may select the devices that the user would like to place in an existing group. Thereafter, the checked devices may collapse into a group together. Various other variations of these types of user interface setups are also possible. Each time a user presses on a button within display 1500, a communication may be sent from the access device to the stored group information, whether internally or on an external storage device (e.g. cloud network, such as cloud network 114). For example, the access device may transmit a communication to the cloud network to indicate that a new device has been added to an already existing group. The communication may include a command or request to move the device information associated with the moved device to a different portion of the table or chart that includes the device grouping information. Similar transmission of communication between the access device and the storage device may occur each time a user presses/touches the display to enter a command for the access device to perform.

In each exemplary embodiment in which a user adds a device to an already existing group, or in other words edits the group profile of the system, the access device may transmit a communication to the local or external storage that houses/stores the group profile information, including data regarding the different existing groups, the network devices in each group, the different functionality of each device, and the relationships between each of the devices and each of the groups. Furthermore, each time a user clicks on a group or device to view more information about a group or device, the access device may transmit a request or query to storage so that the access device may retrieve the device/group/profile information to display/present to the user on display 1500. Furthermore, various communications may be transmitted and received between the access device and storage and any other device (e.g. cloud network) that may be controlling/performing any automatic grouping function. For example, if a different device (other than the access device) is performing the automatic grouping function, the access device may send a request to that device to perform automatic grouping based on the network devices that are existing on the network and any new network devices that have recently joined the network, along with any information collected about the functions/capabilities of the network devices. The device performing automatic grouping may then transmit back to the access device information about its suggested grouping so that the access device may present the grouping information to the user on its display. If the user makes any edits/changes to the suggested grouping, the access device may transmit back to the automatic grouping device a communication indicating the changes made by the user so as to allow the device to learn and adapt regarding the user's preferences and/or any judgment calls it made when preparing a suggested grouping profile for the access device/user.

As described herein, new (or existing) network devices may be presented to the user, for example via a display on an access device, for the device (automatically) or the user (manually) to decide which devices should be grouped together into existing or new groups. Since the access device may determine which devices are present and what the functions are of each of those devices, the access device may dynamically adjust the presentation of the list of devices available to be grouped based on both functions that each device is capable of and selections made by the user. For example, if a user selects a device to be placed in a certain group, a access device may remove certain other devices from the display or mark other devices as devices that are unable to be grouped with the device selected by the user. More specifically, for example, if an access device displays network devices that are or are connected to a light and a coffee maker, and if a user selects the device that is or is connected to a light, the access device may remove the coffee maker network device from the display if the access device determined that, based on the capable functions of the light and the coffee maker, the light and the coffee maker cannot or should not be grouped. Such a decision to not allow grouping of certain devices together may be based on the functions of those devices and/or the capabilities of the access device/system to control such devices at the same time. Instead of removing the coffee maker from the display completely, the access device may mark the device as being unable to be grouped with the selected device, such as by graying out the display of the coffee maker device or placing the display towards the bottom of the access device display in a list for devices that cannot be grouped with the selected device. In certain embodiments, the access device may provide functionality at the access device for the user to override the choice of the access device to prevent the light and the coffee maker from being grouped.

Figure 16:
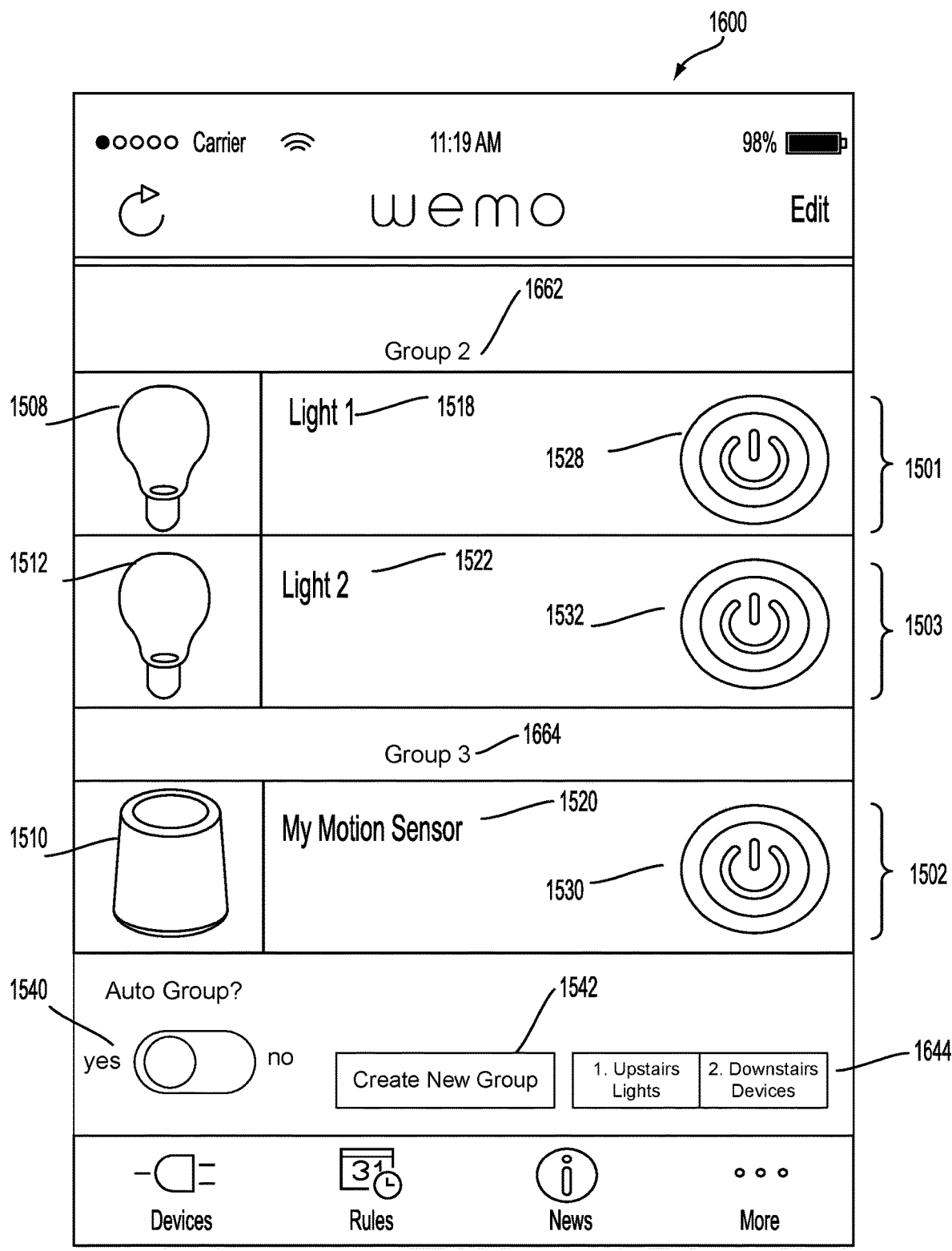
FIG. 16 illustrates an exemplary user interface display for an application on an access device, according to embodiments of the present invention.

FIG. 16 illustrates an exemplary user interface display 1600 for an application on an access device, according to embodiments of the present invention. After the access device has detected a new network device, the access device or another device on the network may also automatically group the new network device(s) into an already existing group or into a new group, if the functions that the new network device(s) are capable of do not match or fit with a currently existing group. The access device (or a network device or a cloud network connected to the network) may automatically group the new devices found into existing groups and/or into new groups after the new network devices are detected. Alternatively, the user may select the auto group function (turn the function on) by selecting "yes" at the auto group slider 1640. After the access device auto groups the new network devices, the display 1300 may show the network device displays 1501, 1502 and 1503 rearranged into groups, such as group 1662 and group 1664.

After automatic grouping is performed on new or existing network devices on the network, the access device may present its suggested groupings to the user. The user may then, as noted, edit the groupings by moving network devices into different groups, creating new groups, or removing network devices from groups altogether. Automatic grouping is a function that should subtract from the amount of work the user must do to group new network devices, for example if many different new network devices have joined the group at the same time.

Figure 17:
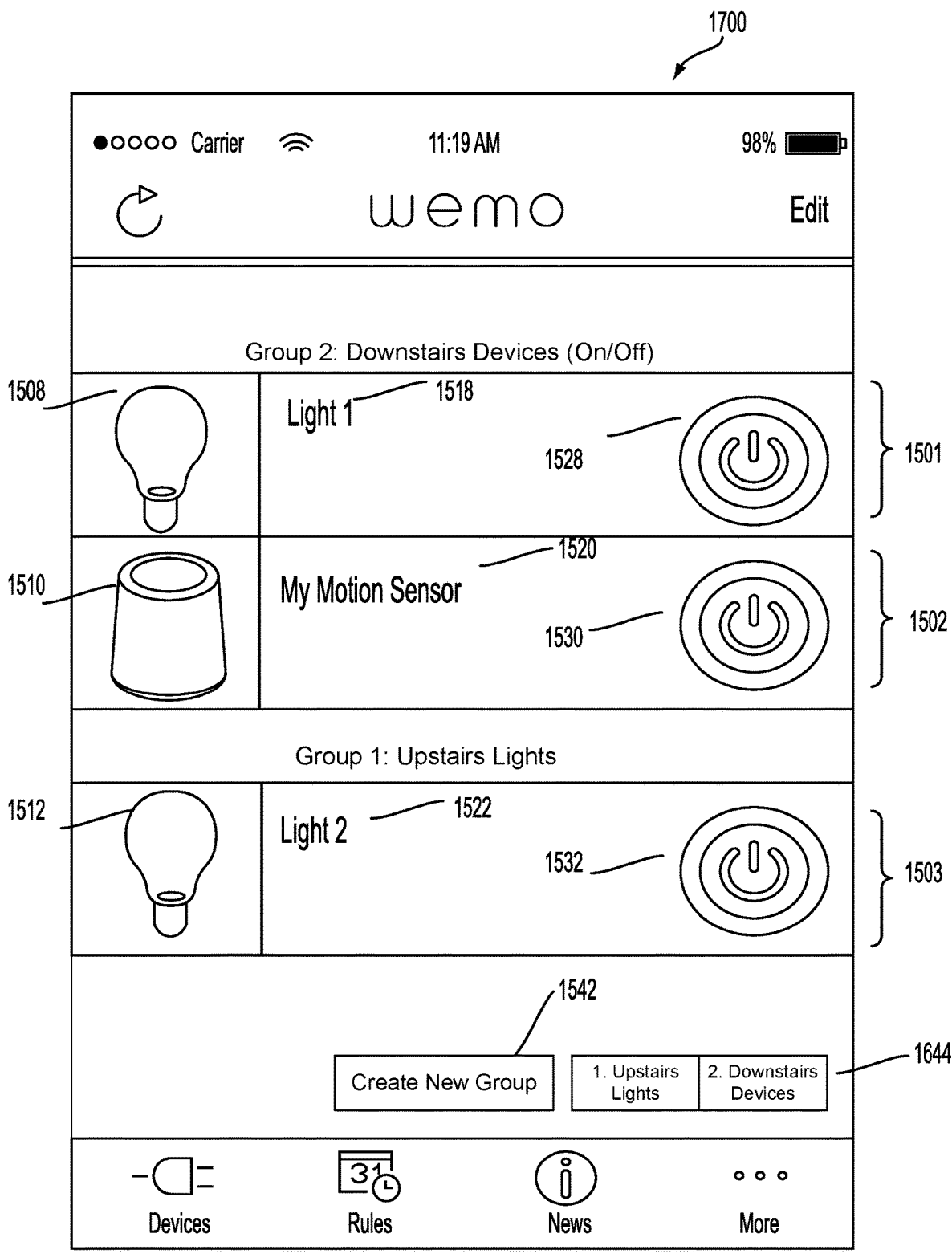
FIG. 17 illustrates an exemplary user interface display for an application on an access device, according to embodiments of the present invention.

An example of such an edited profile of groups is shown in FIG. 17. FIG. 17 illustrates an exemplary user interface display 1700 for an application on an access device, according to embodiments of the present invention. Display 1700 is similar to display 1600 except that group 3 has been removed (for example, because the user did not believe that adding a new group was necessary as device 1510 belongs in an already existing group), device 1510 has been moved to group 2 (for example, because the user added device 1510 to an existing group that includes "downstairs devices"), and device 1512 has been added to group 1 (for example, because the user added device 1512 to an existing group that includes "upstairs lights"). For example, automatic grouping by the access device may have placed certain network devices into groups that were undesirable for the user. For example, the user may not want to control device 1508 and 1512 together. Instead, the user may intend to connect sensor 1510 to device 1508, and therefore would like those devices to be controlled together, even if devices 1508 and 1512, each connected to lights, were logically appropriate to be grouped together.

Figure 18:
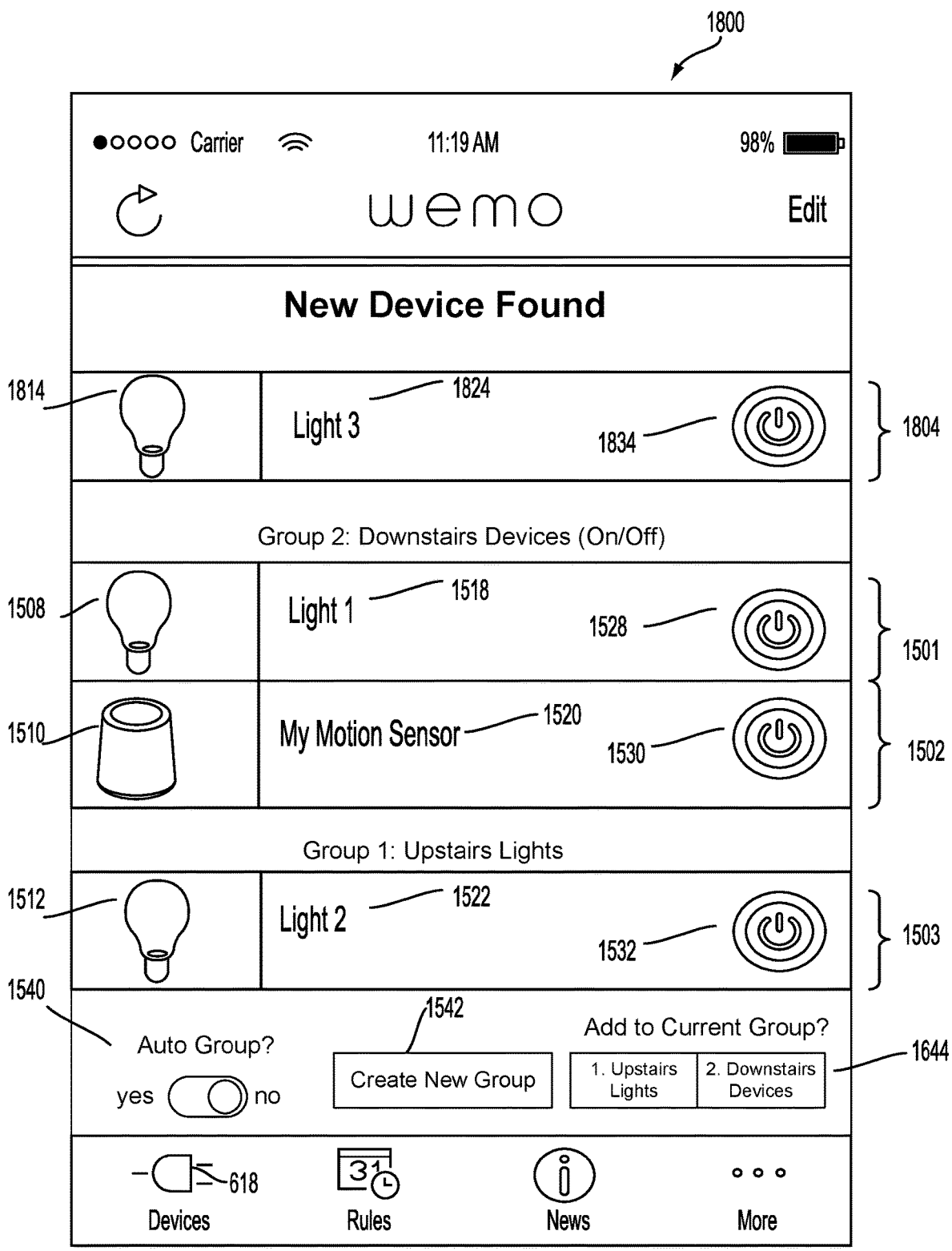
FIG. 18 illustrates an exemplary user interface display for an application on an access device, according to embodiments of the present invention.

FIG. 18 illustrates an exemplary user interface display 1800 for an application on an access device, according to embodiments of the present invention. Display 1800 includes a new network device 1814, which has just joined the same local area network as devices 1508, 1510 and 1512. Device 1814 has a display 1804, and is assigned to device 1824 (light 3). Network device 1814 (or the light 1824) can be turned on by a user by pressing button 1834.

Figure 19:
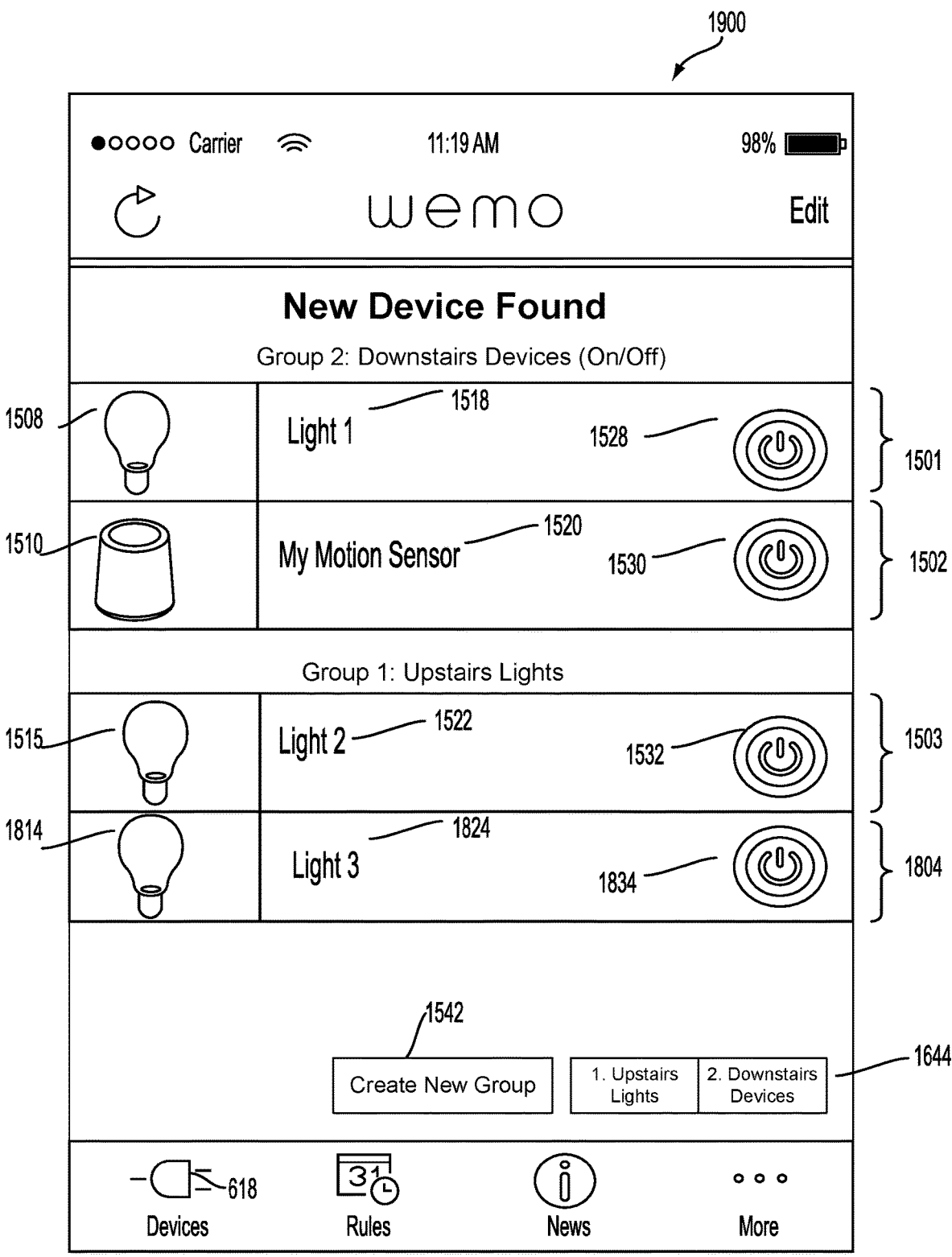
FIG. 19 illustrates an exemplary user interface display for an application on an access device, according to embodiments of the present invention.

New network device 1814 may be added to an already existing group, may be added to a newly created group, or may not be added to a group at all. New device 1814 may be added to a group (or may not be added to a group) by either the user or the process or automatic grouping, or by a user edit after automatic grouping has completed. Whether by automatic grouping or completed by the user, FIG. 19 shows that new device 1814 (light 1824) has been added to group 1. For example, device 1814 may be located upstairs in the user's house. The automatic grouping function may have detected that the new network device 1814 was located upstairs, it may have detected that the new network device 1814 was located close to light 2, it may have detected that the new network device 1814 was purchased at approximately the same time as light 2 (based on, for example, their serial numbers), among other possible methods to determine the most appropriate grouping (if any) for new device 1814.

In an alternative embodiment of the present invention, after a new network device is detected by the access device, the access device (e.g. display 1800 or 1900) may present a query to the user regarding whether the new device should be placed in a certain existing (or new) group. The access device may present possible answers to the query for the user to choose from, including a list of existing groups, an option to generate a new group, an option to select "no group", an option for the access device to auto group the new network device for the user, among others.

As noted, a user may be presented with a query before a new network device is added to the network to authenticate the new access device. The access device may present a query, regarding whether the new device should be placed in a certain existing group, to the user at the same time that the access device presents a query regarding whether the user would like to authenticate the new network device and allow the new network device to join the network. Therefore, the access device may present a possible answer to the query for the user to choose that includes a confirmation of authentication for the new network device and a command/request to include the new network device in a certain existing (or new) group or a command/request to auto group the new network device once the network device has joined the network.

As noted with respect to FIGS. 3-4, network devices in the network and an access device connected to the network may each receive communication from other devices around the network, including the status of each of those network devices. Network devices in the local area network may also share device grouping information with other devices in the network. More specifically, network devices may share information related to which group they are in, the other devices in the group with them, the functions they are capable of performing, the common functions/capabilities of the devices within the network (e.g. the functions/capabilities that each device in the network may be capable of performing), what groups the devices have been associated with in the past, among other information. The devices may also share information or give notifications to other devices in the network and/or an access device and/or a cloud network any changes in the network (e.g. a device left the network, a new network device was detected and/or joined the network, a network device gained or lost a capability, etc.). Furthermore, as also noted with respect to FIGS. 3-4, since each network devices and access device may each receive communication from other devices around the network, including the status of each of those devices, each network device within the network may know the status of each other network device in the network. For example, the access device or network devices may not be required to communicate with the cloud network connected to the network or gateway in the network in order to obtain one or more of such statuses. Therefore, each network device within the network may know the device group information of each other network device in the network. For example, the access device or network devices may not be required to communicate with the cloud network connected to the network or gateway in the network in order to obtain such device grouping information.

More specifically, when a new access device, for example, connects to the network, the access device may be detected by other devices on the network. Alternatively, the new access device may transmit a communication/notification to the network devices announcing that the new network device is present on the network. Upon detecting or receiving notification of the presence of the new access device, a network device (or gateway) may transmit a communication to the new access device with device grouping information (separately or along with its status information, as described with respect to FIGS. 3-4) so that the new access device stores and maintains the same or similar network information than the rest of the already existing network devices.

Furthermore, the network devices and/or access device may be continuously scanning the network to determine whether any devices within the network have moved, turned on/off or otherwise added to or subtracted from the network, or have otherwise changed statuses/grouping information. Therefore, any network device on the network may detect such changes and then shortly thereafter each device on the network may know about those changes. Therefore, if the access device or another device would like to retrieve group information related to one or more network devices, the device may either already have that information stored or may transmit a communication (e.g. query/request) to another device (e.g. a device on the network) to request that information, after which the device may receive the information from the other device.

A certain set of groupings of network devices may be considered as a certain setup or "profile" of groupings and network devices. Since each device on the network shares grouping information with each other device, each device may store this setup or profile information related to the current device groupings (current profile) and past device groupings (previous profiles). If a new user and/or access device connects to the network, the access device may either already have the current device grouping information stored or may transmit a communication (e.g. query/request) to another device (e.g. a device on the network) to request that information. The access device may then present that grouping information to the user on its display.

Figure 20:
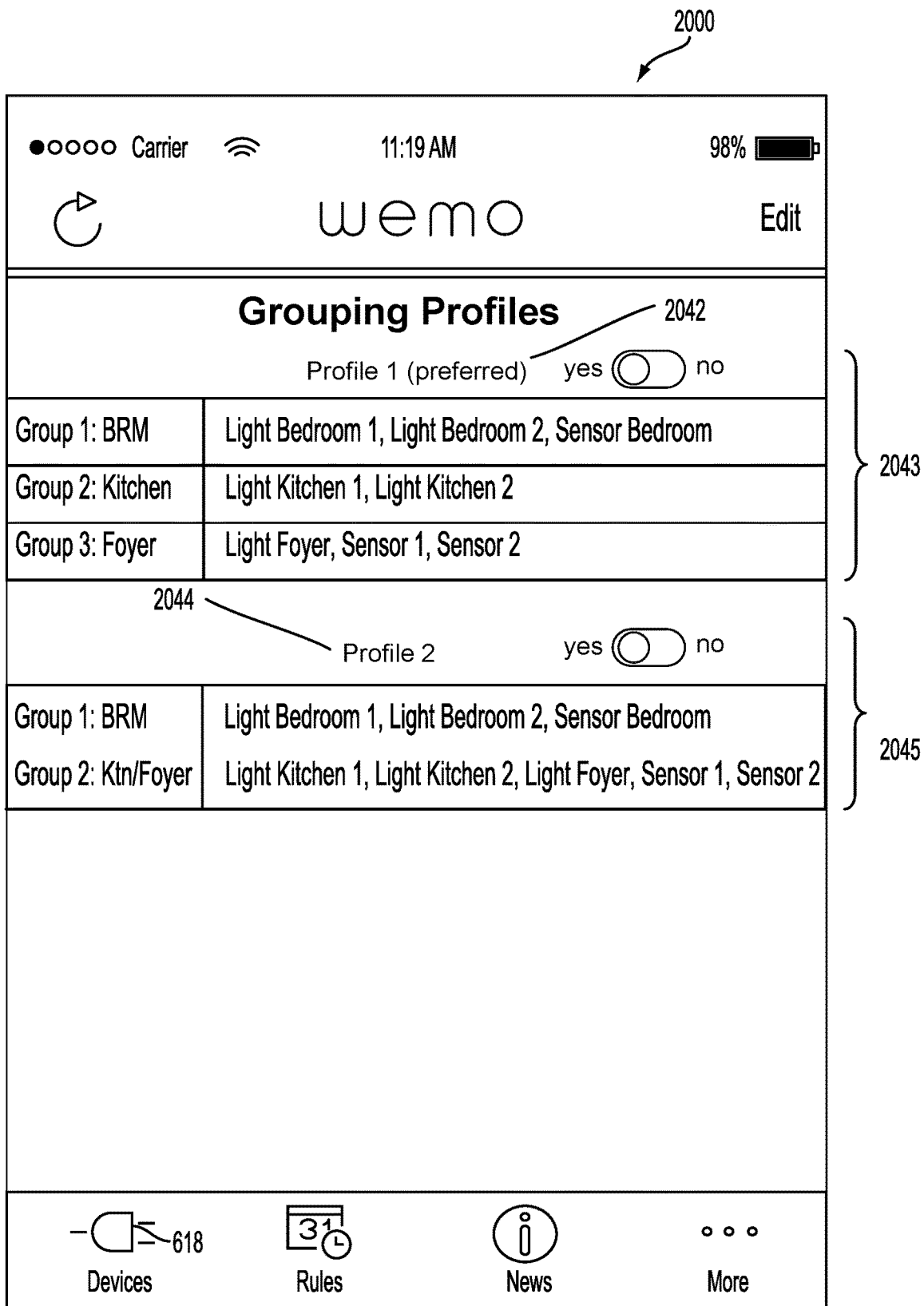
FIG. 20 illustrates an exemplary user interface display for an application on an access device, according to embodiments of the present invention.

FIG. 20 illustrates an exemplary user interface display 2000 for an application on an access device, according to embodiments of the present invention. As noted, the access device, which may include a user interface display similar to display 2000, may present grouping information to the user. For example, the access device may display current (i.e. latest) device grouping information on the display. Alternatively, the access device may present to the user a profile other than the latest profile to be used by a different user or access device. Instead, the access device may present to the user a previously used grouping profile or a list of previously (and currently) used grouping profiles for the user to choose from, as shown in FIG. 20 on displays 2043 and 2044. More specifically, profile 2042, the profile presented to the user as a preferred profile, is presented on display 2043, and profile 2044, presented on display 2045, may be presented to the user at the same time. The user or access device may then choose which profile to use based on their personal preferences. The access device may also have preferences (either based on the user's preferences or otherwise), and therefore may select a profile automatically based on those preferences.

A previous grouping may be in the form of a previous "preferred" grouping profile. In other words, a device/network (e.g. a device, gateway, access device, and/or cloud connected to the network) may adjust the grouping information (profile) over time to obtain a preferred grouping profile. The preferred grouping profile may be the profile that was preferred by users more than any other profile, or may be a combination of multiple preferred profiles. The access device may present only the preferred grouping profile to a new user, or may present multiple (or all) previous profiles to the user while suggesting the preferred profile for use.

Grouping profiles may be accountless (or, in other words, not tied to a specific user or user account). In other words, since each network device may have stored any grouping profiles used by any previous user, and may also compile new profiles based on use statistics of those previous users, any new user and/or access device that connects to the network may obtain the grouping information without obtaining a previous user's profile or credential information (e.g. username and/or SSID and/or password).

Figure 21:
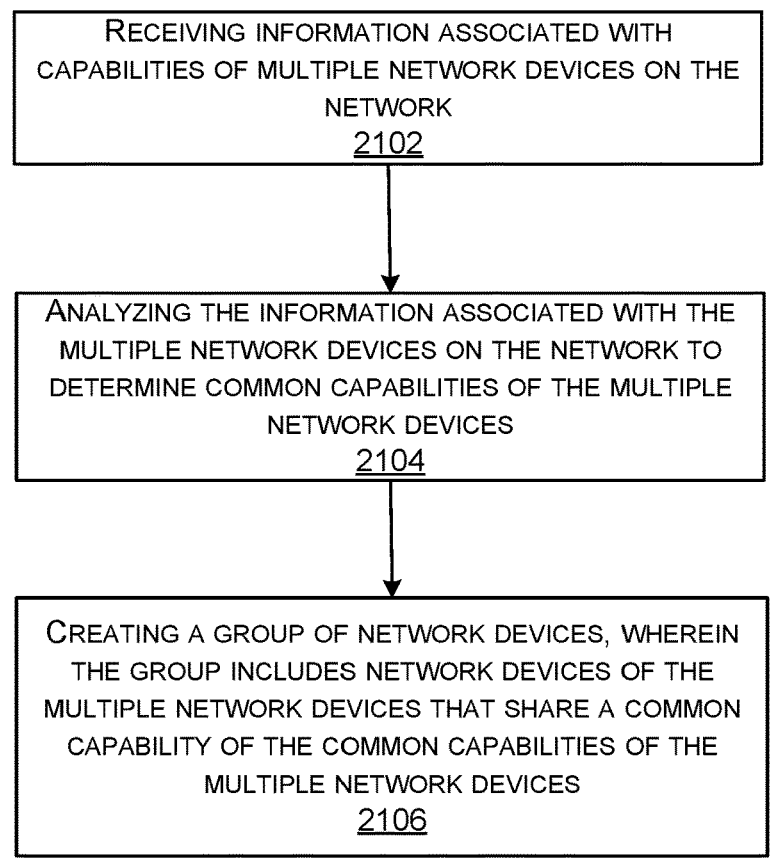
FIG. 21 is a flow chart showing an exemplary process for a network to automatically select grouping for network devices on a network, according to embodiments of the present invention. according to embodiments of the present invention.

FIG. 21 is a flow chart 2100 showing an exemplary process for a network to automatically select grouping for network devices on a network, according to embodiments of the present invention. Step 2102 includes receiving information associated with capabilities of the multiple network devices on the network. For example, network devices may, as described herein, open a setup access point through which an existing network device may connect to the network device(s). Such a setup access point may communicate with its surrounding area and devices in that area that the device has been powered on and is ready to join a network. After one or more network devices have connected to an existing device on a network, the devices may transmit identification information related to the network device to an existing network device so that the existing device on the network and the network may know who the network device is. Furthermore, such information may allow the existing device and the network to authenticate the device trying to connect to it.

Step 2104 includes analyzing the information associated with the multiple network devices on the network to determine common capabilities of the multiple network devices. The received capabilities of the network devices may be analyzed (e.g. compared) to determine if the network devices have one or more common capabilities. For example, if the multiple network devices are each light bulbs, the network devices may have several common capabilities (e.g. turning on and off, dimming, etc.). Disparate devices may also have common capabilities.

Step 1206 includes creating a group of network devices, wherein the group includes network devices of the multiple network devices that share a common capability of the common capabilities of the multiple network devices. Once any common capabilities of the network devices are determined based on the analysis (performed by, for example, an access device, a cloud network, an existing network device, etc.), the devices may be grouped together based on those devices that share a common capability. The devices may then be controlled at the same time, and as such treated as one virtual device.

Figure 22:
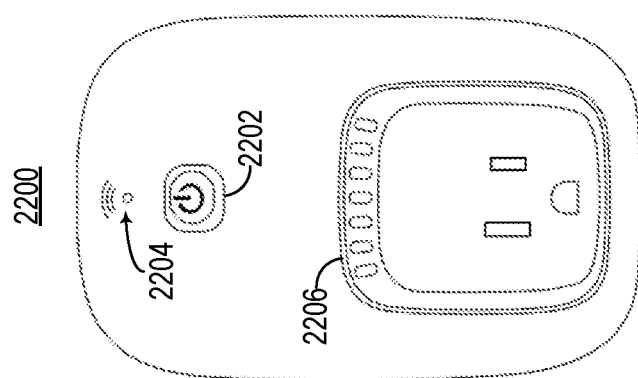
FIG. 22 illustrates an example of a front view of a network device, according to embodiments of the present invention.
Figure 23:
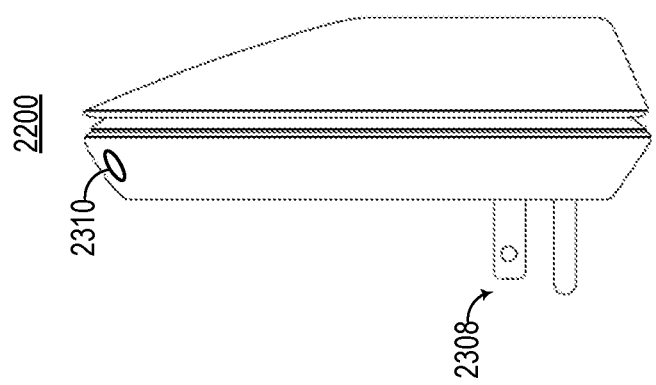
FIG. 23 illustrates an example of a side view of a network device, according to embodiments of the present invention.

FIG. 22 illustrates an example of a front view of a network device 2200. FIG. 23 illustrates an example of a side view of the network device 2200. The network device 2200 may include any of the network devices 102, 104, or 106 described herein. In some embodiments, the network device 2200 may be a home automation network device. For example, the network device 2200 may include a home automation switch that may be coupled with a home appliance. A user may wirelessly access the network device 2200 in order to access, control, and/or configure various home appliances located within the user's home. For instance, the user may remotely control appliances such as a television, radio, light, microwave, iron, space heater, wall A/C unit, washer, dryer, fan, and/or the like.

In some embodiments, the network device 2200 may include a WiFi enabled switch that connects home appliances and other electronic devices to a compatible 802.11b/g/n/ac WiFi network. The network device 2200 may thus allow users to locally or remotely turn devices on or off from anywhere, program customized notifications, and/or change device status. The network device 2200 may further allow a user to create custom schedules or have devices respond to sunrise or sunset.

The network device 2200 includes an power switch 2202 that may be depressed in order to turn the network device 2200 on and off. In some embodiments, a light source may be integrated with or located behind the power switch. For example, a light-emitting diode (LED) may be located on a circuit board under the power button 2202. The light source may be illuminated when the network device 2200 is powered on, and may not be illuminated when the network device 2200 is powered off.

The network device 2200 further includes a communications signal indicator 2204. The signal indicator 2204 may indicate whether the network device 2200 has access to a communications signal, such as a WiFi signal. For example, the signal indicator 2204 may include a light source (e.g., a LED) that illuminates when the network device 2200 is connected to a communications signal. The light source may depict different colors or other characteristics (e.g., flashing, dimming, or the like) to indicate different levels of signal strength or mode of operation.

The network device 2200 includes a restore button 2310. The restore button 2310 may allow a user to reset the network device 2200 to factory default settings. For example, upon being depressed, the restore button 2310 may cause all software on the device to be reset to the settings that the network device 2200 included when purchased from the manufacturer.

The network device 2200 further includes a plug 2308 and an outlet 2206. The plug 2308 allows the network device 2200 to be plugged into a wall socket, such as a socket providing 120V, 220V, or the like. In turn, an appliance may be plugged into the outlet 2206. Once the network device 2200 is registered according to the techniques described above, an appliance plugged into the socket 2206 may be controlled by a user using an access device (e.g., access device 108).

Figure 24:
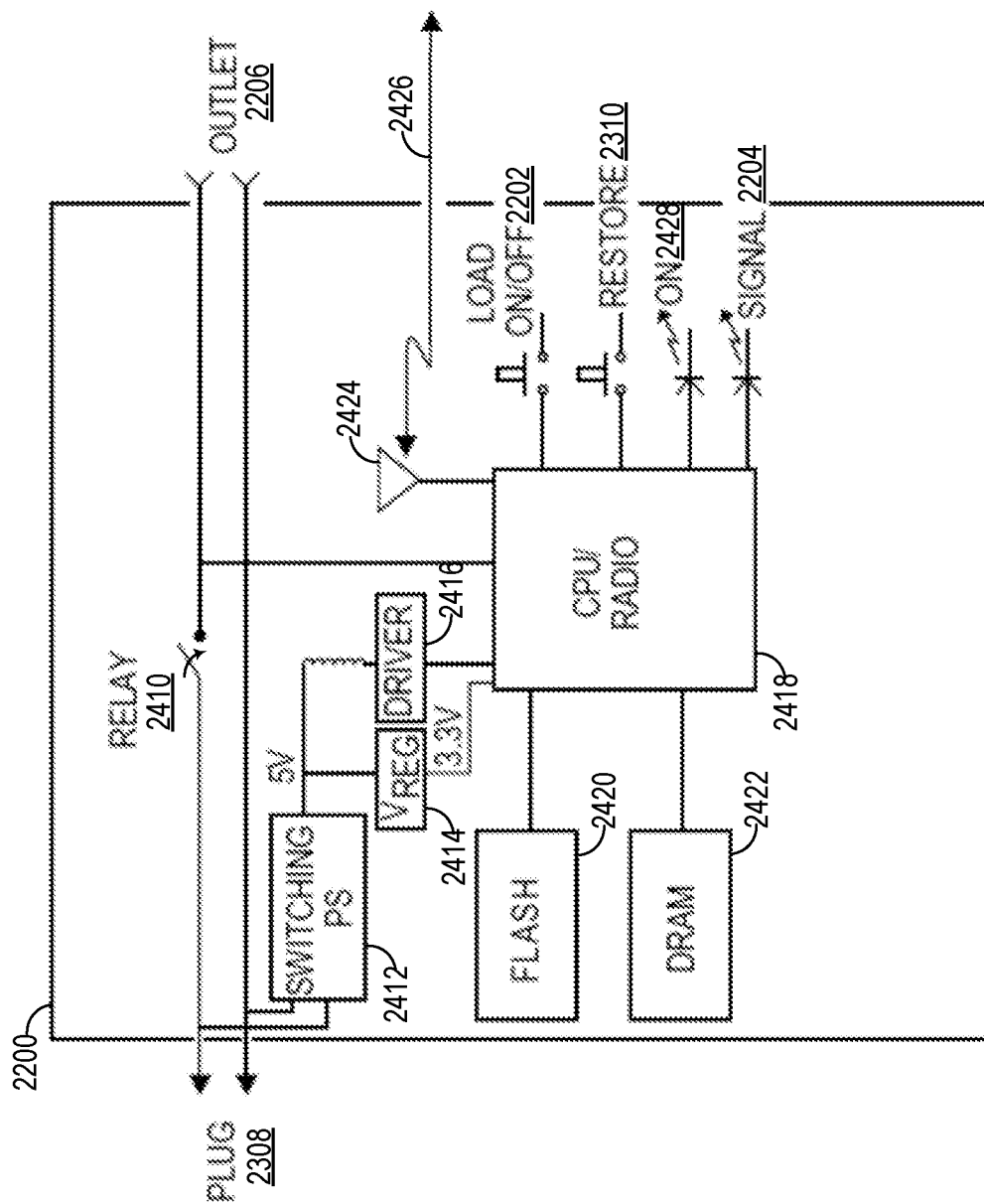
FIG. 24 illustrates an example of a block diagram of a network device, according to embodiments of the present invention.

FIG. 24 is an example of a block diagram of the network device 2200 depicting different hardware and/or software components of the network device 2200. As described above with respect to FIGS. 22 and 23, the network device 2200 includes the outlet 2206, the plug 2308, the power button 2202, the restore button 2310, and the communications signal indicator 2204. The network device 2200 also includes light source 2428 associated with the power button 2202. As previously described, the light source 2428 may be illuminated when the network device 2200 is powered on.

The network device 2200 further includes a relay 2410. The relay 2410 is a switch that controls whether power is relayed from the plug 2308 to the outlet 2206. The relay 2410 may be controlled either manually using the power button 2202 or remotely using wireless communication signals. For example, when the power button 2202 is in an ON position, the relay 2410 may be closed so that power is relayed from the plug 2308 to the outlet 2206. When the power button 2202 is in an OFF position, the relay 2410 may be opened so that current is unable to flow from the plug 2308 to the outlet 2206. As another example, an application or program running on an access device may transmit a signal that causes the relay 2410 to be opened or closed. For instance, an access application may display a graphical interface on the access device that includes a power button. The user may tap or otherwise select the power button, and the access application may send a communication signal (e.g., over a WiFi network) to the network device 2200 instructing the network device 2200 to open or close the relay 2410.

The network device 2200 further includes flash memory 2420 and dynamic random access memory (DRAM) 2422. The flash memory 2420 may be used to store instructions or code relating to an operating system, one or more applications, and any firmware. The flash memory 2420 may include nonvolatile memory so that any firmware or other program can be can updated. In the event the network device 2200 loses power, information stored in the flash memory 2420 may be retained. The DRAM 2422 may store various other types of information needed to run the network device 2200, such as all runtime instructions or code.

The network device 2200 further includes a CPU/Radio 2418. The CPU/Radio 2418 controls the operations of the network device 2200. For example, the CPU/Radio 2418 may execute various applications or programs stored in the flash memory 2420 and/or the dynamic random access memory (DRAM) 2422. The CPU/Radio 2418 may also receive input from the various hardware and software components, interpret the input, and perform one or more functions in response to the input. As one example, the CPU/Radio 2418 may determine whether the power button 2202 has been pressed, and determines whether the relay 2410 needs to be opened or closed. The CPU/Radio 2418 may further perform all communications functions in order to allow the network device 2200 to communicate with other network devices, one or more gateways, a cloud network, and/or one or more access devices. While the CPU and radio of the network device 2200 are shown to be combined in the CPU/Radio 2418, one of ordinary skill in the art will appreciate that, in some embodiments, the CPU and radio may be separately located within the network device 2200. For example, CPU circuitry may be situated at a separate location on a circuit board from the location of radio circuitry, the CPU circuitry may be located on a different circuit board from the radio circuitry, or the like.

The network device 2200 may communicate with other devices and/or networks via antenna 2424. For example, antenna 2424 may include a 2.4 GHz antenna, a 5 GHz antenna, or the like, that can transmit and receive WiFi communications signals. The antenna 2424 may include other types of antennas that can communicate Bluetooth® signals, Zigbee® signals, Ultra-Wideband (UWB) signals, and/or the like. In some embodiments, the network device 2200 may include multiple antennas for communicating different types of communication signals. As one example, the network device 2200 may include both a 2.4 GHz antenna and a 5 GHz antenna.

The network device 2200 further includes a driver 2416, a switching power supply 2412, and a voltage regulator 2414. The driver 2416 may include instructions or code that can be used to translate control signals or commands received from applications running on the DRAM 2422 to commands that the various hardware components in the network device 2200 can understand. In some embodiments, the driver 2416 may include an ambient application running on the DRAM 2422. The switching power supply 2412 may be used to transfer power from the outlet in which the plug 2308 is connected to the various loads of the network device 2200 (e.g., CPU/Radio 2418). The switching power supply 2412 may efficiently convert the voltage and current characteristics of the electrical power to a level that is appropriate for the components of the network device 2200. For example, the switching power supply 2412 may perform AC-DC conversion. In some embodiments, the switching power supply 2412 may be used to control the power that is relayed from the plug 2308 to the outlet 2206. The voltage regulator 2414 may be used to convert the voltage output from the switching power supply 2412 to a lower voltage usable by the CPU/Radio 2418. For example, the voltage regulator 2414 may regulate the DC voltage from 5V to 3.3V.

In various embodiments, functions may be stored as one or more computer-program products, such as instructions or code, in a non-transitory machine-readable storage medium, such as the flash memory 2420 and/or the DRAM 2422. The network device 2200 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 2, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. 2. The memory, such as the flash memory 2420 and/or the DRAM 2422, may be a processor-readable memory and/or a computer-readable memory that stores software code (programming code, instructions, etc.) configured to cause a processor(s) within the CPU/Radio 2418 to perform the functions described. In other embodiments, one or more of the functions described may be performed in hardware.

A set of these instructions and/or code might be stored on a non-transitory machine-readable storage medium, such as the flash memory 2420 and/or the DRAM 2422. In some cases, the storage medium might be incorporated within a computer system, such as the CPU/Radio 2418. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the network device 2200 and/or might take the form of source and/or installable code, which, upon compilation and/or installation on the network device 2200 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

It should be appreciated that the network device 2200 may have other components than those depicted in FIGS. 22-24. Further, the embodiment shown in the figures are only one example of a network device that may incorporate an embodiment of the invention. In some other embodiments, network device 2200 may have more or fewer components than shown in the figure, may combine two or more components, or may have a different configuration or arrangement of components.

Figure 25:
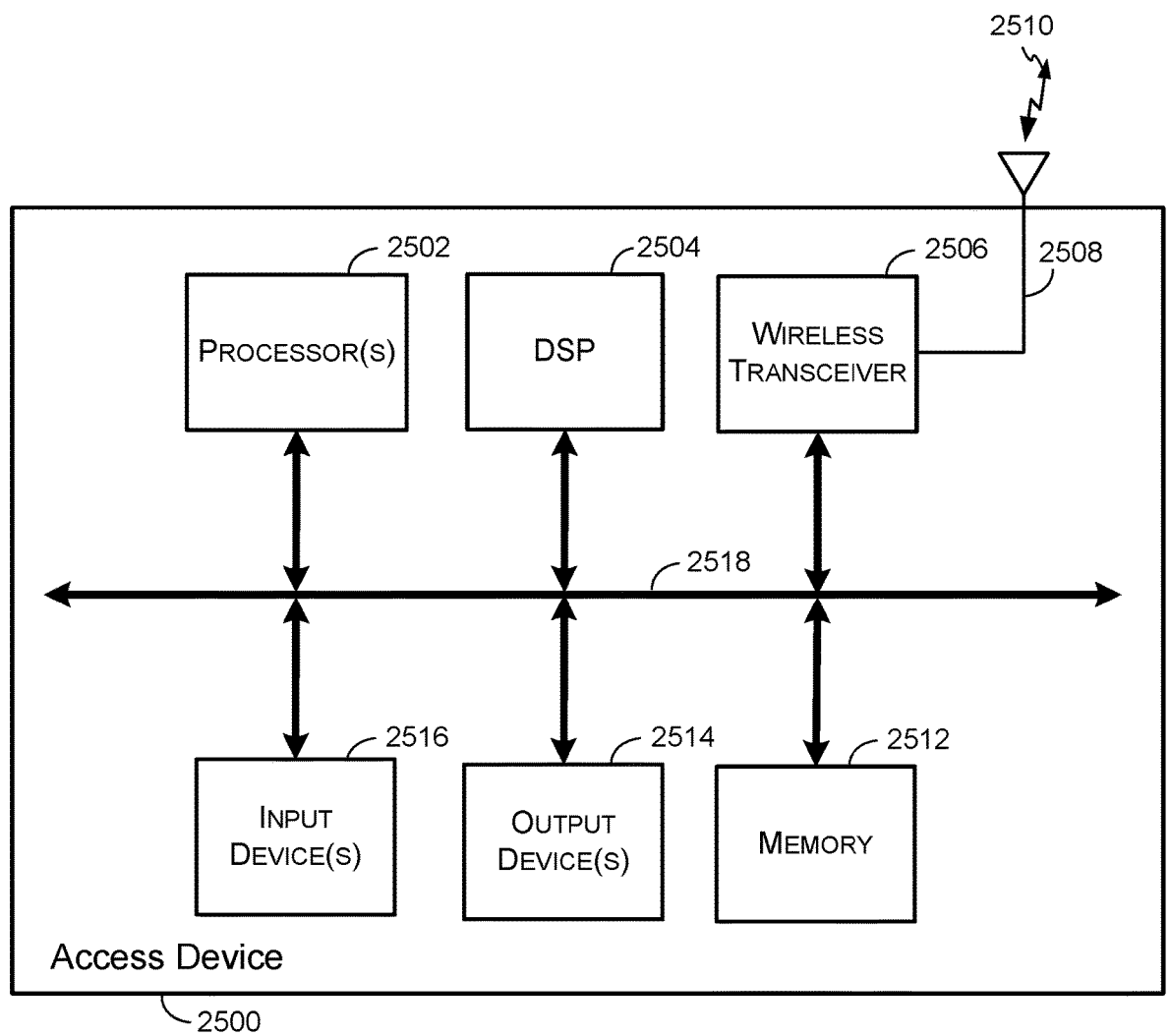
FIG. 25 illustrates a block diagram illustrating an example of an access device, according to embodiments of the present invention.

FIG. 25 illustrates an example of an access device 2500. The access device 2500 may include any human-to-machine interface with network connection capability that allows access to a network. For example, the access device 2500 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., television, refrigerator, security system, game console, browser, or the like), a speech or gesture interface (e.g., Kinect™ sensor, Wiimote™, or the like), an internet of things (IoT) device interface (e.g., an Internet enabled appliance such as a wall switch, a control interface, or the like). The access device 2500 includes hardware elements that can be electrically coupled via a bus 2518 (or may otherwise be in communication, as appropriate). In one embodiment, the bus 2518 can be used for the processor(s) 2502 to communicate between cores and/or with the memory 2512. The hardware elements may include one or more processors 2502, including without limitation one or more general-purpose processors and/or one or more special-purpose processors (such as digital signal processing chips, graphics acceleration processors, and/or the like); one or more input devices 2516, which can include without limitation a camera, a mouse, a keyboard, a touch sensitive screen, a touch pad, a keypad, and/or the like; and one or more output devices 2514, which can include, without limitation, a display, a printer, and/or the like.

The access device 2500 may include one or more wireless transceivers 2506 connected to the bus 2518. The wireless transceiver 2506 may be operable to receive wireless signals (e.g., signal 2510) via antenna 2508. The wireless signal 2510 may be transmitted via a wireless network. In some embodiments, the wireless network may be any wireless network such as a wireless local area network (e.g., local area network 100), such as WiFi, a Personal Access Network (PAN), such as Bluetooth® or Zigbee®, or a cellular network (e.g. a GSM, WCDMA, LTE, CDMA2000 network). Wireless transceiver 2506 may be configured to receive various radio frequency (RF) signals (e.g., signal 2510) via antenna 2508 from one or more gateways, network devices, other access devices, cloud networks, and/or the like. Access device 2500 may also be configured to decode and/or decrypt, via the DSP 2504 and/or processor(s) 2502, various signals received from one or more gateways, network devices, other access devices, cloud networks, and/or the like.

The access device 2500 may further include (and/or be in communication with) one or more non-transitory machine-readable storage mediums or storage devices (e.g., memory 2512), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 2512, such as RAM, ROM, FLASH, or disc drive, and executed by processor(s) 2502 or DSP 2504. The access device 2500 can also comprise software elements (e.g., located within the memory 2512), including, for example, an operating system, device drivers, executable libraries, and/or other code, such as one or more application programs, which may comprise computer programs implementing various functions. Memory 2512 may be a non-transitory machine-readable storage medium, processor-readable memory, and/or a computer-readable memory that stores the one or more computer-program products configured to cause the processor(s) 2502 and/or DSP 2504 to perform the various functions. In other embodiments, the various functions described may be performed in hardware.

Figure 26:
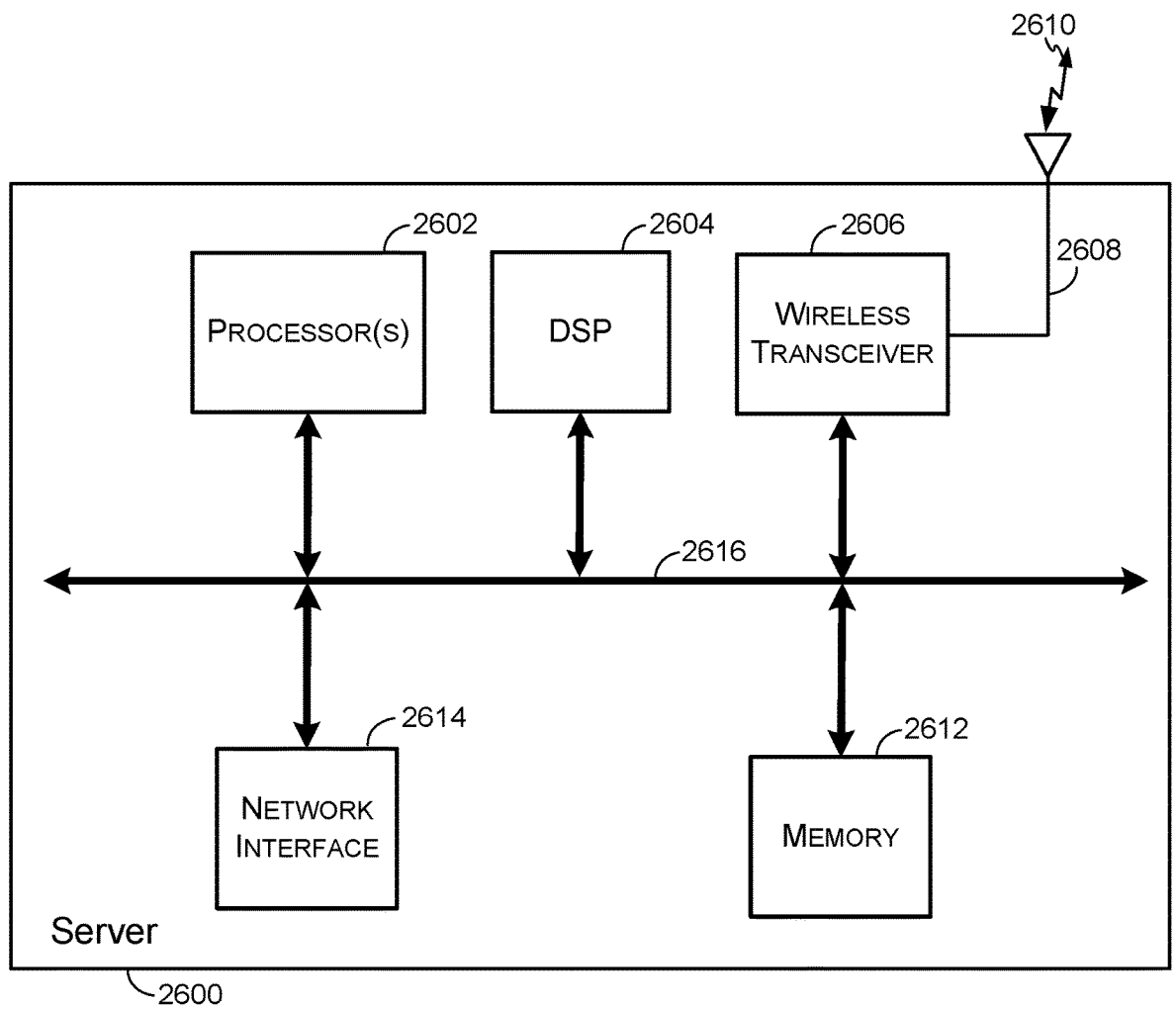
FIG. 26 illustrates a block diagram illustrating an example of a server, in accordance with some embodiments.

FIG. 26 illustrates an example of a server 2600. The server 2600 includes hardware elements that can be electrically coupled via a bus 2616 (or may otherwise be in communication, as appropriate). In one embodiment, the bus 2616 can be used for the processor(s) 2602 to communicate between cores and/or with the memory 2612. The hardware elements may include one or more processors 2602, including without limitation one or more general-purpose processors and/or one or more special-purpose processors (such as digital signal processing chips, graphics acceleration processors, and/or the like), memory 2612, DSP 2604, a wireless transceiver 2606, a bus 2616, and antenna 2608. Furthermore, in addition to the wireless transceiver 2606, server 2600 can further include a network interface 2614 to communicate with a network (e.g., a local area network, a network of a preferred carrier, Internet, etc.).

The server 2600 may further include (and/or be in communication with) one or more non-transitory machine-readable storage mediums or storage devices (e.g., memory 2612), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more one or more computer-program products, such as instructions or code, in memory 2612. The server 2600 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. 2. The memory 2612 may be a non-transitory machine-readable storage medium, processor-readable memory, and/or a computer-readable memory that stores the one or more computer-program products configured to cause the processor(s) 2602 to perform the functions described. In other embodiments, one or more of the functions described may be performed in hardware.

A set of these instructions and/or code might be stored on a non-transitory machine-readable storage medium, such as the memory 2612. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the server 2600 and/or might take the form of source and/or installable code, which, upon compilation and/or installation on the server 2600 (e.g., using any of a variety of generally available compilers, installation programs, compression/decompression utilities, etc.) then takes the form of executable code.

Figure 27:
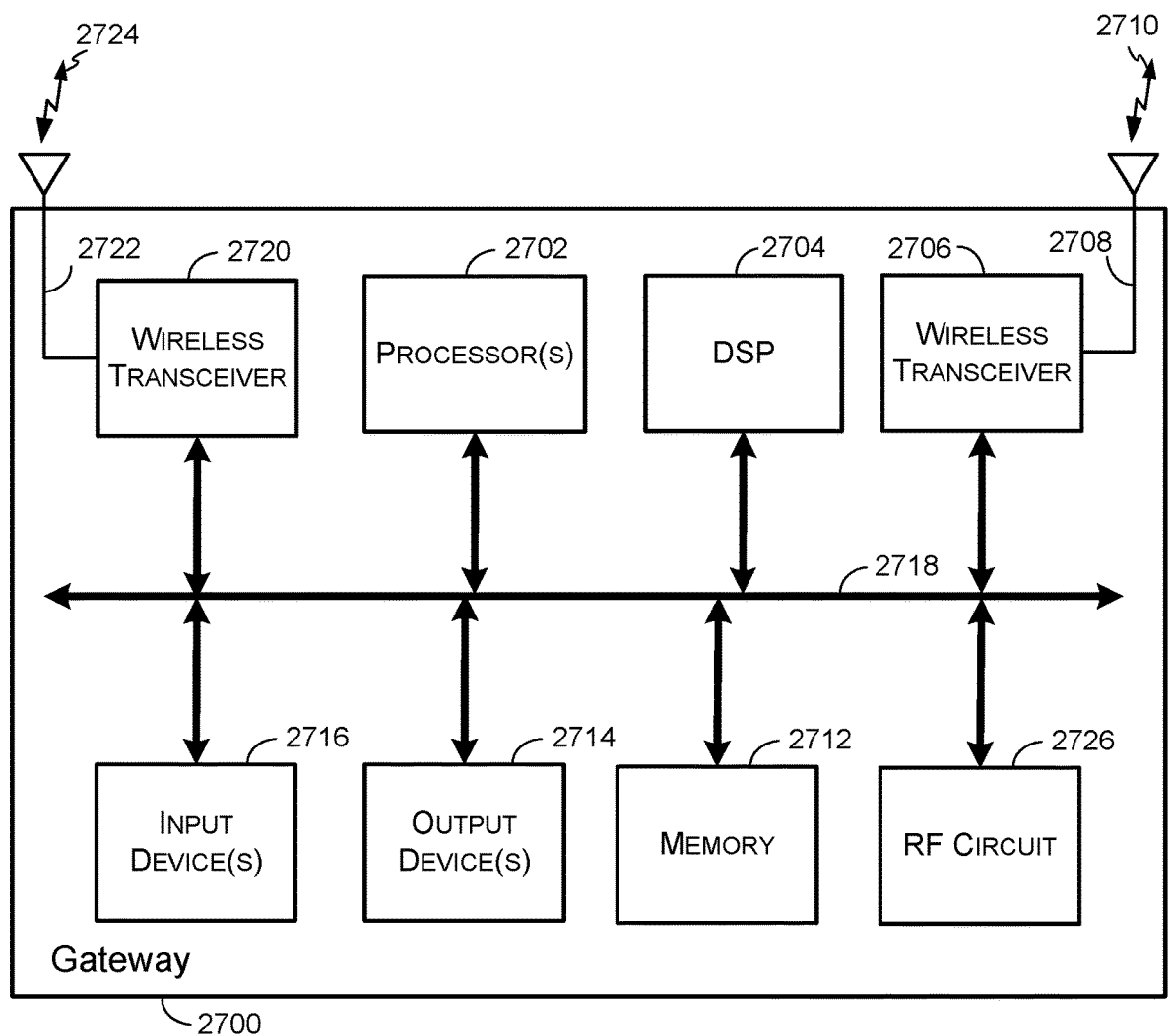
FIG. 27 illustrates a block diagram illustrating an example of a gateway, in accordance with some embodiments.

FIG. 27 illustrates an example of a gateway 2700. The gateway 2700 may include a range extending device, a router, an access point, a modem, and/or any other device that provides network access among one or more computing devices and/or external networks. For example, the gateway 2700 may include a router gateway with access point and router functionality, and may further include an Ethernet switch and/or a modem. As another example, the gateway 2700 may include a range extending gateway that may be used to improve signal range and strength within a network by taking an existing signal from another gateway (e.g., a router gateway, an access point, or the like) and rebroadcasting the signal to create a second logical network.

The gateway 2700 includes hardware elements that can be electrically coupled via a bus 2718 (or may otherwise be in communication, as appropriate). In one embodiment, the bus 2718 can be used for the processor(s) 2702 to communicate between cores and/or with the memory 2712. The hardware elements may include one or more processors 2702, including without limitation one or more general-purpose processors and/or one or more special-purpose processors (such as digital signal processing chips, graphics acceleration processors, and/or the like); one or more input devices 2716, which can include without limitation one or more buttons, a keyboard, a keypad, a touch sensitive screen, a touch pad, and/or the like; and one or more output devices 2714, which can include, without limitation, a display, light or sound indicators, and/or the like.

The gateway 2700 may include one or more wireless transceivers 2706 and 2720 connected to the bus 2718. The wireless transceiver 2706 may be operable to receive wireless signals (e.g., a wireless signal 2710) via an antenna 2708. The wireless transceivers 2720 may be operable to receive wireless signals (e.g., a wireless signal 2714) via an antenna 2722. The wireless transceivers 2706 and 2720 may each include a WiFi transceiver radio designed to transmit and receive signals using frequencies of a specific frequency band, which may be referred to herein as "WiFi circuits." For example, wireless transceiver 2706 may include a 2.4 GHz WiFi circuit, and wireless transceiver 2720 may include a 5 GHz WiFi circuit. Accordingly, the gateway 2700 may include a single WiFi circuit for a first WiFi frequency band, and a single WiFi circuit for a second WiFi frequency band. In some embodiments, the gateway 2700 may include multiple wireless transceivers (not shown) for each available frequency band. The antennas 2708 and 2722 may include multiple band antennas that can transmit and/or receive signals over different frequency bands.

The gateway 2700 may further include radio frequency (RF) circuit 2726. In some embodiments, the wireless transceivers 2706 and 2720 may be integrated with or coupled to the RF circuit 2726 so that the RF circuit 2726 includes the wireless transceivers 2706 and 2720. In some embodiments, the wireless transceivers 2706 and 2720 and the RF circuit 2726 are separate components. The RF circuit 2726 may include a RF amplifier that may amplify signals received over antennas 2708 and 2722. The RF circuit 2726 may also include a power controller that may be used to adjust signal amplification by the RF amplifier. The power controller may be implemented using hardware, firmware, software, or any combination thereof.

The wireless signals 2710 and 2724 may be transmitted via a wireless network. In some embodiments, the wireless network may be any wireless network such as a wireless local area network (e.g., local area network 100), such as WiFi™, a Personal Access Network (PAN), such as Bluetooth® or Zigbee®, or a cellular network (e.g. a GSM, WCDMA, LTE, CDMA2000 network). Wireless transceivers 2706 and 2720 may be configured to receive various radio frequency (RF) signals (e.g., signals 2710 and 2724) via antennas 2708 and 2724, respectively, from one or more other gateways, access devices, network devices, cloud networks, and/or the like. Gateway 2700 may also be configured to decode and/or decrypt, via the DSP 2704 and/or processor(s) 2702, various signals received from one or more gateways, network devices, cloud networks, and/or the like.

The gateway 2700 may include a power supply (not shown) that can power the various components of the gateway 2700. The power supply may include a switch-mode power supply, a linear power supply, a push-pull power supply, or any other suitable type of power supply. In some embodiments, the gateway 2700 may include multiple power supplies. For example, a switch-mode power supply may be used to condition input power, and a linear power supply may be used to power the RF circuit 2726. The power supply may be configured to operate over various ranges of appropriate input voltages.

The gateway 2700 may further include (and/or be in communication with) one or more non-transitory machine-readable storage mediums or storage devices (e.g., memory 2712), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 2712, such as RAM, ROM, FLASH, or disc drive, and executed by processor(s) 2702 or DSP 2704. The gateway 2700 can also comprise software elements (e.g., located within the memory 2712), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 14, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. 14. The memory 2712 may be a non-transitory machine-readable storage medium, processor-readable memory, and/or a computer-readable memory that stores the one or more computer-program products configured to cause the processor(s) 2702 to perform the functions described. In other embodiments, one or more of the functions described may be performed in hardware.

A set of these instructions and/or code might be stored on a non-transitory machine-readable storage medium, such as the memory 2712. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the gateway 2700 and/or might take the form of source and/or installable code, which, upon compilation and/or installation on the gateway 2700 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method, comprising:
   receiving, at a network device on a network, capability information associated with one or more capabilities of network devices on a network;
   automatically generating, by the network device, a grouping of network devices, wherein the grouping includes network devices on the network that share one or more common capabilities, wherein devices in a grouping are treated within the network as a single virtual device that perform functions together, and wherein the grouping includes the network device;
   transmitting, by the network device, grouping data to the other network devices in the grouping, wherein the grouping data includes data associated with the grouping of network devices and the network devices included in the grouping of network devices;
   receiving, by the network device, new information associated with capabilities of a new network device that was added to the grouping of network devices;
   determining, by the network device using the new information associated with the capabilities of the new network device, that the new network device includes a capability not shared by the grouping of network devices;
   deactivating, by the network device, the capability of the new network device not shared by the grouping of network devices; and
   transmitting, by the network device, updated grouping data to the new network device and other remaining network devices in the grouping, wherein the updated grouping data includes data generated at least in part from the new information and reflects the deactivated capability of the new network device.

2. The method of claim 1, wherein transmitting grouping data and updated grouping data includes transmitting a list of the network devices within the grouping.

3. The method of claim 1, further comprising:
   receiving, by the network device, additional updated information associated with one or more of the other network devices in the grouping of network devices; and
   adding, by the network device, a new network device to the grouping of network devices based on the received additional updated information.

4. The method of claim 3, further comprising:
   generating a setup access point;
   establishing a communication connection between the setup access point and the new network device; and
   receiving a communication from the setup access point that the network device is associated with the network.

5. The method of claim 3, wherein transmitting updated grouping data to the other network devices in the grouping includes data generated at least in part from the additional updated information and reflects the added network device.

6. The method of claim 3, further comprising:
   transmitting, by the network device, additional updated grouping data to the other network devices in the grouping, wherein the additional updated grouping data includes data generated at least in part from the additional updated information and reflects the added network device, and wherein the network device transmits the additional updated grouping data after the updated grouping data.

7. The method of claim 1, further comprising:
   generating, by the network device, a second grouping of network devices, wherein the second grouping includes network devices from the grouping of network devices that share one or more common capabilities, wherein the common capability shared by the network devices in the second grouping of network devices is different than the common capability shared by the network devices in the grouping of network devices.

8. The method of claim 1, wherein the network devices in the grouping of network devices are the same type of device and perform the same functions.

9. The method of claim 1, wherein the network devices in the grouping of network devices include at least two different types of devices that perform one or more different functions.

10. A network device, comprising:
    one or more processors; and
    a memory having instructions stored thereon, which when executed by the one or more processors, cause the network device to perform operations including:
      receiving, at a network device on a network, capability information associated with one or more capabilities of network devices on a network;
      automatically generating, by the network device, a grouping of network devices, wherein the grouping includes network devices on the network that share one or more common capabilities, wherein devices in a grouping are treated within the network as a single virtual device that perform functions together, and wherein the grouping includes the network device;
      transmitting, by the network device, grouping data to the other network devices in the grouping, wherein the grouping data includes data associated with the grouping of network devices and the network devices included in the grouping of network devices;

receiving, by the network device, new information associated with capabilities of a new network device that was added to the grouping of network devices;

determining, by the network device using the new information associated with the capabilities of the new network device, that the new network device includes a capability not shared by the grouping of network devices;

deactivating, by the network device, the capability of the new network device not shared by the grouping of network devices; and transmitting, by the network device, updated grouping data to the new network device and other remaining network devices in the grouping, wherein the updated grouping data includes data generated at least in part from the new information and reflects the deactivated capability of the new network device.

11. The network device of claim 10, wherein transmitting grouping data and updated grouping data includes transmitting a list of the network devices within the grouping.

12. The network device of claim 10, wherein the operations further include:

receiving, by the network device, additional updated information associated with one or more of the other network devices in the grouping of network devices; and adding, by the network device, a new network device to the grouping of network devices based on the received additional updated information.

13. The network device of claim 12, wherein the operations further include:

generating a setup access point;

establishing a communication connection between the setup access point and the new network device; and receiving a communication from the setup access point that the network device is associated with the network.

14. The network device of claim 13, wherein transmitting updated grouping data to the other network devices in the grouping includes data generated at least in part from the additional updated information and reflects the added network device.

15. The network device of claim 13, wherein the operations further include:

transmitting, by the network device, additional updated grouping data to the other network devices in the grouping, wherein the additional updated grouping data includes data generated at least in part from the additional updated information and reflects the added network device, and wherein the network device transmits the additional updated grouping data after the updated grouping data.

16. The network device of claim 10, wherein the operations further include:

generating, by the network device, a second grouping of network devices, wherein the second grouping includes network devices from the grouping of network devices that share one or more common capabilities, wherein the common capability shared by the network devices in the second grouping of network devices is different than the common capability shared by the network devices in the grouping of network devices.

17. The network device of claim 10, wherein the network devices in the grouping of network devices are the same type of device and perform the same functions.

18. The network device of claim 10, wherein the network devices in the grouping of network devices include at least two different types of devices that perform one or more different functions.

19. A non-transitory computer-readable storage medium having instructions stored thereon, which when executed by a computing device, cause the computing device to perform operations including:

automatically generating, by a network device, a grouping of network devices, wherein the grouping includes network devices on the network that share one or more common capabilities, wherein devices in a grouping are treated within the network as a single virtual device that perform functions together, and wherein the grouping includes the network device;

transmitting, by the network device, grouping data to the other network devices in the grouping, wherein the grouping data includes data associated with the grouping of network devices and the network devices included in the grouping of network devices;

receiving, by the network device, new information associated with capabilities of a new network device that was added to the grouping of network devices;

determining, by the network device using the new information associated with the capabilities of the new network device, that the new network device includes a capability not shared by the grouping of network devices;

deactivating, by the network device, the capability of the new network device not shared by the grouping of network devices; and transmitting, by the network device, updated grouping data to the new network device and other remaining network devices in the grouping, wherein the updated grouping data includes data generated at least in part from the new information and reflects the deactivated capability of the new network device.

20. The non-transitory computer-readable storage medium of claim 19, wherein the operations further include:

receiving, by the network device, additional updated information associated with one or more of the other network devices in the grouping of network devices; and adding, by the network device, a new network device to the grouping of network devices based on the received additional updated information.

* * * * *